(12) United States Patent
Citsay

(10) Patent No.: US 10,219,670 B2
(45) Date of Patent: Mar. 5, 2019

(54) SYSTEMS AND METHODS FOR SUPPLYING TREATMENT LIQUIDS HAVING NANOBUBBLES

(71) Applicant: Tennant Company, Minneapolis, MN (US)

(72) Inventor: Mark S. Citsay, Lake Elmo, MN (US)

(73) Assignee: Tennant Company, Minneapolis, MN (US)

( * ) Notice: Subject to any disclaimer, the term of this patent is extended or adjusted under 35 U.S.C. 154(b) by 414 days.

(21) Appl. No.: 14/846,009

(22) Filed: Sep. 4, 2015

(65) Prior Publication Data

US 2016/0066760 A1     Mar. 10, 2016

Related U.S. Application Data

(60) Provisional application No. 62/046,745, filed on Sep. 5, 2014, provisional application No. 62/130,088, filed on Mar. 9, 2015.

(51) Int. Cl.
*A47L 13/22* (2006.01)
*A47L 11/40* (2006.01)
(Continued)

(52) U.S. Cl.
CPC ......... *A47L 11/4083* (2013.01); *A47L 11/283* (2013.01); *A47L 11/4038* (2013.01); (Continued)

(58) Field of Classification Search
CPC .................................................. A47L 11/4083
See application file for complete search history.

(56) References Cited

U.S. PATENT DOCUMENTS 8,505,156 B2   8/2013   Goff
8,528,142 B1   9/2013   Pedlar
(Continued)

FOREIGN PATENT DOCUMENTS

CA   2864079 A1   9/2013
CN   1434281      8/2003
(Continued)

OTHER PUBLICATIONS

Sato, "Recent Patents on Micro- and Nano-Bubble Applications and Potential Application of a Swirl-type Generator," Recent Patents on Mechanical Engineering, vol. 4, 2011, pp. 202-211.
(Continued)

*Primary Examiner* — Jason Y Ko
(74) *Attorney, Agent, or Firm* — Fredrikson & Byron, P.A.

(57) ABSTRACT

A method and apparatus are provided for cleaning a surface. In one example, the method includes passing a feed liquid from a liquid source to an electrolysis cell and inducing a current through the electrolysis cell to electrochemically activate the feed liquid in the electrolysis cell. Electrolysis of the feed liquid can generate an electrochemically-activated liquid that is super-saturated with dissolved gases (e.g., oxygen and/or hydrogen) and also contains nanobubbles. In one configuration, the electrolysis cell generates a concentration of nanobubbles having a diameter of 10 nm to 450 nm of at least $1\times10^6$. The method can further involve dispensing at least one portion of the electrochemically-activated liquid to the surface.

9 Claims, 24 Drawing Sheets

(51) Int. Cl.
  *A47L 11/283* (2006.01)
  *C25B 1/04* (2006.01)
  *C25B 9/18* (2006.01)
  *C25B 15/02* (2006.01)
  *C25B 15/08* (2006.01)
  *B08B 1/00* (2006.01)
  *B08B 1/04* (2006.01)
  *B08B 3/04* (2006.01)
  *B08B 3/08* (2006.01)
  *B08B 3/10* (2006.01)
  *B08B 7/00* (2006.01)
  *C02F 1/461* (2006.01)

(52) U.S. Cl.
  CPC .......... *A47L 11/4077* (2013.01); *B08B 1/002* (2013.01); *B08B 1/04* (2013.01); *B08B 3/04* (2013.01); *B08B 3/08* (2013.01); *B08B 3/10* (2013.01); *B08B 7/0021* (2013.01); *C02F 1/46104* (2013.01); *C25B 1/04* (2013.01); *C25B 9/18* (2013.01); *C25B 15/02* (2013.01); *C25B 15/08* (2013.01); *C02F 2001/46138* (2013.01); *C02F 2201/4613* (2013.01); *C02F 2303/26* (2013.01); *C02F 2307/12* (2013.01); *Y02E 60/366* (2013.01)

(56) References Cited

U.S. PATENT DOCUMENTS

| | | |
|---|---|---|
| 8,595,892 B1 | 12/2013 | Everette, Jr. |
| 2003/0101532 A1 | 6/2003 | Desinger et al. |
| 2006/0003510 A1 | 1/2006 | Kammler et al. |
| 2006/0054205 A1 | 3/2006 | Yabe et al. |
| 2006/0249186 A1 | 11/2006 | Cohen et al. |
| 2007/0062555 A1 | 3/2007 | Change et al. |
| 2007/0186367 A1 | 8/2007 | Field et al. |
| 2008/0227680 A1 | 9/2008 | Lynn |
| 2008/0317664 A1 | 12/2008 | Zhang et al. |
| 2009/0029041 A1 | 1/2009 | Natsume |
| 2009/0072545 A1 | 3/2009 | Van Michaels |
| 2010/0003807 A1 | 1/2010 | Nagaseki |
| 2010/0021598 A1 | 1/2010 | Lynn |
| 2010/0077650 A1 | 4/2010 | Shiode et al. |
| 2010/0147700 A1 | 6/2010 | Field et al. |
| 2010/0179478 A1 | 7/2010 | Kobayashi et al. |
| 2010/0310664 A1 | 12/2010 | Watson et al. |
| 2011/0114708 A1 | 5/2011 | Maeda et al. |
| 2011/0168210 A1 | 7/2011 | Tabata |
| 2011/0241230 A1 | 10/2011 | Kerfoot |
| 2011/0256503 A1 | 10/2011 | Fraser |
| 2012/0055884 A1 | 3/2012 | Chen et al. |
| 2012/0100727 A1 | 4/2012 | Nagaseki |
| 2012/0128749 A1 | 5/2012 | Tsuji |
| 2012/0216828 A1 | 8/2012 | Tanaka |
| 2012/0227761 A1 | 9/2012 | Leighton et al. |
| 2013/0019902 A1 | 1/2013 | Ito et al. |
| 2013/0034829 A1 | 2/2013 | Choi |
| 2013/0160225 A1 | 6/2013 | Contardi |
| 2013/0239359 A1 | 9/2013 | Pedlar |
| 2013/0292146 A1 | 11/2013 | Fellhauer |
| 2013/0327353 A1 | 12/2013 | Field |
| 2014/0090664 A1 | 4/2014 | Walz |
| 2014/0102476 A1 | 4/2014 | Hall |
| 2014/0125122 A1 | 5/2014 | Johnson |
| 2014/0130292 A1 | 5/2014 | Pedlar |
| 2014/0173864 A1 | 6/2014 | Hamm |
| 2014/0191425 A1 | 7/2014 | Yano et al. |
| 2014/0243664 A1 | 8/2014 | El-Sayed et al. |
| 2015/0030991 A1 | 1/2015 | Sung et al. |
| 2015/0250728 A1 | 9/2015 | Murata et al. |
| 2015/0313435 A1 | 11/2015 | Citsay |

FOREIGN PATENT DOCUMENTS

| | | |
|---|---|---|
| CN | 1939609 | 4/2007 |
| CN | 101069486 A | 11/2007 |
| CN | 101381472 | 3/2009 |
| CN | 101384380 A | 3/2009 |
| CN | 101421053 A | 4/2009 |
| CN | 101496708 A | 8/2009 |
| CN | 201337367 | 11/2009 |
| CN | 101600516 A | 12/2009 |
| CN | 101618916 | 1/2010 |
| CN | 201434378 | 3/2010 |
| CN | 201434380 | 3/2010 |
| CN | 201437076 | 4/2010 |
| CN | 101705490 | 5/2010 |
| CN | 101766963 | 7/2010 |
| CN | 101804309 | 8/2010 |
| CN | 101842041 A | 9/2010 |
| CN | 101966066 A | 2/2011 |
| CN | 102132686 | 7/2011 |
| CN | 202063791 | 12/2011 |
| CN | 102417283 | 4/2012 |
| CN | 202246229 | 5/2012 |
| CN | 202246348 | 5/2012 |
| CN | 102491510 | 6/2012 |
| CN | 102531109 | 7/2012 |
| CN | 102836446 | 12/2012 |
| CN | 103153151 A | 6/2013 |
| CN | 103170263 | 6/2013 |
| CN | 103192531 A | 7/2013 |
| CN | 103220957 A | 7/2013 |
| CN | 103220958 A | 7/2013 |
| CN | 103327870 A | 9/2013 |
| CN | 103466831 | 12/2013 |
| CN | 103597130 A | 2/2014 |
| CN | 103620118 A | 3/2014 |
| CN | 103649415 A | 3/2014 |
| CN | 203474562 | 3/2014 |
| CN | 102940895 | 8/2014 |
| CN | 203862408 | 10/2014 |
| CN | 104140153 | 11/2014 |
| CN | 104152132 | 11/2014 |
| CN | 203955063 | 11/2014 |
| CZ | 303452 | 9/2012 |
| CZ | 304318 | 2/2014 |
| EP | 1217930 A2 | 7/2002 |
| EP | 1593334 A2 | 11/2005 |
| EP | 1968422 A2 | 9/2008 |
| EP | 1991370 A1 | 11/2008 |
| EP | 2085013 A1 | 8/2009 |
| EP | 2170147 A1 | 4/2010 |
| EP | 2240062 A1 | 10/2010 |
| EP | 2375955 A1 | 10/2011 |
| EP | 1991372 B1 | 11/2011 |
| EP | 2554089 A1 | 2/2013 |
| EP | 2554090 A1 | 2/2013 |
| EP | 2559367 A1 | 2/2013 |
| EP | 2598010 A1 | 6/2013 |
| EP | 2612746 A2 | 7/2013 |
| EP | 2627234 A1 | 8/2013 |
| EP | 2640248 A1 | 9/2013 |
| EP | 2640249 A1 | 9/2013 |
| EP | 2640250 A1 | 9/2013 |
| EP | 2640251 A1 | 9/2013 |
| JP | 3007461 | 2/1995 |
| JP | 3011604 | 5/1995 |
| JP | 2003245533 | 9/2003 |
| JP | 2003334548 | 11/2003 |
| JP | 2005034747 | 2/2005 |
| JP | 2006088021 | 4/2006 |
| JP | 3121951 | 6/2006 |
| JP | 2006191979 | 7/2006 |
| JP | 2006223239 | 8/2006 |
| JP | 2006263505 | 10/2006 |
| JP | 2006289183 | 10/2006 |
| JP | 2007004760 | 1/2007 |
| JP | 2007075328 | 3/2007 |
| JP | 2007097520 | 4/2007 |
| JP | 2007097521 | 4/2007 |

(56) References Cited

FOREIGN PATENT DOCUMENTS

| | | |
|---|---|---|
| JP | 2007098217 | 4/2007 |
| JP | 2007209922 | 8/2007 |
| JP | 2007253012 | 10/2007 |
| JP | 2007253132 | 10/2007 |
| JP | 2007253133 | 10/2007 |
| JP | 2007312609 | 12/2007 |
| JP | 2007319783 | 12/2007 |
| JP | 2007325558 | 12/2007 |
| JP | 2007326017 | 12/2007 |
| JP | 2008029955 | 2/2008 |
| JP | 2008029971 | 2/2008 |
| JP | 2008089745 | 4/2008 |
| JP | 2008093624 | 4/2008 |
| JP | 2008100956 | 5/2008 |
| JP | 2008104608 | 5/2008 |
| JP | 2008104609 | 5/2008 |
| JP | 2008104983 | 5/2008 |
| JP | 2008148558 | 7/2008 |
| JP | 2008148687 | 7/2008 |
| JP | 2008183502 | 8/2008 |
| JP | 2008206448 | 9/2008 |
| JP | 2008208279 | 9/2008 |
| JP | 2008212276 | 9/2008 |
| JP | 2008241146 | 10/2008 |
| JP | 2008259456 | 10/2008 |
| JP | 2008289682 | 12/2008 |
| JP | 2008296095 | 12/2008 |
| JP | 2009000595 | 1/2009 |
| JP | 2009006253 | 1/2009 |
| JP | 2009006254 | 1/2009 |
| JP | 2009061428 | 3/2009 |
| JP | 2009078244 | 4/2009 |
| JP | 2009079862 | 4/2009 |
| JP | 2009082813 | 4/2009 |
| JP | 2009084258 | 4/2009 |
| JP | 2009088228 | 4/2009 |
| JP | 2009101269 | 5/2009 |
| JP | 2009106831 | 5/2009 |
| JP | 2009112947 | 5/2009 |
| JP | 2009129976 | 6/2009 |
| JP | 2009147164 | 7/2009 |
| JP | 2009160530 | 7/2009 |
| JP | 2009166002 | 7/2009 |
| JP | 2009172060 | 8/2009 |
| JP | 2009188116 | 8/2009 |
| JP | 2009195889 | 9/2009 |
| JP | 2009226378 | 10/2009 |
| JP | 2009226386 | 10/2009 |
| JP | 2009246000 | 10/2009 |
| JP | 2009246042 | 10/2009 |
| JP | 2009254984 | 11/2009 |
| JP | 2009255011 | 11/2009 |
| JP | 2009263952 | 11/2009 |
| JP | 2009297654 | 12/2009 |
| JP | 2009302405 | 12/2009 |
| JP | 2009302406 | 12/2009 |
| JP | 2010005490 | 1/2010 |
| JP | 2010005544 | 1/2010 |
| JP | 2010022960 | 2/2010 |
| JP | 2010022961 | 2/2010 |
| JP | 2010029763 | 2/2010 |
| JP | 2010029764 | 2/2010 |
| JP | 2010042394 | 2/2010 |
| JP | 3158341 | 3/2010 |
| JP | 2010046632 | 3/2010 |
| JP | 2010046648 | 3/2010 |
| JP | 2010063996 | 3/2010 |
| JP | 2010075180 | 4/2010 |
| JP | 2010082541 | 4/2010 |
| JP | 2010089054 | 4/2010 |
| JP | 2010111122 | 5/2010 |
| JP | 2010112163 | 5/2010 |
| JP | 2010140966 | 6/2010 |
| JP | 2010163393 | 7/2010 |
| JP | 2010166874 | 8/2010 |
| JP | 2010167365 | 8/2010 |
| JP | 2010207778 | 9/2010 |
| JP | 2010239956 | 10/2010 |
| JP | 2010241093 | 10/2010 |
| JP | 2010279900 | 12/2010 |
| JP | 2011001271 | 1/2011 |
| JP | 2011020005 | 2/2011 |
| JP | 2011041881 | 3/2011 |
| JP | 2011058020 | 3/2011 |
| JP | 2011105642 | 6/2011 |
| JP | 2011110028 | 6/2011 |
| JP | 2011120994 | 6/2011 |
| JP | 2011129741 | 6/2011 |
| JP | 2011129743 | 6/2011 |
| JP | 2011149793 | 8/2011 |
| JP | 2011156526 | 8/2011 |
| JP | 2011200778 | 10/2011 |
| JP | 2011230055 | 11/2011 |
| JP | 2011241501 | 12/2011 |
| JP | 2011246950 | 12/2011 |
| JP | 2012052094 | 3/2012 |
| JP | 2012055552 | 3/2012 |
| JP | 3176175 | 6/2012 |
| JP | 2012166173 | 9/2012 |
| JP | 2012206099 | 10/2012 |
| JP | 2012219279 | 11/2012 |
| JP | 2012223659 | 11/2012 |
| JP | 2012236146 | 12/2012 |
| JP | 2012236151 | 12/2012 |
| JP | 2012250299 | 12/2012 |
| JP | 2012250300 | 12/2012 |
| JP | 2012250301 | 12/2012 |
| JP | 2012250302 | 12/2012 |
| JP | 2013046936 | 3/2013 |
| JP | 2013107060 | 6/2013 |
| JP | 2013124250 | 6/2013 |
| JP | 3184786 | 7/2013 |
| JP | 2013139958 | 7/2013 |
| JP | 2013140096 | 7/2013 |
| JP | 2013154342 | 8/2013 |
| JP | 2013158676 | 8/2013 |
| JP | 2013178178 | 9/2013 |
| JP | 2013192494 | 9/2013 |
| JP | 2013201974 | 10/2013 |
| JP | 2013212281 | 10/2013 |
| JP | 2013226082 | 11/2013 |
| JP | 2013248582 | 12/2013 |
| JP | 2014016301 | 1/2014 |
| JP | 2014052230 | 3/2014 |
| JP | 2014062653 | 4/2014 |
| JP | 2014076425 | 5/2014 |
| JP | 2014091067 | 5/2014 |
| JP | 2014097449 | 5/2014 |
| JP | 2014127720 | 7/2014 |
| JP | 2014138925 | 7/2014 |
| JP | 2014159503 | 9/2014 |
| JP | 2014159538 | 9/2014 |
| KR | 100444886 | 6/2003 |
| KR | 20030045321 | 6/2003 |
| KR | 20040091254 | 10/2004 |
| KR | 20060128761 | 12/2006 |
| KR | 100760771 | 10/2007 |
| KR | 20080011878 | 2/2008 |
| KR | 100841795 | 6/2008 |
| KR | 20090105467 | 10/2009 |
| KR | 100944694 | 2/2010 |
| KR | 20100063876 | 6/2010 |
| KR | 100984304 | 9/2010 |
| KR | 100989213 | 10/2010 |
| KR | 100989631 | 10/2010 |
| KR | 101000779 | 1/2011 |
| KR | 20110004001 | 1/2011 |
| KR | 20110008838 | 1/2011 |
| KR | 101026734 | 4/2011 |
| KR | 101032102 | 5/2011 |
| KR | 20110107620 | 10/2011 |
| KR | 20110125327 | 11/2011 |
| KR | 20110137515 | 12/2011 |
| KR | 20120002678 | 1/2012 |

(56) References Cited

FOREIGN PATENT DOCUMENTS

| | | |
|---|---|---|
| KR | 20120002681 | 1/2012 |
| KR | 101125851 | 3/2012 |
| KR | 20120036657 | 4/2012 |
| KR | 20120043325 | 5/2012 |
| KR | 101153290 | 6/2012 |
| KR | 101157713 | 6/2012 |
| KR | 20120063805 | 6/2012 |
| KR | 20120080828 | 7/2012 |
| KR | 20120084929 | 7/2012 |
| KR | 101176988 | 8/2012 |
| KR | 20120096368 | 8/2012 |
| KR | 20120096369 | 8/2012 |
| KR | 20120096370 | 8/2012 |
| KR | 101179885 | 9/2012 |
| KR | 20120103374 | 9/2012 |
| KR | 101206476 | 11/2012 |
| KR | 20130000154 | 1/2013 |
| KR | 101235663 | 2/2013 |
| KR | 20130017582 | 2/2013 |
| KR | 101252673 | 4/2013 |
| KR | 20130032499 | 4/2013 |
| KR | 20130002977 | 5/2013 |
| KR | 20130051284 | 5/2013 |
| KR | 20130056603 | 5/2013 |
| KR | 20130084074 | 7/2013 |
| KR | 20130121708 | 11/2013 |
| KR | 101361104 | 2/2014 |
| KR | 101372541 | 3/2014 |
| KR | 101379239 | 3/2014 |
| KR | 20140067536 | 6/2014 |
| KR | 20140074482 | 6/2014 |
| KR | 20140004286 | 7/2014 |
| KR | 20140101212 | 8/2014 |
| KR | 20140105123 | 9/2014 |
| KR | 20140117215 | 10/2014 |
| KR | 20140120471 | 10/2014 |
| KR | 20140133099 | 11/2014 |
| SG | 2013047410 | 1/2015 |
| TW | 200727976 | 8/2007 |
| TW | I298644 | 7/2008 |
| TW | M411904 | 9/2011 |
| TW | 201328771 | 7/2013 |
| WO | 0116118 | 3/2001 |
| WO | 2007095072 | 8/2007 |
| WO | 2007117351 | 10/2007 |
| WO | 2008038371 | 4/2008 |
| WO | 2008072370 | 6/2008 |
| WO | 2008087903 | 7/2008 |
| WO | 2009057759 | 5/2009 |
| WO | 2009090873 | 7/2009 |
| WO | 2010151134 | 12/2010 |
| WO | 2012029663 | 3/2012 |
| WO | 2012128627 | 9/2012 |
| WO | 2013001648 A1 | 1/2013 |
| WO | 2013001649 A1 | 1/2013 |
| WO | 2013006466 A2 | 1/2013 |
| WO | 2013006521 A2 | 1/2013 |
| WO | 2013012934 A1 | 1/2013 |
| WO | 2013075715 A1 | 5/2013 |
| WO | 2013088668 | 6/2013 |
| WO | 2013166092 A1 | 11/2013 |
| WO | 2013174623 A1 | 11/2013 |
| WO | 2013182918 A1 | 12/2013 |
| WO | 2013191184 A1 | 12/2013 |
| WO | 2014019620 A1 | 2/2014 |
| WO | 2014032712 A1 | 3/2014 |
| WO | 2014040016 A1 | 3/2014 |
| WO | 2014067019 A1 | 5/2014 |
| WO | 2014082667 A1 | 6/2014 |
| WO | 2014148397 | 9/2014 |
| WO | 2014172574 | 10/2014 |

OTHER PUBLICATIONS

Seddon, et al., "Nanobubbles and micropancakes: gaseous domains on immersed substrates," J. Phys.: Condens. Matter, vol. 23, 2011, 133001, pp. 23.

Seddon, et al., "A Deliberation on Nanobubbles at Surfaces and in Bulk," Chem. Phys. Chem., Mini Reviews, vol. 13, 2012, pp. 2179-2187.

Takenouchi, et al., "Evaluation for Surface Cleanness of Metals Washed by the Electrolyzed Alkaline Water," Journal of The Surface Finishing Society of Japan, vol. 54, No. 11, Jan. 2003, pp. 818-822.

Takenouchi, "Behavior of hydrogen nanobubbles in alkaline electrolyzed water and its rinse effect for sulfate ion remained on nickel-plated surface," J. Appl. Electrochem., vol. 40, 2010, pp. 849-854.

Turner, "Applications of Ultrafine Bubble Technology for Industrial Cleaning," Particulate Systems Analysis Conference, Sep. 15-17, 2014, pp. 8.

Uchida, et al., "Transmission electron microscopic observations of nanobubbles and their capture of impurities in wastewater," Nanoscale Research Letters, vol. 6, No. 295, 2011, pp. 9.

Ueda, et al., "Research for Fukushima reconstruction with ultra-fine bubble technology," Particulate Systems Analysis Conference, Sep. 15-17, 2014, pp. 6.

Uehara, et al., "Magnetized Nanobubble Water Formed Under Pulsed-Magnetic Field," IEEE Transactions on Magnetics, vol. 47, No. 10, Oct. 2011, pp. 2604-2607.

Ushida, et al., "Effect of Mixed Nanobubble and Microbubble Liquids on the Washing Rate of Cloth in an Alternating Flow," J. Surfact. Deterg., vol. 15, 2012, pp. 695-702.

Ushida, et al., "Flow properties of nanobubble mixtures passing through micro-orifices," International Journal of Heat and Fluid Flow, vol. 40, 2013, pp. 106-115.

Ushikubo, et al., "Evidence of the existence and the stability of nano-bubbles in water," Colloids and Surfaces A: Physicochem. Eng. Aspects, vol. 361, 2010, pp. 31-37.

Wang, et al., "Boundary slip and nanobubble study in micor/nanofluids using atomic force microscopy," Soft Matter, vol. 6, 2010, pp. 29-66.

Wu, et al., "Nanobubbles influence on BSA adsorption on mica surface," Surf. Interface Anal. vol. 38, 2006, pp. 990-995.

ZhiHua et al., "In situ AFM observation of BSA adsorption on HOPG with nanobubble," Chinese Science Bulletin, vol. 52, No. 14, Jul. 2007, pp. 1913-1919.

Wu, et al., "Cleaning using nanobubbles: Defouling by electrochemical generation of bubbles," Journal of Colloid and Interface Science, vol. 328, 2008, pp. 10-14.

Wu, et al., "Generation and characterization of submicron size bubbles," Advances in Colloid and Interface Science, vols. 179-182, 2012, pp. 123-132.

Yamanaka, et al., "Electrolyzed Water as the Novel Cleaning Media in Ultra-Large-Scale Integration and Liquid-Crystal Display Manufacturing," Langmuir, vol. 15, No. 12, 1999, pp. 4165-4170.

Yang, et al., "Removal of Nanoparticles from Plain and Patterned Surfaces Using Nanobubbles," Langmuir, vol. 27, No. 18, 2011, pp. 11430-11435.

Zhang, "Study on micro-nano bubble technology using metal surface processing with degreasing," Cleaning World, vol. 27, No. 10, 2011 pp. 2.

Zimmerman, et al., "Microbubble Generation," Recent Patents on Engineering, vol. 2, 2008, pp. 8.

Kosuke, et al., "Oxygen and Air Nanobubble Water Solution Promote the Growth of Plants, Fish, and Mice," PLoS ONE, June PLoS ONE, Jun. 5, 2013, 7 pages, vol. 8, No. 6, retrieved from the Internet on Jan. 28, 2016: <URL: http://journals.plos.org/plosone/article?id=10.1371/journal.pone.0065339>.

Invitation to Pay Additional Fees and, Where Applicable, Protest Fee for International Application No. PCT/US2015/048571 dated Dec. 23, 2015 from the International Searching Authority, European Patent Office, Rijswijk, The Netherlands, 8 pages.

International Search Report & Written Opinion dated Sep. 23, 2015, in PCT Application No. PCT/US2015/028866, 15 pgs.

(56) References Cited

OTHER PUBLICATIONS

Design and Manufacture of Nanobubble Devices [online], Anzaikantetsu MCS Division [retrieved on Dec. 1, 2015], retrieved from the internet: http://anzaimcs.com/en/index.html.
Solutions of the water problems [online], OK Fine Bubble [retrieved on Dec. 1, 2015], retrieved from the internet: http://www.finebubble-ok.com.
Micro/nano-bubble Generator, eco-Bubble-Three Nozzles. Datasheet. Taikohgiken Ltd.; retrived from the internet: http//ecobubble.jp.
Zhang, et al., "Characterization of nanobubble suspension using dynamic light scattering," Particulate Systems Analysis Conference, Sep. 15-17, 2014, pp. 5.
Seddon, "Interaction of a nanobubble suspension with a soiled substrate," Particulate Systems Analysis Conference, Sep. 15-17, 2014, pp. 6.
Cameron, "Tiny Bubbles," In Case You Missed It, ACCJ Journal, Jun. 2005, pp. 35, 37.
Agarwal, et al., "Principle and applications of microbubble and nanobubble technology for water treatment," Chemosphere, vol. 84, 2011, pp. 1175-1180.
Parker, et al., "Bubbles, Cavities, and the Long-Ranged Attraction between Hydrophobic Surfaces," The Journal of Physical Chemistry, vol. 98, No. 34, 1994, pp. 8468-8480.
Attard, "The stability of nanobubbles," The European Physical Journal, Special Topics, 2013, pp. 1-22.
Bhushan, et al., "AFM characterization of nanobubble formation and slip condition in oxygenated and electrokinetically altered fluids," Journal of Colloid and Interface Science, vol. 392, 2013, pp. 105-116.
Brooks, "The wonder-working bubbles that physics can't explain," New Scientist maganzine, Issue 2872, Jul. 11, 2012, pp. 38-41.
Bunkin, et al. "Cluster Structure of Dissolved Gas Nanobubbles in Ionic Aqueous Solutions," Journal of Chemical & Engineering Data, vol. 57, Sep. 13, 2012, pp. 2823-2831.
Checco, et al., "Scientists Glimpse Nanobubbles on Super Non-Stick Surfaces," Brookhaven National Laboratory News [online], Feb. 24, 2010 [retrieved on Sep. 1, 2010], Retrieved from the Internet: http://www.bnl.gov/bnlweb/pubaf/pr/PR_display.asp?prID=1085.
Chen, et al., "Defouling and cleaning using nanobubbles on stainless steel," Biofouling: The Journal of Bioadhesion and Biofilm Research, vol. 25, Issue 4, 2009, Abstract & Introduction.
Cho, et al., "Ultrasonic formation of nanobubbles and their zeta-potentials in aqueous electrolyte and surfactant solutions," Colloids and Surfaces A: Physicohem. Eng. Aspects, vol. 269, 2005 pp. 28-34.
An, et al., "Surface Nanobubbles in Non-Aqueous Media: Looking for nanobubbles in DMSO, Formamide, Propylene Carbonate, Ethylammonium Nitrate and Propylammonium Nitrate," ACS Nano, vol. 9, Issue 7, 2015, 26 pgs.
An, et al., "Wetting of nanophases: Nanobubbles, nanodroplets and micropancakes on hydrophobic surfaces," Advances in Colloid and Interface Science, 2014, Retrieved from the Internet: http://dx.doi.org/10.1016/j.cis.2014.07.008.
Ducker, "Contact Angle and Stability of Interfacial Nanobubbles," ACS Publications, Langmuir, 2009, vol. 25, Issue 16, Abstract.
Duval, et al., "Long-lived submicrometric bubbles in very diluted alkali halide water solutions," Phys. Chem. Chem. Phys., 2012, vol. 14, pp. 4125-4132.
German, et al., "Interfacial Nanobubbles Are Leaky: Permeability of the Gas/Water Interface," ACS Nano, vol. 8, No. 6, 2014, pp. 6193-6201.
Hampton, et al., "Nanobubbles and the nanobubble bridging capillary force," Advances in Colloid and Interface Science, vol. 154, 2010, pp. 30-55.
Han, et al., "Measuring and controlling the surface charge of ultra-fine bubbles," Particulate Systems Analysis Conference, Sep. 15-17, 2014, pp. 6.

Han, et al., "Effects of surface charge, micro-bubble size and particle size on removal efficiency of electro-flotation," Water Science & Technology, vol. 53, No. 7, 2006, pp. 127-132.
Janda, et al., "Nanobubbles at Solid-Liquid Interface," 44th Heyrovsky Discussion, Nanostructures on Electrodes, Jun. 26-30, 2011, pp. 2.
Janda, et al., "Nanobubble-assisted surface nanopatterning," 2nd International Conference on Nanotek and Expo, Dec. 3-5, 2012, p. 1.
Chiba, et al., "Fantastic Properties of Nano-bubbles," Presentation [online], retrieved from the internet: https://staff.aist.go.jp/m.taka/nano-bubble.pdf.
Jin, et al., "Direct measurement of the nanobubble-induced weak depletion attraction between a spherical particle and a flat surface in an aqueous solution," Soft Matter, Vo. 4, 2008, pp. 968-971.
Jin, et al., "Observation of Kinetic and Structural Scalings during Slow Coalescence of Nanobubbles in an Aqueous Solution," The Journal of Physical Chemistry, B Letters, 2007, pp. 4.
Kashiwa, et al., "Development of ultra high density nano-bubbles generation system by nanoGALF technology and its application to precision cleaning," Japan Multiphase Flow Society Annual Lecture Proceedings, 2012, pp. 2.
Kheir, et al., "Oxygen Gas-Filled Microparticles Provide Intravenous Oxygen Delivery," Sci. Transl. Med. vol. 4, 140ra88, 2012, pp. 10.
Kikuchi, et al., "Characteristics of hydrogen nanobubbles in solutions obtained with water electrolysis," Journal of Electroanalytical Chemistry, vol. 600, 2007, pp. 303-310.
Kikuchi, et al., "Stability and weight of oxygen nanobubbles obtained with water electrolysis," J. Colloid Interface Sci, vol. 329, 2009, p. 306.
Kim, et al., "Generation and measurement of fine bubble from mm to nm," Particulate Systems Analysis Conference, Sep. 15-17, 2014, pp. 8.
Liu, et al., "Cleaning of Protein-Coated Surfaces Using Nanobubbles: An Investigation Using a Quartz Crystal Microbalance," J. Phys. Chem. C, vol. 112, No. 43, 2008, pp. 16748-16753.
Liu, et al., "Improved Cleaning of Hydrophilic Protein-Coated Surfaces using the Combination of Nanobubbles and SDS," ACS Appl. Mater. Interfaces, vol. 1, No. 2, 2009, pp. 481-487.
Liu, "Nanobubbles: The Last Word in Cleaning?," ScienceWise, vol. 7, No. 2, 2010, pp. 4-5.
Wofsey, "Focus: The Little Bubbles that Could," Phys. Rev. Focus, vol. 19, No. 16, May 21, 2007, pp. 5.
Maeda, et al., "Improvement of the removal effect of contaminants on silicon wafer using high density ultrafine bubbles generated by ultrafineGALF," Particulate Systems Analysis Conference, Sep. 15-17, 2014, pp. 6.
Maeda, et al., "Measurement of nano-bubble generated by nanoGALF using three types of particle size measuring equipment," Japan Multiphase Flow Society Annual Lecture, 2011, pp. 2.
Maeda, et al., "Improvement of cesium cleaning effect using CO2 nano-bubbles generated by nanoGALF," Japan Multiphase Flow Society Annual Lecture, 2012, pp. 2.
Maeda, et al., "Using various particle-size measuring instruments to measure ultrafine bubbles and the resonant mass measurement method to distinguish bubbles from solid particles," Particulate Systems Analysis Conference, Sep. 15-17, 2014, pp. 6.
Mahrous, et al., "Experimental Investigation of the Operating Parameters Affecting Hydrogen Production Process through Alkaline Water Electrolysis," Int. J. of Thermal & Environmental Engineering, vol. 2, No. 2, 2011, pp. 113-116.
German, et al., "Controlling Nanoparticle Dynamics in Conical Nanopores," J. PHys. Chem. C vol. 117, 2013, pp. 703-711.
Nagai, et al., "Experimental Verification of Cleaning Effects and Mechanism by Using Ultrafine Bubble Water," Particulate Systems Analysis Conference, Sep. 15-17, 2014, pp. 6.
Nagai, et al., "Influences of Bubbles between Electrodes onto Efficiency of Alkaline Water Electrolysis," Proceedings of PSFVIP-4, Jun. 3-5, 2003, pp. 10.
Nanobubbles—a New Class of Structure Ready for Exploitation, Application Note, Nanosight Ltd., Apr. 27, 2010, pp. 2.

(56) References Cited

OTHER PUBLICATIONS

Ohgaki, et al., "Physicochemical approach to nanobubble solutions," Chemical Engineering Science, doi: 10.1016/j.ces.2009.10.003.
Chan, et al., "Collapse of Surface Nanobubbles," vol. 114, 114505, 2015, pp. 5.
Parmar, et al., "Microbubble generation and microbubble-aided transport process intensification—A state-of-the-art report," chem. Eng. Process, 2012, pp. 19.
International Patent Application No. PCT/US2015/048571, International Search Report and Written Opinion dated May 6, 2016, 23 pages.

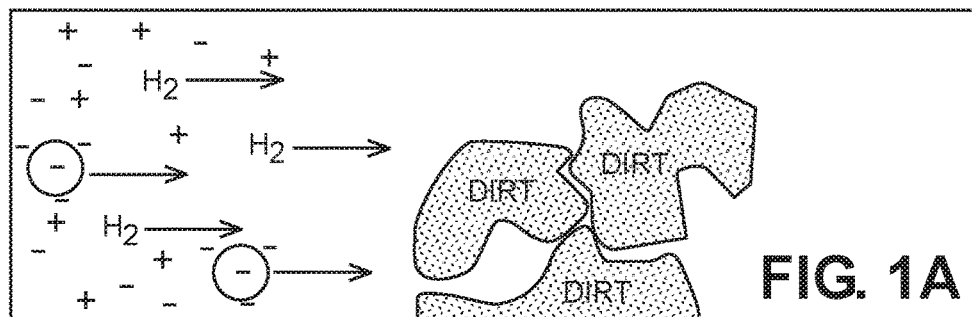
SUPERSATURATED $H_2$
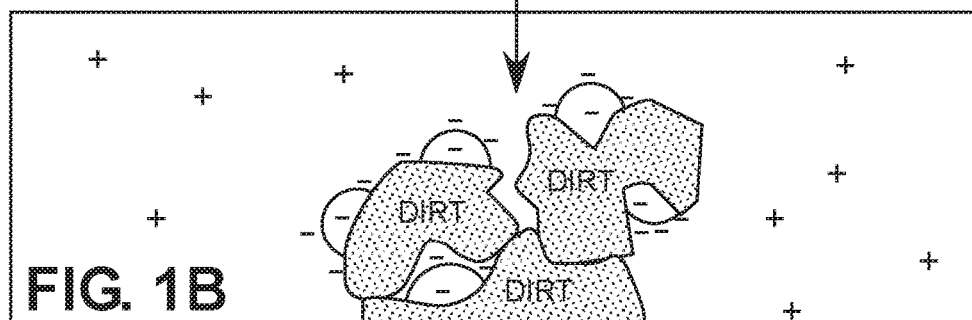
CHARGED BUBBLE COATING
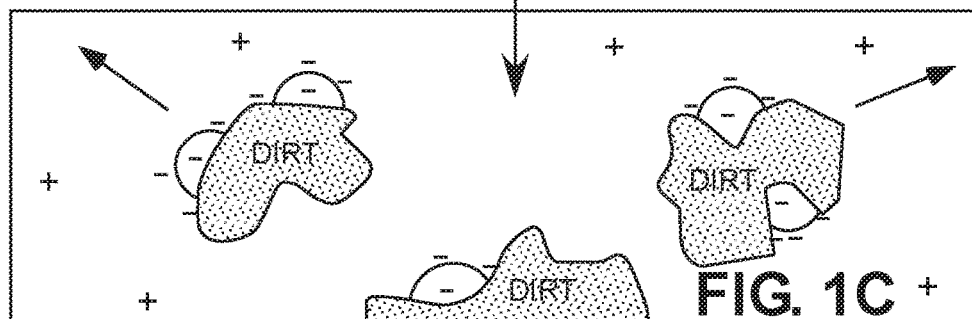
SEPARATION
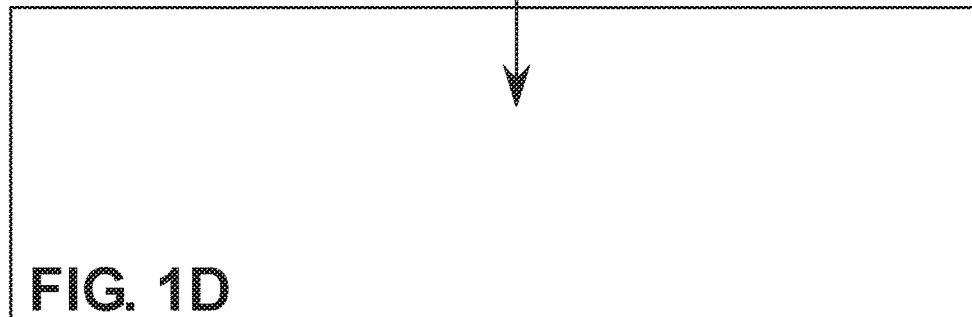
CLEANED

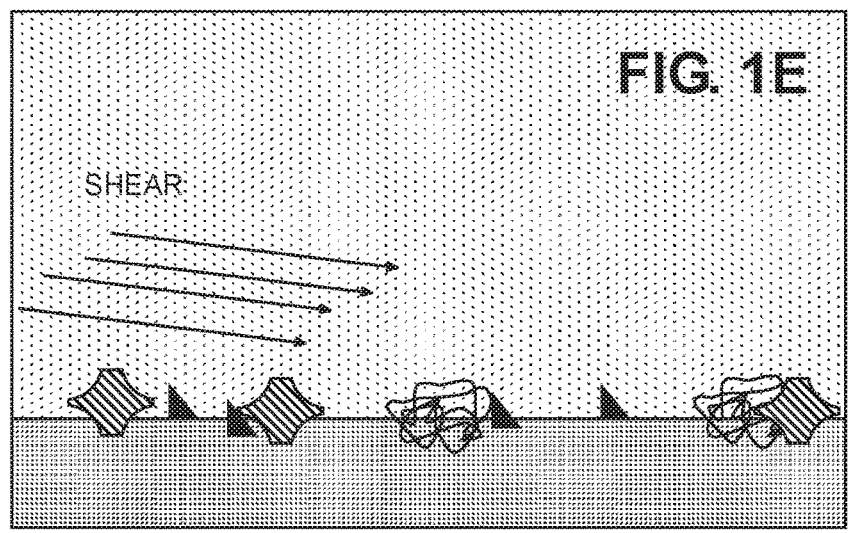
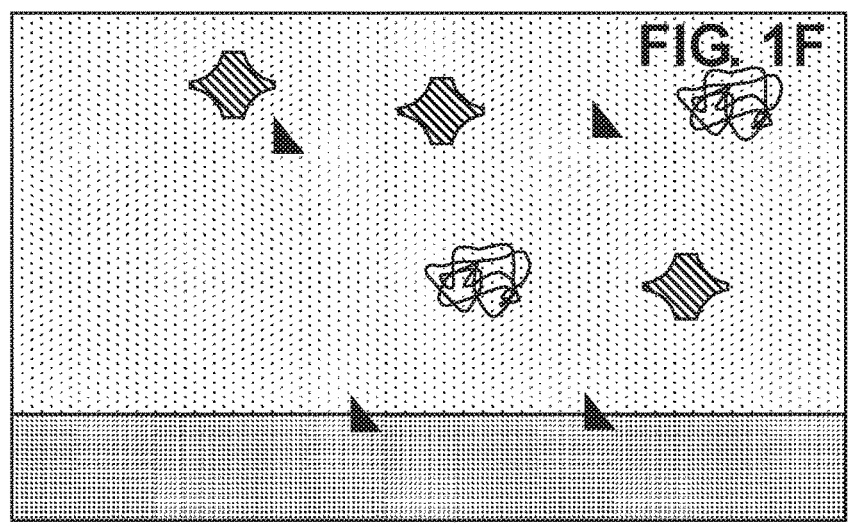
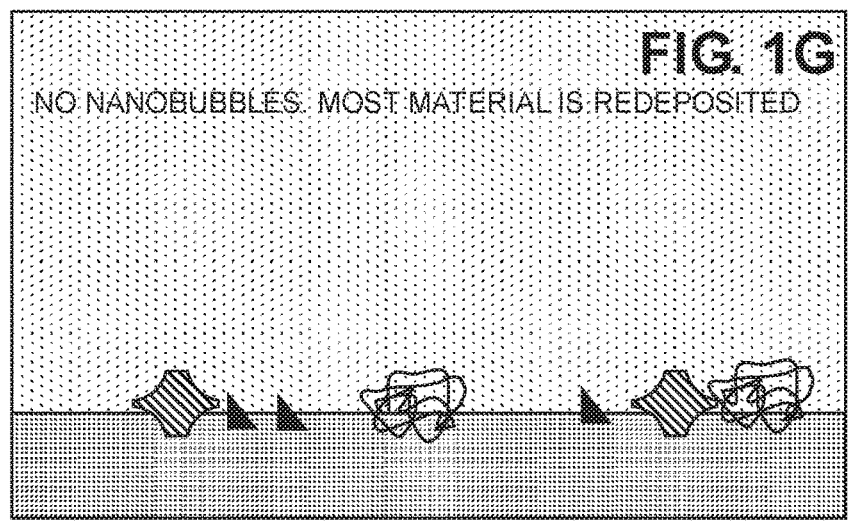

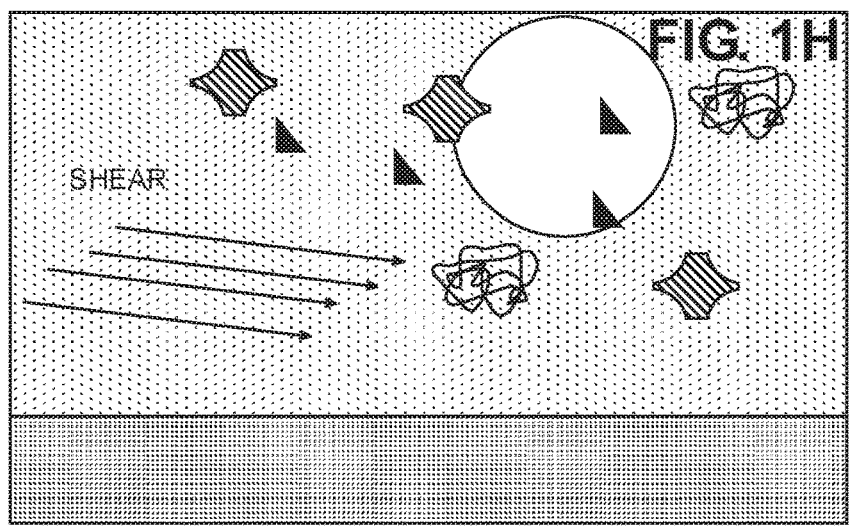
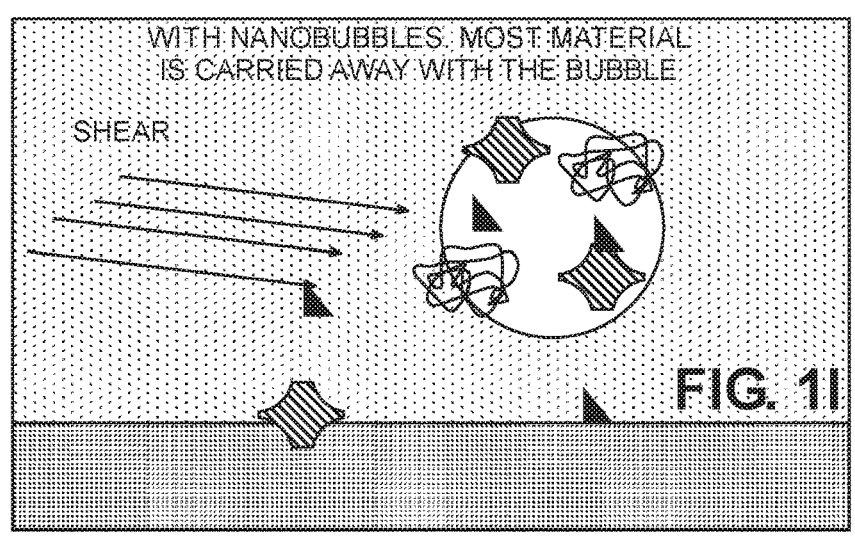
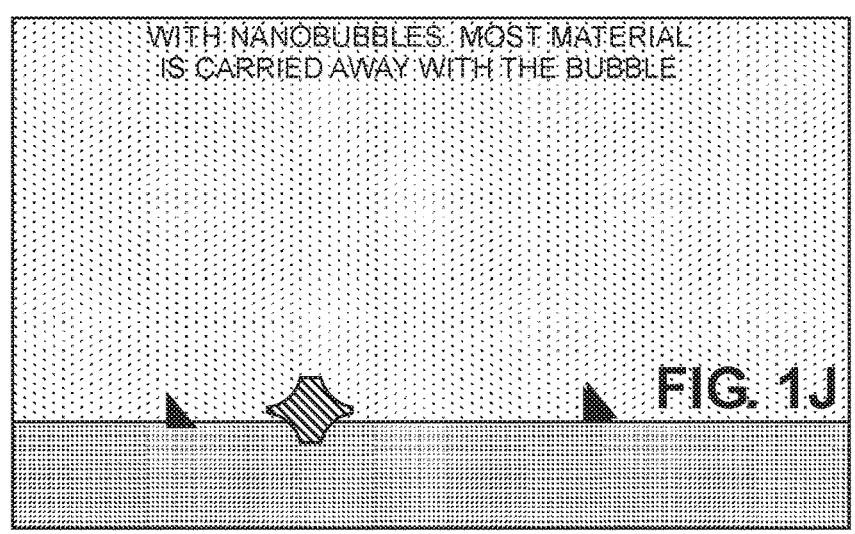

TABULATED RESULTS FROM 3 REPEAT
MEASUREMENTS ON EC-NANO SUB 450 nm SAMPLES

|  | TEST 1 | TEST 2 | TEST 3 | MEAN | STD ERROR |
|---|---|---|---|---|---|
| MODE (nm) | 85 | 83 | 86 | 84.67 | 6.58 |
| MEAN (nm) | 95.65 | 107.57 | 97.18 | 100.13 | 3.74 |
| AVERAGE PARTICLE/FRAME | 65.51 | 48.61 | 49.14 | 54.42 | 5.55 |
| EQUIVALENT PARTICLE CONCENTRATION (ES PARTICLES/ml) | 7.79 | 5.78 | 5.84 | 6.47 | 4.66 |

TABULATED RESULTS FROM 3 REPEAT
MEASUREMENTS ON EC-NANO SUB 20 nm SAMPLES

|  | TEST 1 | TEST 2 | TEST 3 | MEAN | STD ERROR |
|---|---|---|---|---|---|
| MODE (nm) | 137 | 56 | 104 | 99 | 23.52 |
| MEAN (nm) | 114.49 | 80.62 | 89.63 | 94.91 | 23.33 |
| AVERAGE PARTICLE/FRAME | 1.75 | 2.44 | 3.39 | 2.66 | 0.6 |
| EQUIVALENT PARTICLE CONCENTRATION (ES PARTICLES/ml) | 0.21 | 0.29 | 0.45 | 0.32 | 0.07 |

FIG. 19C

TABULATED RESULTS FROM 3 REPEAT MEASUREMENTS ON THE
CONTROL NaCl MilliQ WATER FILTERED USING A 450 nm MEMBRANE

|  | TEST 1 | TEST 2 | TEST 3 | MEAN | STD ERROR |
|---|---|---|---|---|---|
| MODE (nm) | 98 | 68 | 108 | 91.33 | 32.02 |
| MEAN (nm) | 120.61 | 111.21 | 97.48 | 133.3 | 7.81 |
| AVERAGE PARTICLE/FRAME | 4.72 | 2.09 | 7.00 | 2.45 | 4.55 |
| EQUIVALENT PARTICLE CONCENTRATION (ES PARTICLES/ml) | 0.54 | 0.37 | 0.56 | 0.43 | 0.07 |

FIG. 19D

| NANOBUBBLE RICH SOLUTION | | | | | | | | |
|---|---|---|---|---|---|---|---|---|
| | TIME | | | | | | | |
| STIRRING SPEED (rpm) | T0 | T1 | T2 | T3 | T4 | T5 | T6 | T7 |
| 0 | 2.0 nm | 0.9 nm | 0.8 nm | 0.8 nm | 0.8 nm | 0.8 nm | 0.8 nm | 0.8 nm |
| 100 | 2.0 nm | 0.9 nm | 0.75 nm | 0.75 nm | 0.75 nm | 0.75 nm | 0.75 nm | 0.75 nm |
| 200 | 2.0 nm | 0.8 nm | 0.6 nm | 0.5 nm | 0.5 nm | 0.5 nm | 0.5 nm | 0.5 nm |
| 300 | 2.0 nm | 0.5 nm | 0.3 nm | 0.3 nm | 0.3 nm | 0.3 nm | 0.3 nm | 0.3 nm |
| 400 | 2.0 nm | 0.25 nm | 0.10 nm | 0.10 nm | 0.10 nm | 0.10 nm | 0.10 nm | 0.10 nm |
| 500 | 2.0 nm | 0.25 nm | 0.20 nm | 0.10 nm | 0.10 nm | 0.10 nm | 0.10 nm | 0.10 nm |

FIG. 20A

| NaCl CONTROL SOLUTION | | | | | | | | |
|---|---|---|---|---|---|---|---|---|
| | TIME | | | | | | | |
| STIRRING SPEED (rpm) | T0 | T1 | T2 | T3 | T4 | T5 | T6 | T7 |
| 0 | 2.0 nm | 2.0 nm | 2.0 nm | 2.0 nm | 2.0 nm | 2.0 nm | 2.0 nm | 2.0 nm |
| 100 | 2.0 nm | 2.1 nm | 2.1 nm | 2.1 nm | 2.1 nm | 2.1 nm | 2.1 nm | 2.1 nm |
| 200 | 2.0 nm | 2.1 nm | 2.1 nm | 2.1 nm | 2.1 nm | 2.1 nm | 2.1 nm | 2.1 nm |
| 300 | 2.0 nm | 2.1 nm | 2.1 nm | 2.1 nm | 2.1 nm | 2.1 nm | 2.1 nm | 2.1 nm |
| 400 | 2.0 nm | 2.1 nm | 2.2 nm | 2.2 nm | 2.2 nm | 2.2 nm | 2.2 nm | 2.2 nm |
| 500 | 2.0 nm | 2.1 nm | 2.2 nm | 2.2 nm | 2.2 nm | 2.2 nm | 2.2 nm | 2.2 nm |

FIG. 20B

SYSTEMS AND METHODS FOR SUPPLYING TREATMENT LIQUIDS HAVING NANOBUBBLES

CROSS-REFERENCE TO RELATED APPLICATION

This application claims the benefit of U.S. Provisional Patent Application Nos. 62/046,745, filed Sep. 5, 2014, and 62/130,088, filed Mar. 9, 2015. The entire contents of both these applications are incorporated herein by reference.

FIELD

The present disclosure relates to cleaning and/or sanitizing systems and, more particularly, to systems and methods for supplying treatment liquids having nanobubbles.

BACKGROUND

A wide variety of systems are in use today for cleaning or disinfecting residential, industrial, commercial, hospital, food processing, and restaurant facilities, such as surfaces and other substrates, and for cleaning or disinfecting various items, such as food products or other articles.

For example, hard floor surface scrubbing machines are widely used to clean the floors of industrial and commercial buildings. They range in size from a small model, which is controlled by an operator walking behind it, to a large model, which is controlled by an operator riding on the machine or a machine that is autonomously guided. Such machines in general are wheeled vehicles with suitable operator controls. Their bodies contain power and drive elements, a solution tank to hold a cleaning liquid, and a recovery tank to hold soiled solution recovered from the floor being scrubbed. A scrub head, which contains one or more scrubbing brushes and associated drive elements is attached to the vehicle and may be located in front of, under or behind it. A solution distribution system dispenses cleaning liquid from the solution tank to the floor in the vicinity of the scrubbing brush or brushes.

Soft floor cleaning machines can be implemented as small mobile machines that are handled by an operator or can be implemented in a truck-mounted system having a cleaning wand connected to the truck. The truck carries a cleaning liquid solution tank, a wastewater recovery tank and a powerful vacuum extractor.

Typical cleaning liquids used in hard and soft floor cleaning systems include water and a chemically-based detergent. The detergent typically includes a solvent, a builder, and a surfactant. While these detergents increase cleaning effectiveness for a variety of different soil types, such as dirt and oils, these detergents also have a tendency to leave unwanted residue on the cleaned surface. Such residue can adversely affect the appearance of the surface and the tendency of the surface to re-soil and, depending on the detergent, can potentially cause adverse health or environment effects. Similar disadvantages apply to cleaning systems for other types of surfaces and items. Improved cleaning systems are desired for reducing the use of typical detergents and/or reducing the residue left on the surface after cleaning while maintaining desired cleaning and/or disinfecting properties, for example.

SUMMARY

In general, this disclosure is directed to devices, systems, and techniques for generating, supplying, and/or distributing liquids containing nanobubbles. In some examples, the described devices, systems, and techniques are embodied in a mobile floor cleaner configured to dispense nanobubble-containing liquid on a surface to be cleaned. For example, the mobile cleaner may include a moveable housing, a cleaning head operably supported by the moveable housing, and a source of nanobubble-containing liquid. In different configurations, the source of nanobubble-containing liquid may be an onboard nanobubble generator configured to generate nanobubble-containing liquid during operation of the mobile floor cleaner and/or a reservoir configured to receive and carry nanobubble-containing liquid supplied from an off-board source. In either configuration, the nanobubble-containing liquid supplied by the mobile floor cleaner can be specifically tailored to provide a combination of properties identified to be efficacious for the cleaning the types of soils expected on the surfaces intended to be cleaned by the mobile floor cleaner.

A variety of different nanobubble generators can be used to generate the nanobubble-containing liquid supplied by the mobile floor cleaner. In one example, the nanobubble generator includes an electrolysis cell. The electrolysis cell is supplied with a feed liquid and an electrical current, causing the electrolysis cell to electrochemically activate the feed liquid and generate nanobubbles therein. In another example, the nanobubble generator includes a mechanical device that intermixes a feed liquid with a gas to generate nanobubbles therein. For example, mechanical device may be implemented as a nozzle that receives the feed liquid and the gas and causes a shear force to be applied to the gas. The shear force causes the gas to breakdown into nano-sized bubbles distributed throughout the feed liquid.

Independent of the type of nanobubble generator(s) used, the nanobubble generator can be located onboard or off-board from the mobile floor cleaner. In the onboard configuration, the mobile floor cleaner can carry a source of feed liquid devoid of nanobubbles or having a reduced concentration of nanobubbles as well as a nanobubble generator on or within the moveable housing of the cleaner. During operation of the mobile floor cleaner, liquid can be supplied from the feed liquid source to the nanobubble generator and the nanobubble generator can generate nanobubbles in the feed liquid so as to produce a nanobubble-containing source. In the off-board configuration, the mobile floor cleaner can include a reservoir configured to receive and carry nanobubble-containing liquid. The mobile floor cleaner can be part of a system that also includes a separate, off-board nanobubble generator station. In use, the off-board nanobubble generator station can operate to generate nanobubble-containing liquid. The reservoir carried by the mobile floor cleaner can be filled with nanobubble-containing liquid supplied from the off-board nanobubble generator station. This can allow the mobile floor cleaner to carry nanobubble enriched fluid and dispense the nanobubble enriched liquid during a cleaning operation.

An aspect of the present disclosure is directed to a method for cleaning a surface. The method includes: passing a feed liquid from a liquid source to an electrolysis cell; inducing a current through the electrolysis cell to electrochemically activate the feed liquid in the electrolysis cell to provide an electrochemically-activated liquid having a concentration of nanobubbles having a diameter of 10 nm to 450 nm of at least $1 \times 10^6$; and dispensing at least one portion of the electrochemically-activated liquid to the surface.

In one aspect, the electrochemically-activated liquid comprises a concentration of nanobubbles having a diameter of 15 nm to 200 nm of at least $1 \times 10^6$.

In one aspect, the electrochemically-activated liquid comprises a concentration of nanobubbles having a diameter of 20 nm to 225 nm of at least $1\times10^6$.

In one aspect, the electrochemically-activated liquid comprises a concentration of nanobubbles having a diameter of 20 nm to 225 nm of at least $1\times10^8$ and a Zeta potential of −10 to −100.

In one aspect, the electrochemically-activated liquid comprises a concentration of nanobubbles having a diameter of 10 nm to 450 nm of at least $1\times10^6$ and a Zeta potential of +60 to −110.

In one aspect, the electrochemically-activated liquid comprises a concentration of nanobubbles having a diameter of 15 nm to 200 nm of $1\times10^6$ to $1\times10^8$ and a Zeta potential of +0 to −105.

In one aspect, the electrochemically-activated liquid comprises a concentration of nanobubbles having a diameter of 20 nm to 225 nm of $1\times10^6$ to $1\times10^{20}$ and a Zeta potential of −10 to −100.

In one aspect, the method further comprises: pumping feed liquid through the electrolysis cell using an electromechanical pump; and controlling operation of the electromechanical pump and the electrolysis cell with a control circuit, the control circuit being configured to control a flow rate of the feed liquid through the electrolysis cell and a current drawn by the electrolysis cell such that the electrochemically-activated liquid comprises a concentration of at least $1\times10^6$ of nanobubbles having a diameter of 10 nm to 450 nm when the feed liquid comprises a Reference Solution, wherein the Reference Solution, prior to electrolysis, comprises the following properties:

the Reference Solution comprises Deionized Water (ASTM D1193-91, Type II) and a sufficient amount of Analytical Reagent (AR) grade NaCl to achieve a conductivity of 250 μS, and filtered with a 20 nm filter;
temperature at 21-25° C. (69.9-77.0° F.);
Zeta Potential (ζ) of −5 to −25;
nanoparticle concentration under 1 E+6/ml; and
electrolyzed by the electrolysis cell within one hour of creating the Reference Solution.

In one aspect, the method further comprises, after dispensing the electrochemically-activated liquid to the surface:
scrubbing the surface dispensed electrochemically-activated liquid; and
recovering at least a portion of the dispensed electrochemically-activated liquid from the surface.

Another aspect of the present disclosure is directed to a cleaning system comprising:
a liquid source configured to provide a feed liquid;
an electrolysis cell configured to receive the feed liquid and to electrochemically activate the feed liquid to provide an electrochemically-activated liquid;
a control circuit, which is configured to control a flow rate of the feed liquid through the electrolysis cell and a current drawn by the electrolysis cell such that the electrochemically activated liquid comprises a concentration of at least $1\times10^6$ of nanobubbles having a diameter of 10 nm to 450 nm when the feed liquid comprises a Reference Solution, wherein the Reference Solution, prior to electrolysis, comprises the following properties:
deionized water (ASTM D1193-91, Type II) and a sufficient amount of an Analytical Reagent (AR) grade NaCl to achieve a conductivity of 2500, and filtered with a 20 nm filter;
temperature at 21-25° C. (69.9-77.0° F.);
Zeta Potential (ζ) of −5 to −65;
nanoparticle concentration under 1 E+6/ml; and
electrolyzed by the electrolysis cell within one hour of creating the Reference Solution; and
a dispenser configured to dispense the electrochemically-activated liquid.

In one aspect, the control circuit is configured such that, when the feed liquid comprises the Reference Solution, the electrochemically-activated liquid comprises a concentration of nanobubbles having a diameter of 15 nm to 200 nm of at least $1\times10^6$.

In one aspect, the control circuit is configured such that, when the feed liquid comprises the Reference Solution, the electrochemically-activated liquid comprises a concentration of nanobubbles having a diameter of 20 nm to 225 nm of at least $1\times10^6$.

In one aspect, the control circuit is configured such that, when the feed liquid comprises the Reference Solution, the electrochemically-activated liquid comprises a concentration of nanobubbles having a diameter of 20 nm to 225 nm of at least $1\times10^8$ and a Zeta potential of −10 to −100.

In one aspect, the control circuit is configured such that, when the feed liquid comprises the Reference Solution, the electrochemically-activated liquid comprises a concentration of nanobubbles having a diameter of 10 nm to 450 nm of at least $1\times10^6$ and a Zeta potential of +60 to −110.

In one aspect, the control circuit is configured such that, when the feed liquid comprises the Reference Solution, the electrochemically-activated liquid comprises a concentration of nanobubbles having a diameter of 15 nm to 200 nm of $1\times10^6$ to $1\times10^8$ and a Zeta potential of +0 to −105.

In one aspect, the control circuit is configured such that, when the feed liquid comprises the Reference Solution, the electrochemically-activated liquid comprises a concentration of nanobubbles having a diameter of 20 nm to 225 nm of $1\times10^6$ to $1\times10^{20}$ and a Zeta potential of −10 to −100.

In one aspect, the cleaning system further comprises an electro-mechanical pump to pump the feed liquid from the liquid source to the electrolysis cell, the control circuit being configured to control the pump.

In one aspect, the cleaning system further comprises a motorized scrub head configured to scrub the surface, wherein the dispenser dispenses the electrochemically-activated liquid within the scrub head; and a recovery device configured to recover at least a portion of the dispensed electrochemically-activated liquid from the surface.

In another aspect, a mobile floor cleaner is described that includes a moveable housing, a cleaning head, and a nanobubble source. The cleaning head is operably supported by the moveable housing. The nanobubble source is carried on the moveable housing and is configured to deliver a cleaning liquid containing nanobubbles to a surface to be cleaned, as the moveable housing travels over the surface.

In another aspect, a mobile floor cleaner system is described that includes a mobile floor cleaner and an off-board nanobubble generator. The mobile floor cleaner includes a moveable housing, a cleaning head, and a reservoir. The cleaning head is operably supported by the moveable housing. The reservoir is carried by the moveable housing and holds cleaning liquid containing nanobubbles. The mobile floor cleaner is configured to deliver the cleaning liquid containing nanobubbles to a surface to be cleaned, as the moveable housing travels over the surface to be cleaned. In addition, the off-board nanobubble generator is configured to receive a feed liquid, generate the cleaning liquid containing nanobubbles therefrom, and fill the reservoir with the cleaning liquid.

BRIEF DESCRIPTION OF THE DRAWINGS

FIGS. 1A-1D are diagrams illustrating an example dirt cleaning mechanism that may be performed by a liquid containing nanobubbles according to the disclosure.

FIGS. 1E-1J are diagrams illustrating another example of a dirt cleaning mechanism that may be performed by a liquid containing nanobubbles according to the disclosure.

FIG. 19A is a graph that illustrates the nanobubble size and concentration of within each of the three test liquids.

FIG. 19B-19D are tables that illustrate tabulated nanobubble concentration and size results from repeat measurements made on the three test liquids, respectively.

FIGS. 20A and 20B are tables that illustrate tabulated cleaning efficacy results from two test liquids, respectively.

DETAILED DESCRIPTION

1. Introduction

Figure 2:
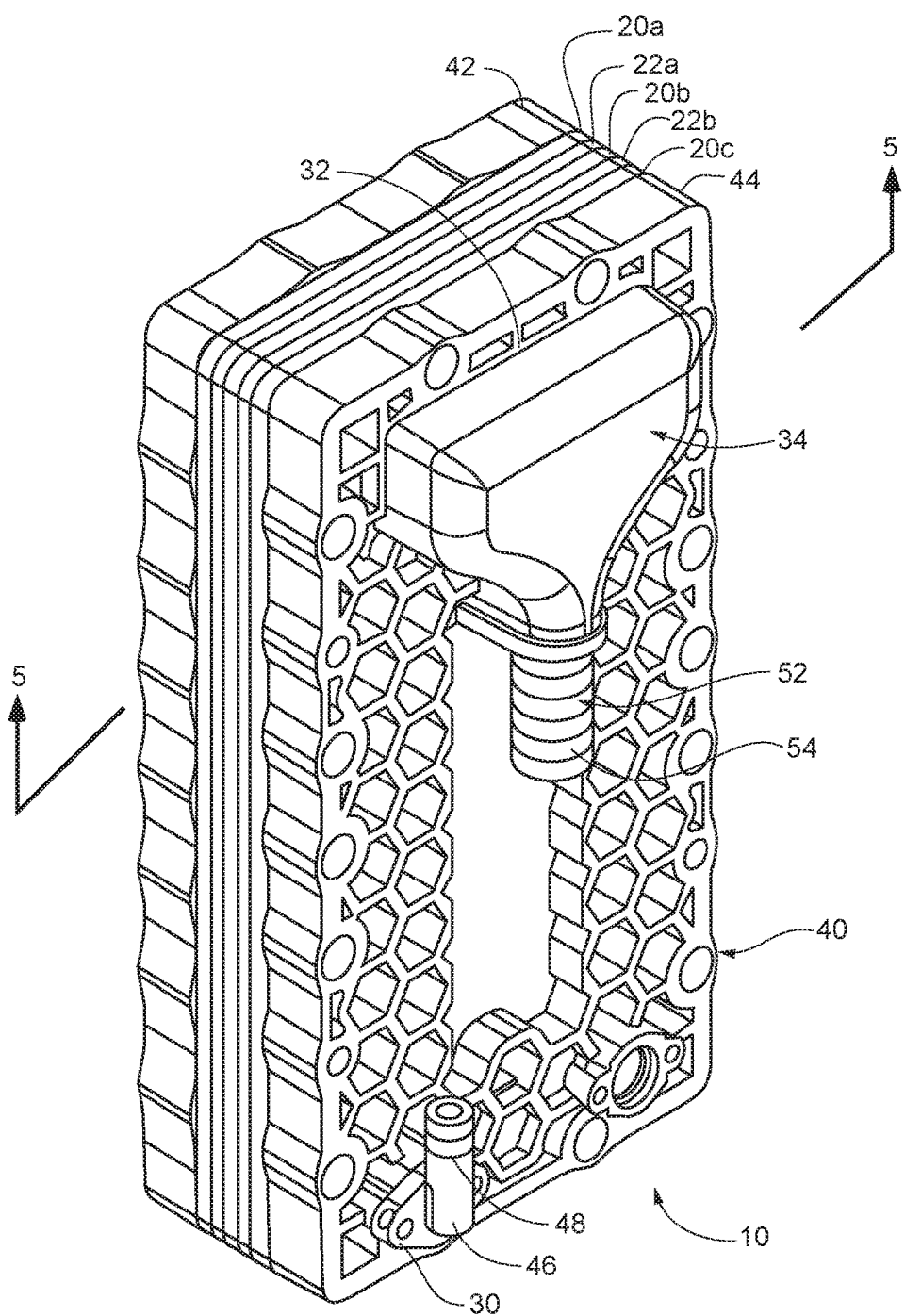
FIG. 2 is a perspective view of an electrolytic cell according to an exemplary aspect of the present disclosure.

The present disclosure is generally directed to devices, systems, and techniques for generating, supplying, and/or distributing cleaning liquid for cleaning surfaces. As discussed in greater detail below, an example system includes a mobile cleaning device and a nanobubble generator configured to generate a cleaning liquid having nanobubbles. The nanobubble generator can be physically installed on and movable with the mobile cleaning device, allowing cleaning liquid containing nanobubbles to be generated in situ and/or concurrent with movement of the mobile cleaning device. Additionally or alternatively, the nanobubble generator can be installed in a cleaning liquid supply device physically separate from the mobile cleaning device. In this latter application, the cleaning liquid supply device can generate cleaning liquid containing nanobubbles. The cleaning liquid containing nanobubbles can be supplied from the cleaning liquid supply device to a cleaning liquid reservoir carried by the mobile cleaning device, for example by docking the mobile cleaning device at a cleaning liquid supply station. Once supplied with cleaning liquid containing nanobubbles, the mobile cleaning device can move to a location targeted for cleaning and perform a cleaning operation using the cleaning liquid carried by the mobile cleaning device.

Independent of whether the nanobubble generator is implemented onboard or off-board the mobile cleaning device, the nanobubble generator can generate cleaning liquid having specific nanobubble characteristics. The inventors of the present application have discovered that, in some applications, controlling specific properties of the feed liquid used to generate the nanobubble-containing cleaning liquid and/or specific properties of the resultant nanobubble-containing cleaning liquid can provide a cleaning liquid having unexpectedly good cleaning efficacy. For example, controlling the size of the bubbles in the cleaning liquid, the concentration of the bubbles in the cleaning liquid, the electrical charge associated with the bubbles in the cleaning liquid, the amount of dissolved gas in the cleaning liquid, and/or the composition of the gas in the feed liquid used to generate the cleaning liquid can produce a cleaning liquid with especially good cleaning efficacy.

Without wishing to be bound by any particular theory, it is believed that the characteristics of the bubbles in the cleaning solution impact how well the cleaning fluid containing the bubbles removes target soils of interest. For example, it has been identified that bulk-type bubbles in the cleaning liquid of a particular size range (e.g., diameter), as compared to bubbles outside the size range, may perform the majority of "work" in removing dirt particles from the surface being cleaned and/or maintaining the removed dirt particles in suspension within the cleaning liquid, thereby inhibiting re-deposition onto the surface being cleaned. As another example, it has been identified that the charge associated with the bubbles, in some applications, influences the affinity of the bubbles to soils targeted for cleaning and, correspondingly, the ability of the cleaning fluid containing the bubbles to remove the soils. As still another example, it has been identified that the amount of dissolved gas in the cleaning liquid containing the nanobubbles, in some situations, impacts the dimensional stability of the nanobubbles which, in turn impacts the cleaning efficacy of the cleaning liquid.

In practice, the mechanics of how bubbles assist with removing soil from surfaces being cleaned are believed to be complex. Factors such as the amount and rate of gaseous transport to the surface containing the soil, the affinity of the bubbles to the soil, and/or the amount and direction of force released during bubble collapse may all affect the cleaning efficacy of a cleaning liquid containing bubbles. For these reasons, the characteristics of the bubbles in the cleaning liquid are believed, in some applications, to dictate the cleaning effectiveness of the liquid containing the bubbles.

As discussed below, different types of nanobubble generators can be used to generate cleaning liquids having desired nanobubble characteristics. In one example, a system may incorporate an electrolysis cell that electrochemically activates a feed liquid (e.g., water) to generate a cleaning liquid having nanobubbles with particular characteristics that assist in the cleaning process. In another example, a system may incorporate a mechanical nanobubble generator (e.g., nozzle) that physically intermixes a feed liquid with a gas (e.g., by applying a shearing force) without applying electricity to the feed liquid to generate a cleaning liquid having nanobubbles with particular characteristics. In still another example, a system may incorporate a transducer (e.g., ultrasonic transducer) that generates nanobubbles by application of high frequency acoustic waves to the feed liquid.

In either example, the nanobubble generator may generate a cleaning liquid having a threshold concentration of nanobubbles within a predetermined size range and/or within a predetermined charge range. When combined with a mobile cleaning device, the mobile cleaning device can dispense the cleaning liquid containing the nanobubbles on a surface to be cleaned, allowing the nanobubbles to interact with any soil that may be present on such surface. The nanobubbles may be attracted to and/or dislodge contaminants (e.g., dirt) on the surface, helping to clean and/or sanitize the surface.

2. Definitions

As used in the present application, the term "bulk-type nanobubble" is defined as a nanoscopic gaseous domain less than 1.0 µm or 1000 nm in diameter. Bulk-type nanobubbles may be spherical in shape, mobile, and suspended in an aqueous environment/solution at ambient temperatures. Bulk-type nanobubbles can have a charged surface due to accumulation of salt from an aqueous solvent. Such nanobubbles are gas-filled and may be stable for minutes to hours, and in controlled conditions may be stable for days or longer.

The term "soil" refers to a contaminate deposited on a surface to be cleaned. The soil may be composed of organic and/or inorganic solid material and is typically particulate in nature (e.g., agglomerated particulate). For example, the soil may include dirt, clay, food particulate, moisture, greasy residue, soot, etc. In some applications, the soil includes hydrophilic molecules that attract and retain moisture. Additionally or alternatively, the soil may contain hydrophobic molecules, such as oil, grease, tar, bitumens, asphalts, or other hydrocarbons.

While the characteristics of a particular soil targeted for cleaning can vary, in some examples, a soil contains from 40 weight percent to 90 weight percent water-insoluble components with a balance weight percentage of other constituent components. Example water-insoluble components include clay, sand, quartz, silica, limestone, environmental dust, and/or organic plant matter. Other constituent components may include protein components (e.g., mammalian fibers, substances, and dander), oleaginous components (e.g., tar, asphalt, animal fat/oil, and vegetable oil), water-soluble components (e.g., sugar, starch, salt), moisture, and other components. In some examples, a soil contains from 50 to 85 weight percent water-insoluble components (e.g., 60 to 75 wt %), from 5 to 20 weight percent protein components (e.g., 8 to 15 wt %), from 5 to 20 weight percent oleaginous components (e.g., 7 to 13 wt %), from 1 to 10 weight percent water-soluble components, and from 0.5 to 5 weight percent water (e.g., from 2 to 4 wt %).

The term "hard surface" refers to a solid, substantially non-flexible surface such as a floor, counter top, wall, panel, window, or furniture surface. In the case of a floor, the hard surface may be formed of various materials, such as polished concrete, porous concrete, tile, marble, terrazzo, wood, vinyl, laminate, Formica, and the like. Depending on the material used, the hard surface may have cracks between adjacent structures forming the surface, such as cracks between tiles forming tiled surfaces, cracks and crevices in marble, clay, concrete, or synthetic material flooring, and surface interstices in many different types of floors. The cracks may be void or may be filled with a different material (e.g., grout, epoxy, caulk) than the material forming the majority of the hard surface. The hard surface may or may not have surface texture providing discontinuities that can help trap and retain soil. In addition, the hard surface may or may not be coated with an aesthetic and/or protective coating, such as an acrylic, epoxy, or urethane coating.

The term "soft surface" refers to a pervious cleanable substrate, for example materials made from woven, nonwoven or knit textiles, leather, including fabrics (for example draperies, bed linens), carpet, transportation vehicle seating and interior components and the like.

Nanoparticles are defined as nanoscopic non-gaseous domains less than 1.0 µm or 1000 nm in diameter. They are often not spherical in shape. They are mobile and suspended in an aqueous environment/solution at ambient temperatures. In this application they may be thought of as background debris.

3. Dirt, and Cleaning with Bulk Type Nanobubbles

The following discussion as with the other example discussions herein is provided as an example only and not intended to limit the present disclosure, operation of examples described herein and/or the scope of any issued claims appended hereto.

3.1 Example of Basic Concepts

Dirt, which may also be referred to as soil, generally comprises mixtures of dried-on previously-soluble matter, oily material and/or insoluble particles, for example. Generally dirt has a greater affinity for more dirt than it has for water.

In the example of a hard floor scrubber, the mechanical scrubbing action of the scrubber brushes remove dirt from the surface being cleaned. The addition of cleaning liquid containing nanobubbles in accordance with the present disclosure may assist the cleaning operation in at least two ways: by removing the dirt from the surface; and by inhibiting re-deposition of the dirt onto the surface being cleaned. To remove and/or suspend dirt, the affinity between dirt particles and other dirt particles, and between the dirt particles and the surface being cleaned, should be reduced and the affinity of dirt particles for the cleaning liquid (e.g., water) should be increased. Cleaning liquid containing nanobubbles can assist in this dirt removal and/or suspension process.

FIGS. 1A-1D illustrate one example cleaning mechanism that may be performed by a cleaning liquid containing nanobubbles. In the mechanism of FIGS. 1A-1D, nanobubbles directly interact with the surface being cleaned. Shear forces between the nanobubbles and soil deposited on the surface being cleaned cause the soil to release from the surface. This allows the released soil to be entrained in the cleaning liquid and extracted from the surface.

With reference to FIG. 1A, a dirt deposit is illustrated on a surface to be cleaned along with a cleaning liquid containing nanobubbles generated by a nanobubble generator. In the case of an electrolysis process, some nanobubbles are created at the electrode surfaces as well as between electrodes and then slowly dissipate within the liquid being treated by the electrolysis cell. Other nanobubbles are created at the dirt surface from the supersaturated electrochemically-activated (EA) water solution that is dispensed from the electrolysis cell to the surface. In the case of a mechanical nanobubble generator, nanobubbles may be created when sufficient shear force is applied to a liquid containing gas and/or a liquid intermixed with gas. In either case, nanobubbles from the cleaning liquid can contact the dirt deposit. The nanobubbles can exist for significant periods of time both in the aqueous solution and at submerged solid/liquid surfaces.

As shown in FIG. 1B, the nanobubbles can contact the dirt deposit to form nanobubble-dirt deposit interfaces. The nanobubbles may tend to form and stick to hydrophobic surfaces, such as those that are found on typical dirt particles. Typically, this process is energetically favored because the attachment of the gas bubbles releases water molecules from the high energy water/hydrophobic surface interface with a favorable negative free energy change. Also, as the bubbles contact the surface, the bubbles may spread out and flatten, which reduces the bubbles' curvatures; giving additional favorable free energy release. In some instances, the nanobubbles may alternatively stay in suspension and not stick to surfaces.

The presence of nanobubbles on the surface of dirt particles may increase the pick-up of the particle by larger micron-plus sized gas bubbles, possibly introduced by mechanical cleaning/wiping action and/or the prior electrolytic sparging process, as shown in FIG. 1C. The presence of surface nanobubbles may also reduce the size of the dirt particle that can be picked up by this action.

Such pick-up helps float away the dirt particles from the surfaces being cleaned and inhibits re-deposition, as shown in FIG. 1D.

FIGS. 1E-1J illustrate another example cleaning mechanism that may be performed by a cleaning liquid containing nanobubbles. FIGS. 1E-1G first illustrate an example comparative cleaning process performed in the absence of nanobubbles. As shown in FIG. 1E, a shear force is applied to a dirt deposit on a surface to be cleaned along with a cleaning liquid that does not contain nanobubbles. The shear force may be generated, for example, by a mechanical scrubbing action or dispensing of pressurized cleaning liquid. FIG. 1F shows that the soil present on the surface to be cleaned is released by the shear force. As shown in FIG. 1G, however, most of the soil released by the shear force is not carried away in the cleaning liquid. Instead, a substantial amount of the soil re-deposits on the surface being cleaned as the shear force applied to the surface dissipates, such as during a residence time between when a mechanical scrubber passes over the surface being cleaned and a trailing vacuum extraction unit subsequently passes over the surface.

FIGS. 1H-1J illustrate the cleaning mechanism of FIGS. 1E-1G performed with a cleaning liquid containing nanobubbles instead of a cleaning liquid without nanobubbles. In the mechanism of FIGS. 1E-1J, nanobubbles interact with soil released via shear force from the surface being cleaned and help prevent reabsorption/re-deposition of the soil on the surface. For example, as shown in FIG. 1H, a shear force is applied to a dirt deposit on a surface to be cleaned along with a cleaning liquid that contains nanobubbles. The shear force may be generated, for example, by a mechanical scrubbing action or dispensing of pressurized cleaning liquid. FIG. 1I shows that the soil present on the surface to be cleaned is released by the shear force and physically attracted to/bonded with nanobubbles present in the cleaning liquid. For example, small bubbles may aggregate around the external surface of a soil particle forming a micelle analogue. Alternatively, soil particle may be encapsulated within a nanobubble. In either case, the nanobubble may prevent reabsorption of the soil to the surface being cleaned. As a result, the soil may be removed from the surface as cleaning fluid dispensed on the surface is removed with a fluid extraction unit. This reduces or eliminates residual soil from the surface being cleaned, as shown in FIG. 1J.

The mechanics of how bubbles assist with removing soil from surfaces being cleaned are believed to be complex. Accordingly, in practice, a cleaning liquid containing nanobubbles according to the disclosure may function through both the cleaning mechanism illustrated in FIGS. 1A-1D and the cleaning mechanism illustrated in FIGS. 1H-1J. In some examples, the characteristics of the nanobubbles generated to produce a cleaning liquid according to the disclosure may be tailored to take advantage of one or both cleaning mechanisms described with respect to FIG. 1.

3.2 Nanobubble Sizes

To help remove dirt and prevent dirt re-deposition according to the mechanisms illustrated in FIGS. 1A-1D and FIGS. 1H-1J (or another mechanism), a cleaning liquid containing nanobubbles may be used according to the disclosure. In general, the smaller the diameter of a nanobubble, the greater the surface area and the greater the velocity of the nanobubble in the liquid solution due to Brownian motion. It has been discovered that, in some applications, the majority of the work in removing dirt particles from the surface or inhibiting re-deposition is done by comparatively smaller diameter nanobubbles. For example, it has been identified that, in some applications, the majority of the dirt removal work performed by a nanobubble-containing cleaning liquid is performed by nanobubbles having a diameter less than 500 nanometers (nm) (e.g., from 20 nm to 450 nm), with nanobubbles outside of this size range performing comparatively little cleaning work. Accordingly, some example systems according to the disclosure utilize a nanobubble generator configured to maximize the concentration of nanobubbles within this size range found to be especially effective at cleaning dirt. For example, in the case of a nanobubble generator that utilizes an electrolysis cell, the electrolysis cell and surrounding equipment may be configured and operated to maximize the concentration of nanobubbles within this range within the electrolyzed cleaning liquid. Similarly, for other types of nanobubble generators (e.g., mechanical shear, ultrasonication), the generators may be configured to produce nanobubbles having a size range found effective to clean targeted soils.

Nanobubbles are generally characterized as having a large gas-liquid surface area relative to their volume. Water molecules at this gas-liquid interface are held by fewer hydrogen bonds, as recognized by water's high surface tension. Due to this reduction in hydrogen bonding to other water molecules, water molecules near the gas-liquid interface may be more reactive than water molecules farther away from the interface, which experience larger hydrogen bonding forces.

Accordingly, the water molecules in close proximity to the gas-liquid interface may hydrogen bond to other molecules more rapidly, showing faster hydration. As a result, cleaning liquid containing nanobubbles that is created and dispensed to the surface being cleaned may have enhanced cleaning properties as compared to cleaning liquid substantially or entirely devoid of nanobubbles.

The sizes of the gas-phase bubbles may vary depending on a variety of factors, such as the pressure applied to the feed water, the temperature of the feed water, the dissolved gas content of the feed water, the composition of the salts and other compounds in the feed water, and the characteristics of the electricity used to generate the nanobubbles (in applications where an electrolysis cell is used). Accordingly, the gas-phase bubbles may have a variety of different sizes. In some applications, different size bubbles may interact with different types and/or sizes of soils to prevent re-deposition of a soil on a surface being cleaned. For example, the bubbles may prevent re-deposition of a soil for a period of time between when a shear force is applied to the soil (e.g., using mechanical scrubbing action in combination with nanobubble cleaning liquid) and when a vacuum pickup unit is subsequently passed over the surface previously containing the soil. With some systems, this time period may range from 1 second to 10 seconds, such as 2 seconds to 5 seconds.

In the embodiments in which gas-phase nanobubbles are generated, the gas contained in the nanobubbles is also believed to be stable for substantial durations in the feed water, despite their small diameters. While not wishing to be bound by theory, it is believed that the surface tension of the water, at the gas/liquid interface, drops when curved surfaces of the gas bubbles approach molecular dimensions. This reduces the natural tendency of the nanobubbles to dissipate.

Upon being applied to a surface being cleaned, gas-phase nanobubbles may attach to dirt particles, thereby transferring their ionic charges. The nanobubbles may stick to hydrophobic surfaces, which are typically found on typical dirt particles, releasing water molecules from the high energy water/hydrophobic surface interface with a favorable negative free energy change. Additionally, the nanobubbles may spread out and flatten on contact with the hydrophobic surface, thereby reducing the curvatures of the nanobubbles with consequential lowering of the internal pressure caused by the surface tension. This provides additional favorable free energy release. The charged and coated dirt particles are then more easily separated one from another due to repulsion between similar charges, and the dirt particles enter the solution as colloidal particles.

The presence of surface nanobubbles may also reduce the size of the dirt particle that can be picked up by this action. Such pickup assists in the removal of the dirt particles from floor surfaces and prevents re-deposition. Moreover, due to the large gas-liquid surface area-to-volume ratios that are attained with gas-phase nanobubbles, water molecules located at this interface are held by fewer hydrogen bonds, as recognized by water's high surface tension. Due to this reduction in hydrogen bonding to other water molecules, this interface water may be more reactive than normal water and will hydrogen bond to other molecules more rapidly, thereby showing faster hydration.

The nanobubble generator and surrounding equipment may thus be configured and operated to maximize the concentration of nanobubbles within particular size, concentration, and/or charge ranges so as to maximize the cleaning efficacy of the cleaning liquid. While specific ranges can vary based on a variety of factors, such as the configuration of the nanobubble generator and the characteristics of the target soil/surface intended for cleaning, the ranges have been found, in some applications, to be particularly effective for cleaning a substrate surface.

3.2.1 Feed Liquid—Use of a "Reference Solution"

In some instances, the characteristics of the nanobubbles generated in a cleaning liquid will vary depending on the characteristics of the feed liquid supplied to the nanobubble generator. For example, the temperature of the feed liquid, the concentration and composition of dissolved gas in the feed liquid, and/or the concentration and composition of salts in the feed liquid can affect the characteristics of the nanobubbles produced using a nanobubble generator supplied with such feed liquid. For these and other reasons, it can be convenient to define a "Reference Solution" for benchmarking performance of a nanogenerator and the cleaning solution produced therefrom. As will be appreciated by those of ordinary skill in the art, a reference solution having any suitable characteristics can be used, and the properties of the foregoing "Reference Solution" are merely one example provided for purposes of discussion.

In practice, a nanobubble generator according to the disclosure can be supplied with any suitable feed liquid. Typically, the feed liquid will be an aqueous liquid, such as regular tap water provided from a pressurized municipal water main. In some applications, the feed liquid includes water substantially or entirely devoid of surfactants, detergents, and chemical cleaning agents, such as those typically found in aqueous cleaning solutions that do not contain nanobubbles to facilitate cleaning.

As noted above, tap water and other feed liquids may have varying properties, such as different properties in different geographical regions. For purposes of standardized measurements, an exemplary "Reference Solution" can be defined to characterize performance of a nanobubble generator, such as an electrolysis cell that generates nanobubbles. The Reference Solution can be supplied to the nanobubble generator to produce a cleaning liquid containing nanobubbles. By referencing a standardized "Reference Solution," the performance characteristics of a nanobubble generator can be reproducibly quantified without consideration of variations in feed liquid that may otherwise distort performance of the nanobubble generator.

As used herein, a "Reference Solution" refers to a solution having following properties:

Temperature at 21-25° C. (69.9-77.0° F.)

Conductivity of 2500 with use of Deionized Water (ASTM D1193-91, Type II), and Analytical Reagent (AR) grade NaCl Concentration of Dissolved Oxygen 5.98 mg/L pH of 5.69

Zeta Potential ($\zeta$) of −5 to −65

Nanoparticle concentration under 1 E+6/ml

Nanoparticle distribution undefined

Time—Use Reference Fluid within one hour of creating as atmospheric $CO2$ may change above measurements with time.

The Reference Solution can be created using deionized water at a temperature of 21-25° C. (69.9-77.0° F.) per ASTM D1193-91, Type II, an appropriate amount of analytical reagent (AR) grade NaCl to achieve a solution conductivity of 250 μS, and by filtering the created solution with a 20 nm filter. In one example, a Reference Solution so formed has a dissolved oxygen of 5.98 mg/L measured with an appropriate analytical probe and meter, a pH of 5.69, a Zeta Potential ($\zeta$) of −5 to −25 recorded with a Malvern Zetasizer Nano Z, and a Nanoparticle concentration of under 1 E+6 per milliliter with an undefined Nanoparticle distribution recorded with Nanosight Tracking Analysis (NTA). The above measurements may be measured within one hour of creating the Reference Solution as atmospheric CO2 may affect some of the solution characteristics. It should be appreciated that the above Reference Solution is merely for purposes of discussion, and a nanobubble generator according to the disclosure is not limited to using such a Reference Solution as a feed liquid during operation.

3.2.2 Cleaning Liquid Containing Nanobubbles

In exemplary embodiments, a nanobubble generator according to the disclosure is configured and operated to produce, from the Reference Solution or other feed liquid, a cleaning liquid containing nanobubbles and having the following characteristics (and/or any or all combinations of Zeta potential, concentration, and size described below):

Temperature at 21-25° C. (69.9-77.0° F.), measured by an analytical probe and appropriate calibrated instrument over a 30 second period and taking 3-5 temperature measurements, which are averaged.

Conductivity of 250 µS with use of Distilled Water & AR grade NaCl, measured by an analytical probe and appropriate calibrated instrument over a 30 second period and taking 3-5 conductivity measurements, which are averaged.

Zeta Potential ($\zeta$)—measured with a Calibrated Malvern Zetasizer Nano Z instrument, same sample 5 times, which are averaged: Zeta Potential ($\zeta$) in millivolts (mv) ranging from +60 to −110, such as a Zeta Potential ($\zeta$) ranging from +0 to −105, or a Zeta Potential ($\zeta$) ranging from −10 to −100, Nanobubble distribution—Calibrated Nanosight NS300 with 532 nm Green Laser and Syringe Pump, measure same sample 5 times, average results: Nanobubble distribution of 1 nm-100,000 nm, such as from 1 nm-10,000 nm, 2 nm-1000 nm, or 10 nm-450 nm, with some embodiments having distribution of 10 nm-450 nm, such as 15 nm-200 nm, or 20 nm-225 nm. At least 50% of the nanobubbles within the liquid may fall within any of the foregoing ranges, such as at least 75% of the nanobubbles, or at least 90% of the nanobubbles.

Nanobubble concentration (of Nanobubbles within the above-size distributions)—Calibrated Nanosight NS300 with 532 nm Green Laser and Syringe Pump, measure same sample 5 times, which are averaged:

Nanobubble concentration per milliliter of cleaning liquid of at least 1 E+6, such as a Nanobubble concentration ranging from 1 E+6 to 1 E+8, a Nanobubble concentration ranging from 1 E+6 to 1 E+12, a Nanobubble concentration ranging from 1 E+6 to 1 E+20, a Nanobubble concentration of at least 1 E+7, or a Nanobubble concentration of at least 1 E+8.

In some examples, the nanobubble generator is configured and operated to produce a cleaning liquid containing nanobubbles and exhibiting any of the foregoing characteristics (or combinations of characteristics) that is super-saturated with dissolved gas. For example, the cleaning liquid may be super-saturated with dissolved oxygen. In one example, the cleaning liquid has a concentration of dissolved oxygen at least 10% above the dissolved oxygen saturation limit for the cleaning liquid, such as at least 25% above the dissolved oxygen saturation limit for the cleaning liquid, or at least 50% above the dissolved oxygen saturation limit for the cleaning liquid. For example, in the case of a cleaning liquid containing nanobubbles that is at 70 degrees Fahrenheit and has a conductivity of 250 µS, the dissolved oxygen saturation limit may be in the range of approximately 7 mg/L to 8 mg/L. Accordingly, super-saturating the cleaning liquid with dissolved gas (e.g., dissolved oxygen) may result in the cleaning liquid having a dissolved oxygen concentration greater than 8 mg/L, such as greater than 10 mg/L. For example, the cleaning liquid may have a dissolved oxygen concentration ranging from 10 mg/L to 15 mg/L, such as from 12 mg/L to 14 mg/L.

In some applications, it has been identified that super-saturating a cleaning liquid containing nanobubbles with dissolved gas increases the cleaning effectiveness of the liquid as compared to when the dissolved gas concentration in the cleaning liquid is at or below the saturation limit. While not wishing to be bound by any particular theory, it is believed that super-saturating the cleaning liquid containing nanobubbles with dissolved gas may increase cleaning effectiveness by helping to stabilize the nanobubbles within the liquid. The super-saturated concentration of dissolved gas may help nanobubbles in the cleaning liquid remain dimensionally stable for a period of time effective to allow the nanobubbles to contact a surface to be cleaned. The can help the nanobubbles from dissoluting and aggregating into larger gas bubbles, which may be less effective at cleaning than comparatively smaller gas bubbles.

While a cleaning liquid containing nanobubbles according to the disclosure can have a variety of different properties as outlined above, in one example, the cleaning liquid has a concentration of nanobubbles ranging from approximately 1 nm to 500 nm (e.g., from 10 nm to 450 nm) of at least 1 E+5 (e.g., from 1 E+6 to 1 E+12). Such a cleaning liquid may have a negative Zeta potential ($\zeta$) (e.g., a Zeta potential less than zero, such as from −10 to −80, or −25 to −65). Additionally or alternatively, such a cleaning liquid may be super-saturated with dissolved gas, for example having a dissolved oxygen concentration at least 20% above the saturation limit for the cleaning liquid (e.g., from 30% to 75% above the saturation limit).

In one example in which the nanobubble generator is implemented using an electrolysis cell, the electrolysis cell may produce an electrolyzed solution that is super-saturated with dissolved gasses of H2 and O2 from the electrolysis process and has any of the characteristics discussed above (and/or any or all combinations of Zeta potential, concentration, size, and/or dissolved oxygen described below). In general, the nanobubble generator may produce a cleaning liquid exhibiting the above characteristics when the measurements are made within one hour of creating the liquid, as atmospheric CO2 may affect some of the solution characteristics. The distribution and concentration measurements may be performed at the same time. The NTA may be performed using the ASTM E2834-12 Standard Guide for Measurement of Particle Size Distribution on Nanomaterials in Suspension by Nanoparticle Tracking Analysis (NTA).

4. Exemplary Embodiments

The following section provides exemplary embodiments of devices, systems, and techniques that can generate a cleaning solution having nanobubbles and/or apply such a cleaning solution to a surface to be cleaned. In different applications, such cleaning solution can have any property or combination of properties of those described in Section 3.2.2 above.

A variety of different nanobubble generators can be used to generate a cleaning liquid containing nanobubbles and suitable for removing dirt or other soils. FIG. 2 is a perspective view of an example electrolytic cell 10 that can be used to produce a cleaning liquid containing nanobubbles according to the disclosure. In operation, electrolytic cell 10 can produce an electrolyzed solution having the properties described in Section 3.2.2, when using the Reference Solution as a feed liquid for the electrolytic cell.

Electrolytic cell 10 can have any number of cathodes and anodes and can have any suitable shape, construction or arrangement. For example, the electrodes can be flat plates, coaxial plates, rods, or combinations thereof. The electrodes can be made from any suitable material, for example stainless steel, a conductive polymer, titanium and/or platinum, or other material. One or more of the electrodes may (or may not) be coated with a material, such as platinum, iridium and/or ruthenium oxide. In one embodiment, each electrode plate comprises platinum-coated titanium. The particular electrode material may be selected as a function of the desired chemical species generated during the electrolysis process. Each electrode can have, for example, a solid construction or can have one or more apertures, such as a mesh. Multiple cells 10 and/or electrodes can be coupled in series or in parallel with one another, for example.

In a particular example, electrolytic cell 10 has five parallel plate electrodes 20, 22, including three cathode electrodes 20a, 20b and 20c interleaved with two anode electrodes 22a and 22b (or three anodes interleaved with two cathodes), each separated from one another by a suitable gap. The terms "anode" and "cathode" are interchangeable since in an exemplary embodiment, the polarity of the voltage applied across the electrodes is periodically reversed to reduce scaling. Each electrode in this example is formed of a solid titanium plate that is coated with a 0.3 micron layer (for example) of platinum.

To produce an electrochemically-enhanced liquid, the electrolytic cell 10 is fed with a liquid, such as water, a mixture of water and a salt solution (e.g., $H_2O$ and sodium chloride or potassium chloride), or the "Reference Solution", through inlet 30, and a voltage potential difference is applied between the cathode electrode(s) 20 and the anode electrode(s) 22 to induce an electrical current between the electrodes and through the feed liquid. The resulting electrolyzed solution exits cell 10 through outlet 32.

Cell 10 includes a main housing 40 having a sandwich construction in which the three cathode electrode places 20a, 20b and 20c and the two interleaved anode electrode plates 22a and 22b are held between two end plates 42 and 44. The plates may be held together by screws, bolts, an adhesive or any other suitable attachment method.

End plate 44 includes the inlet 30 and the outlet 32. Inlet 30 has a tube adapter 46 configured to connect to a conduit, such as a flexible tube, for receiving a supply of feed liquid. In this example, tube adapter 46 is a male type adapter having ribs 48 configured to the flexible tube by a friction fit. The inlet 30 is fluidically coupled to gaps between the cathode electrodes 20a-20c and the anode electrodes 22a-22b at an inlet end of the cell 10.

In this example, end plate 44 also includes the outlet 32, which is connected to a duct 34. A tube adapter 52 is coupled to the output of transition duct 34. The outlet 32 is fluidically coupled to the gaps between the cathode electrodes 20a-20c and the anode electrodes 22a-22b at an outlet end of the cell 10, which is opposite to the inlet end of the cell, for example. In this example, tube adapter 52 is a male type adapter with ribs 54 configured to connect to a flexible tube by a friction fit.

Figure 3:
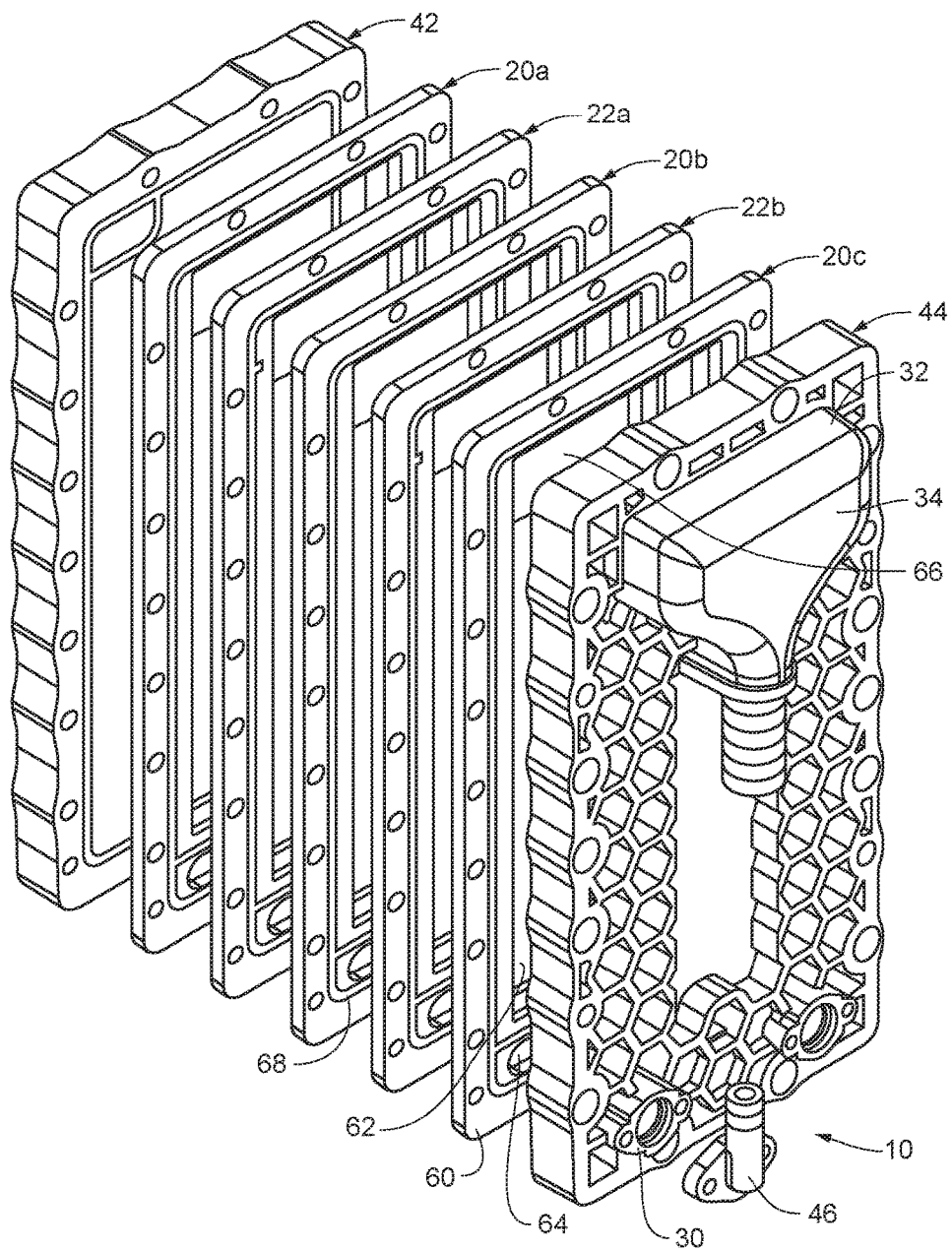
FIG. 3 is an exploded, perspective view of the electrolytic cell shown in FIG. 2.

FIG. 3 is an exploded, perspective view of electrolytic cell 10, which illustrates the cathode and anode electrode plates 20a, 20b, 20c and 22a, 22b in more detail. In this example, each electrode plate 20, 22 has a peripheral frame 60 of non-electrically conductive material, which supports a respective electrically conductive anode or cathode electrode 62. Each plate 20, 22 further includes an inlet aperture 64, near inlet 30, and an outlet aperture 66, near outlet 32 for passing liquid transversely through the frames and into and out of the gaps between the electrodes 62. The frames 60 are configured to provide suitable gaps between the electrodes 62 when sandwiched between end plates 42 and 44. In one example, the separation between adjacent electrodes is not less than 2.7 mm (0.106 inches) and not more than 2.8 mm (0.110 inches). Each frame and/or end plate may include one or more O-rings 68 to enhance the seal between adjacent plates. Inlet apertures 64 together provide a fluid channel from inlet 30 to an inlet end of the gaps between the electrodes 62. Similarly, outlet apertures 66 together provide a fluid channel from an outlet end of the gaps between the electrodes 62 to the outlet 32. When electrode plates 20, 22 are sandwiched between end plates 42 and 44, the plates form a plurality of reaction chambers between the electrodes, which extend from the inlet end to the outlet end of the cell 10. The electrolyzed fluids, such as anolyte and catholyte are blended in cell 10 prior to exiting the outlet 32.

Figure 4:
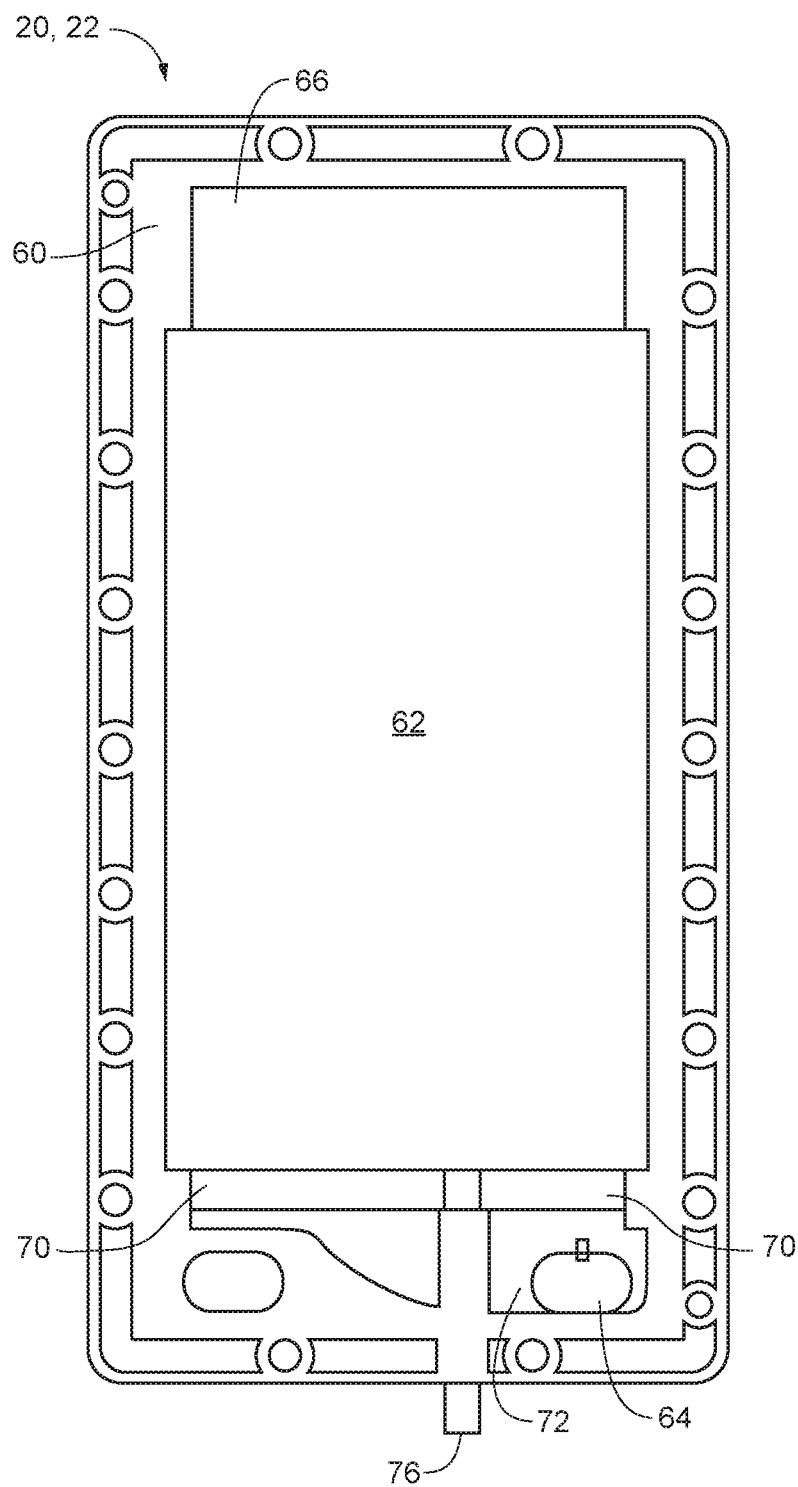
FIG. 4 is a plan view of one of the anode or cathode electrode plates contained in the electrolytic cell shown in FIGS. 2-3.

FIG. 4 is a plan view of one of the anode or cathode electrode plates 20, 22. As described above, each electrode plate 20, 22 has a peripheral frame 60, which supports a respective conductive anode or cathode electrode 62. Each plate 20, 22 further includes an inlet aperture 64, near inlet 30, and an outlet aperture 66, near outlet 32 for passing liquid through the frames and into and out of the gaps between the electrodes 62. There is also an aperture 70 in each plate 20, 22 at the inlet end of the plate, between an edge of the electrode 62 and an opposing edge of the frame material 60 to encourage liquid flow among and between the adjacent electrodes 62. Each frame 60 also includes a partial recess 72 providing a channel for liquid to pass from inlet aperture 64 to aperture 70 and the gaps between the electrodes. At the outlet end, aperture 66 is positioned between an edge of the electrode 62 and an opposing edge of the frame material 60. The cross-sectional area of aperture 66 is relatively large, as compared to the cross-sectional areas of apertures 64 and 70, to encourage unimpeded liquid flow from the reaction chambers to the outlet 32 in order to reduce the build-up of scale along the outlet flow path.

Each electrode plate 20, 22 further includes an electrically-conductive terminal 76 extending from a perimeter of the frame 60 and electrically connected to the respective electrode 62. A control circuit (not shown in FIG. 4) can then be connected to the various terminals 72 through electrical leads for applying a voltage potential between the electrodes 62. In one example, the outer dimension of each electrode plate has a width of 63 mm wide and a length of 115 mm.

Figure 5:
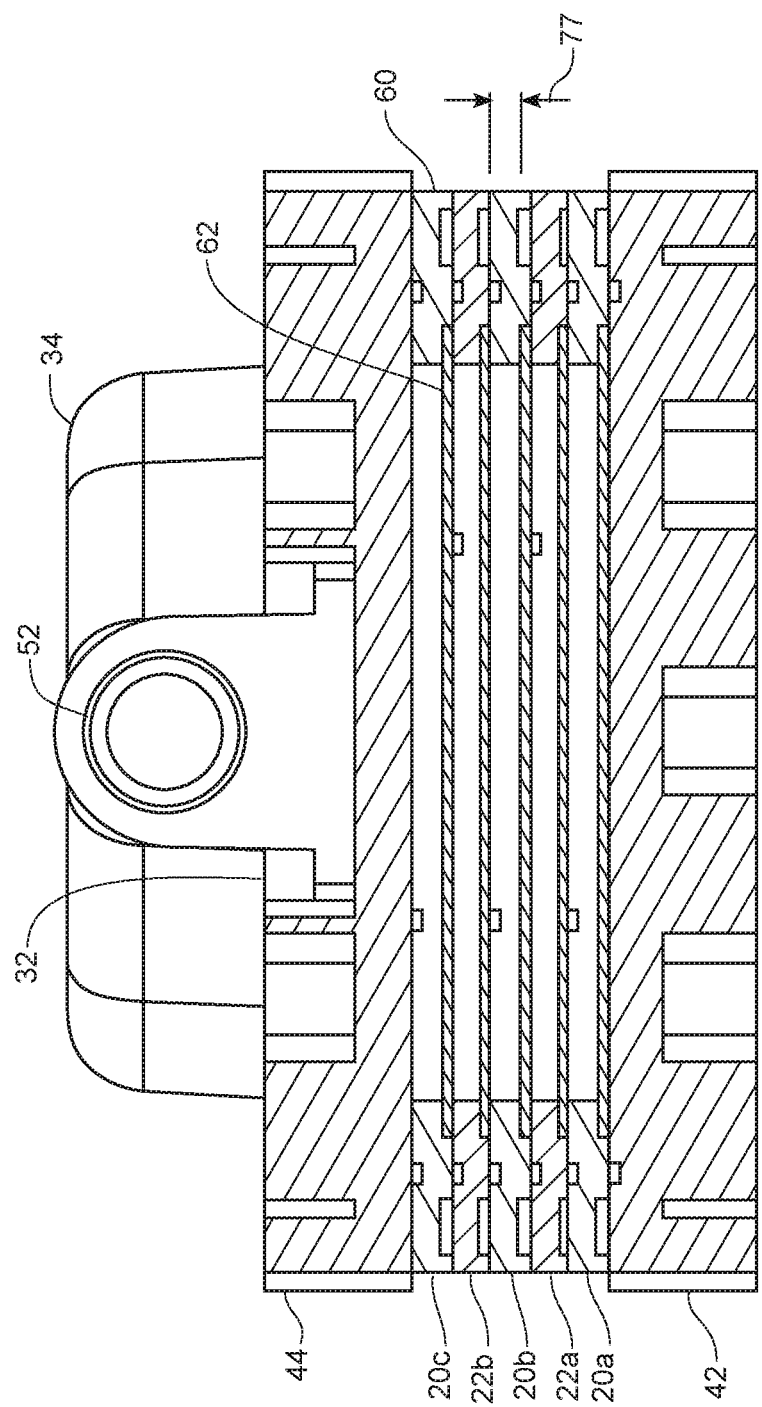
FIG. 5 is a cross-sectional view of the electrolytic cell, taken along lines 5-5 of FIG. 2

FIG. 5 is a cross-sectional view of electrolytic cell, taken along lines 5-5 of FIG. 2. As mentioned above, adjacent surfaces of electrodes 62 can have a gap 75 of 2.7 mm-2.8 mm (0.106 inches-0.110 inches).

Figure 6:
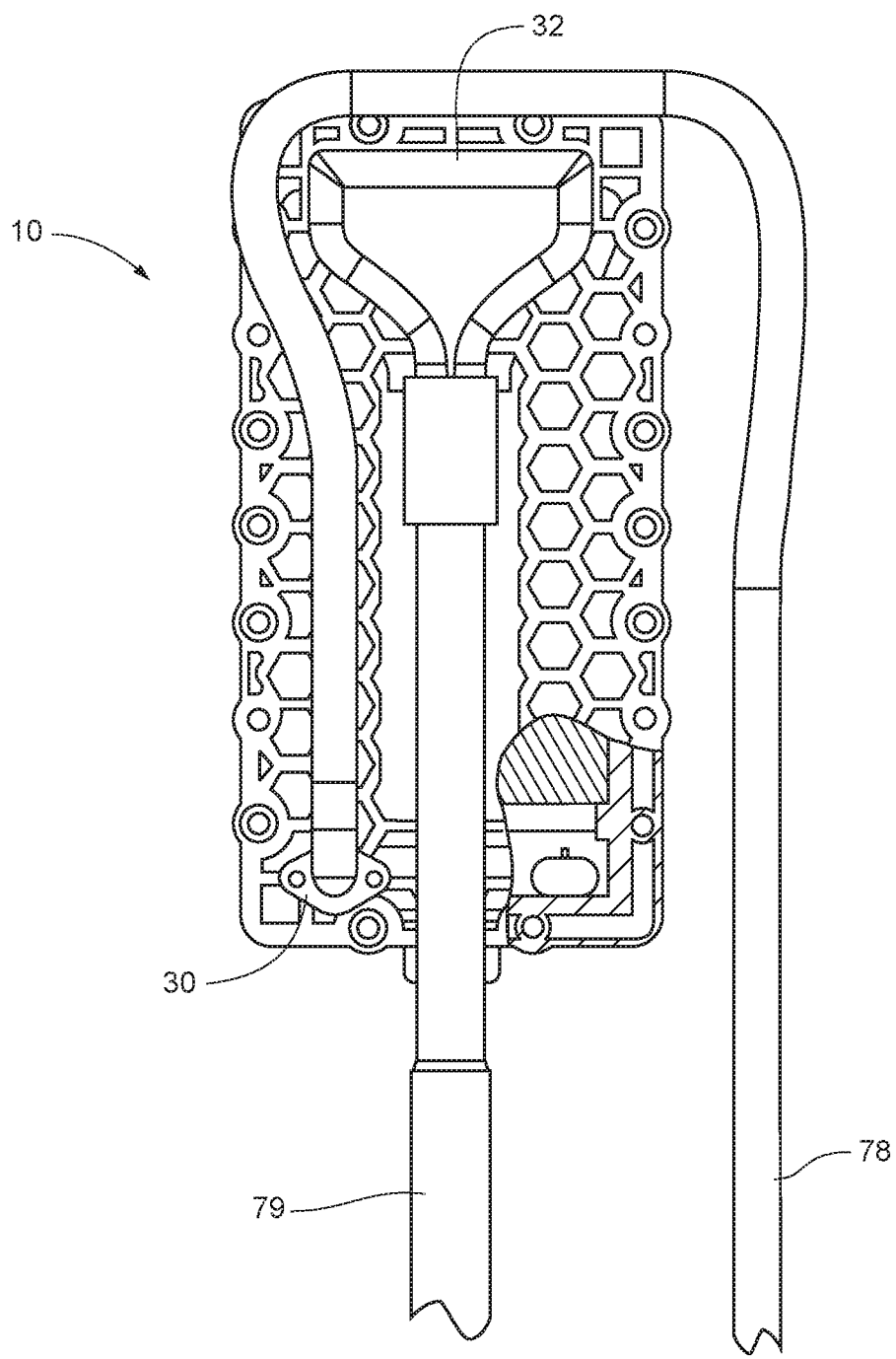
FIG. 6 is a side plan view of the electrolytic cell shown in FIGS. 2-3, shown with an inlet hose and an outlet hose.

FIG. 6 is a side plan view of electrolytic cell 10 shown with an inlet hose 78 connected to inlet 30 for supplying the feed liquid and an outlet hose 79 connected to outlet 32 for supplying the electrolyzed cleaning solution.

Figure 7:
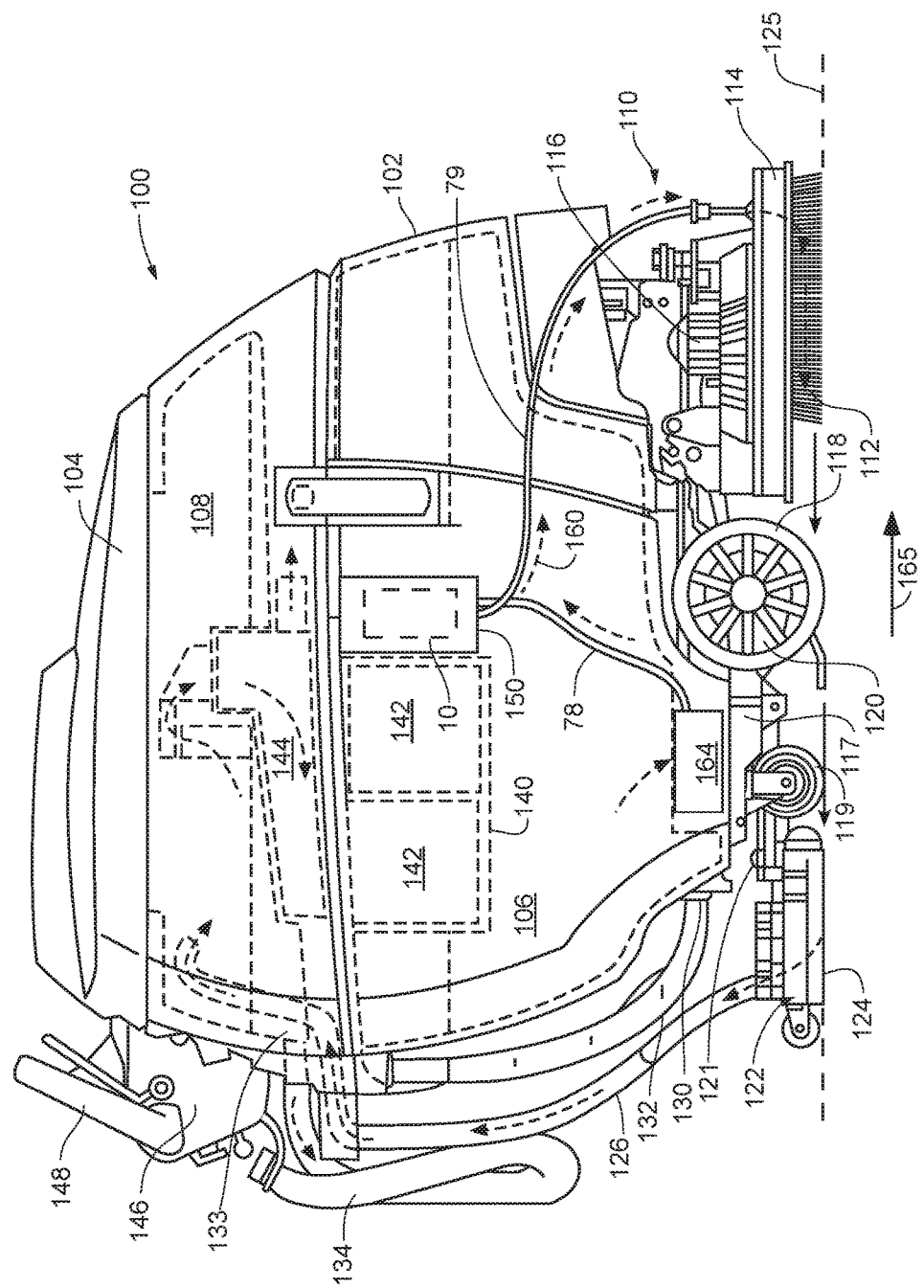
FIG. 7 is a schematic, side view of a hard (and/or soft) floor scrubber on which the electrolytic cell shown in FIGS. 2-6 may be installed for dispensing the electrolyzed cleaning solution to a surface being cleaned by the scrubber.

FIG. 7 is a schematic, side view of a hard (and/or soft) floor scrubber on which electrolytic cell 10 (shown in FIGS. 2-6) is installed for dispensing the electrolyzed cleaning solution to a surface being cleaned by the scrubber. In one example, scrubber 100 is substantially similar to the Tennant T5 Scrubber-Dryer equipped with the equipment under the "ec-H2O™" Technology from Tennant Company, Minneapolis, Minn., for example, which has been modified to include the components and/or operating characteristics discussed above for producing an electrolyzed cleaning solution having the characteristics described in Section 3.2.2 above, for example.

In this example, scrubber 100 is a walk-behind scrubber used to clean hard floor surfaces, such as concrete, tile, vinyl, terrazzo, etc. Alternatively, for example, scrubber 100 can be configured as a ride-on, attachable, or towed-behind scrubber for performing a scrubbing operation as described herein. In a further example, scrubber 100 can be adapted to clean soft floor surfaces, such as carpet, or both hard and soft surfaces in further embodiments. Scrubber 100 may include electrical motors powered through an on-board power source, such as batteries, or through an electrical cord. Alternatively, for example, an internal combustion engine system could be used either alone, or in combination with, the electric motors.

Scrubber 100 generally includes a base 102 and a lid 104, which is attached along one side of the base 102 by hinges (not shown) so that lid 104 can be pivoted up to provide access to the interior of base 102. Base 102 includes a tank 106 for containing a feed liquid (such as regular tap water) to be treated and applied to the floor surface during cleaning/sanitizing operations. Alternatively, for example, the liquid can be treated onboard or off-board scrubber 100 prior to containment in tank 106 (where electrolytic cell 10 is installed and operated externally to scrubber 100, in which case the produced cleaning solution may be transported from cell 10 to tank 106 with a suitable container or hose, for example). Tank 106 can have any suitable shape within base 102, and can have compartments that at least partially surround other components carried by base 102.

Base 102 carries a motorized scrub head 110, which includes one or more scrubbing members 112, shrouds 114, and a scrubbing member drive 116. Scrubbing member 112 may include one or more brushes, such as bristle brushes, pad scrubbers, microfibers, or other hard (or soft) floor surface scrubbing elements. Drive 116 includes one or more electric motors to rotate the scrubbing member 112. Scrubbing members 112 may include a disc-type scrub brush rotating about a generally vertical axis of rotation relative to the floor surface, as shown in FIG. 7.

Alternatively, for example, scrubbing members 112 may include one or more cylindrical-type scrub brushes (and/or scrub pads) rotating about a generally horizontal axis of rotation relative to the hard floor surface. Drive 116 may also oscillate scrubbing members 112. Scrub head 110 may be attached to scrubber 100 such that scrub head 110 can be moved between a lowered cleaning position and a raised traveling position. Alternatively, for example, scrubber 100 can include no scrub head 110 or scrub brushes.

Base 102 further includes a machine frame 117, which supports source tank 106 on wheels 118 and castors 119. Wheels 118 are driven by a motor and transaxle assembly, shown at 120. The rear of the frame carries a linkage 121 to which a fluid recovery device 122 is attached. In the embodiment of FIG. 7, the fluid recovery device 122 includes a vacuum squeegee 124 that is in vacuum communication with an inlet chamber in recovery tank 108 through a hose 126. The bottom of source tank 106 includes a drain 130, which is coupled to a drain hose 132 for emptying source tank 106. Similarly, the bottom of recovery tank 108 includes a drain 133, which is coupled to a drain hose 134 for emptying recovery tank 108. Alternatively, for example, one or both of the source tank and recovery tank and related systems can be housed in or carried by a separate apparatus.

In a further exemplary embodiment, the fluid recovery device includes a non-vacuumized mechanical device for lifting the soiled solution away from the floor surface and conveying the soiled solution toward a collection tank or receptacle. The non-vacuumized mechanical device can include, for example, a plurality of wiping media such as pliable material elements, which are rotated into contact with the floor surface to engage and lift the soiled solution from the floor surface.

In a further embodiment, scrubber 100 is equipped without a scrub head, wherein the liquid is dispensed to floor 125 for cleaning or sanitizing without a scrubbing action. Subsequently, fluid recovery device 122 recovers at least part of the dispensed liquid from the floor. In another embodiment, scrubber 100 includes a wand sprayer and extractor or other attachment (not shown) that can be used to clean off-floor surfaces.

Scrubber 100 can further include a battery compartment 140 in which batteries 142 reside. Batteries 142 provide power to drive motors 116, vacuum fan or pump 144, and other electrical components of scrubber 100. Vacuum fan 144 is mounted in the lid 104. A control unit 146 mounted on the rear of the body of scrubber 100 includes steering control handles 148 and operating controls and gages for scrubber 100.

Liquid tank 106 is a liquid source (e.g., liquid source 20) filled with a feed liquid to be treated for cleaning and/or sanitizing use, such as but not limited to regular tap water, water treated with a suitable electrolyte such as NaCl, filtered "grey water" (recycled water picked up by fluid recovery device 122), and/or the Reference Solution. Scrubber 100 further includes an output fluid flow path 160, which includes a pump 164 and the electrolysis cell 10, which is contained in a housing 150, for example). The inlet hose 78 (FIG. 6) is coupled pump 164 and cell 10, and the outlet hose (FIG. 6) is coupled between cell 10 and scrub head 110.

Liquid tank 106, electrolysis cell 10, and pump 164 can be positioned anywhere on scrubber 100. In one embodiment, electrolysis cell 10 is mounted within a housing 150 that is carried within base 102 and also contains control electronics for controlling cell 10 and pump 164. Pump 164 is mounted beneath source tank 106 and pumps water from tank 106 along flow path 160, through electrolysis cell 10, to the vicinity of scrub head 110 and ultimately to floor 125, wherein recovery device 122 recovers the soiled liquid and returns it to recovery tank 108.

The arrows in FIG. 7 illustrate the direction of liquid flow from tank 106, through flow path 160, to floor 125 and then from recovery device 122 to recovery tank 128. In one embodiment of the disclosure, the control unit 146 is configured to operate pump 164 and electrolysis cell 10 (through its control electronics) in an "on demand" fashion. Pump 164 is in an "off" state and electrolysis cell 10 is de-energized when scrubber 100 is at rest and not moving relative to the floor being cleaned. Control unit 146 switches pump 164 to an "on" state and energizes electrolysis cell 10 when scrubber 100 travels in a forward direction relative to the floor, as indicated by arrow 169. In the "on" state, pump 164 pumps water from tank 106 through flow path 160 to the vicinity of scrub head 110. Thus, electrolysis cell 10 generate and deliver the electrolyzed cleaning solution "on demand", as discussed above. For example, scrubber 100 may dispense substantially all of the electrolyzed cleaning solution upon generation without intermediate storage of the solution on scrubber 100, and without feedback of any of the solution into electrolysis cell 10. In another embodiment, scrubber 100 contains a buffer reservoir for storing and then later dispensing any unused electrolyzed cleaning solution.

In one example, scrubber 100 advances at a typical rate across the surface 125 being cleaned, such that the residence time of the cleaning solution on the surface between distribution to the surface and then recovery by vacuum squeegee 124 is relatively short, such as less than 15 seconds, less than 10 second, or less than 5 seconds (e.g., about three seconds).

The liquid distribution path of scrubber 100 can also include, if desired, one or more filters for removing selected components or chemicals from the feed water or the produced cleaning solution to reduce residue left on the surface being cleaned. In addition, scrubber 100 can include a filter or filter system for filtering the recovered liquid within recovery tank 108 and supplying filtered "grey" water to source tank 106.

Figure 8:
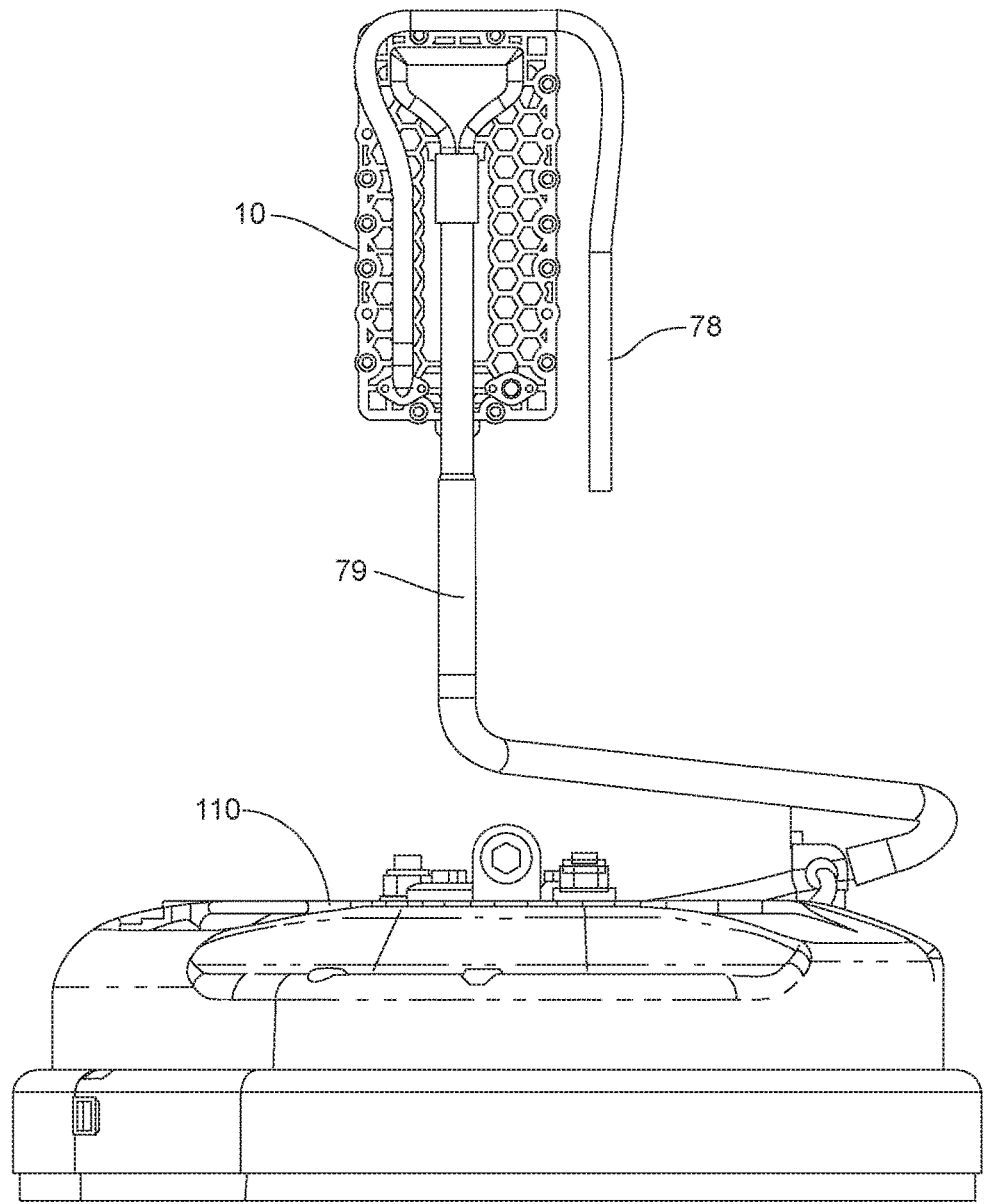
FIG. 8 is a simplified, view of a portion of the scrubber shown in FIG. 7 illustrating an outlet flow path from the electrolytic cell to a scrub head.

FIG. 8 is a simplified, view of a portion of scrubber 100 illustrating the outlet flow path from electrolytic cell 10 to scrub head 110. Scrub head 110 contains a disk-type scrub brush which rotates at a suitable rpm. Scrub head 110 dispenses the produced cleaning solution to the surface being cleaned through a central aperture in the scrub brush, and rotation of the scrub brush distributes the solution beneath the bristles of the brush, in the area under scrub head 110.

Figure 9:
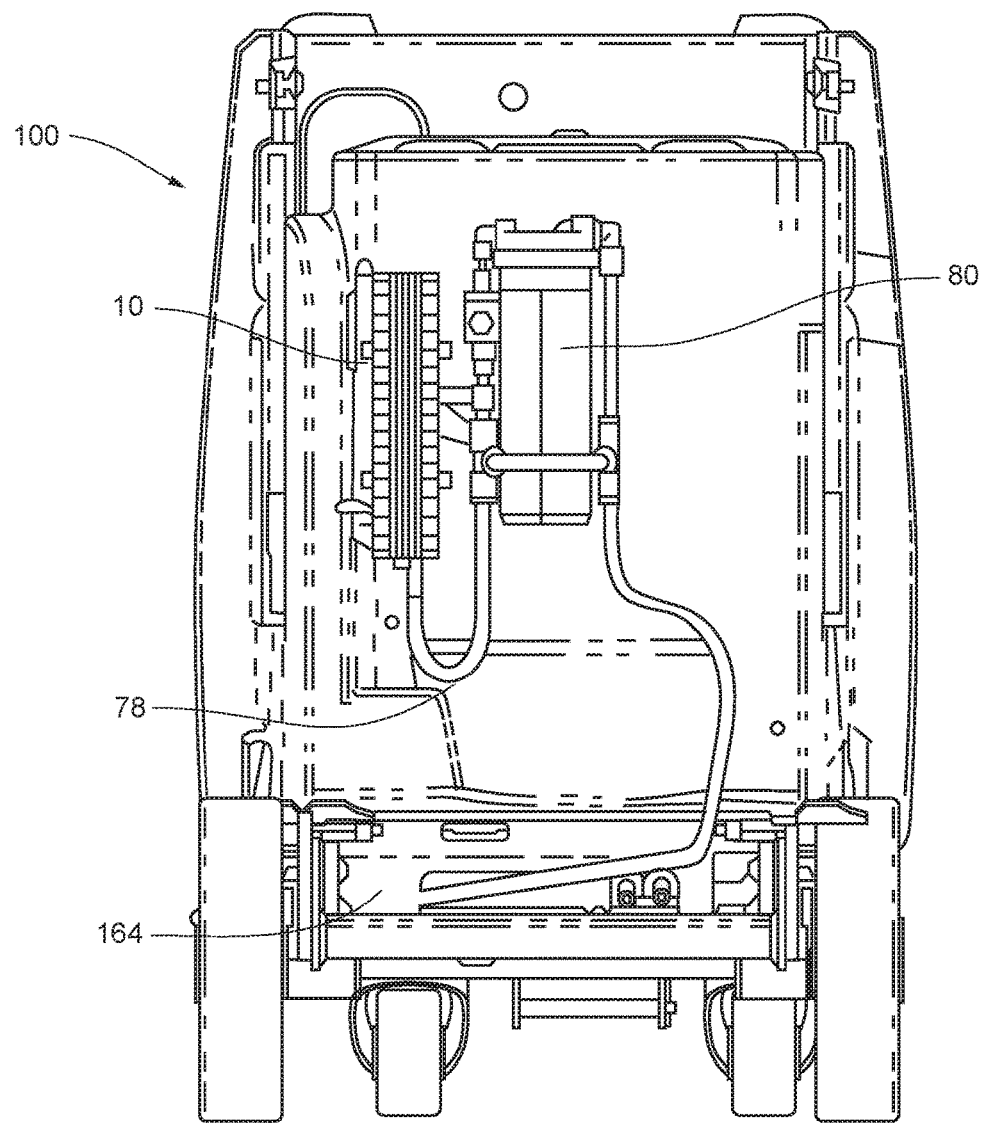
FIG. 9 is a rear-end view of the scrubber.

FIG. 9 is a rear-end view of scrubber 100, in which various elements are not shown in order to better illustrate the distribution path through electrolytic cell 10. As shown in FIG. 9, scrubber 110 may further include a water conditioning module 80, between pump 164 and electrolytic cell 10. The water conditioning module 80 conditions the feed water (pre-electrolyzed solution) to allow for optimum system plumbing performance, such as inhibiting hard water scaling, by adding a salt to the feed water (e.g., dispensing 2-3 parts per million of a food grade Sodium Hexametaphosphate (SHMP)).

Figure 10A:
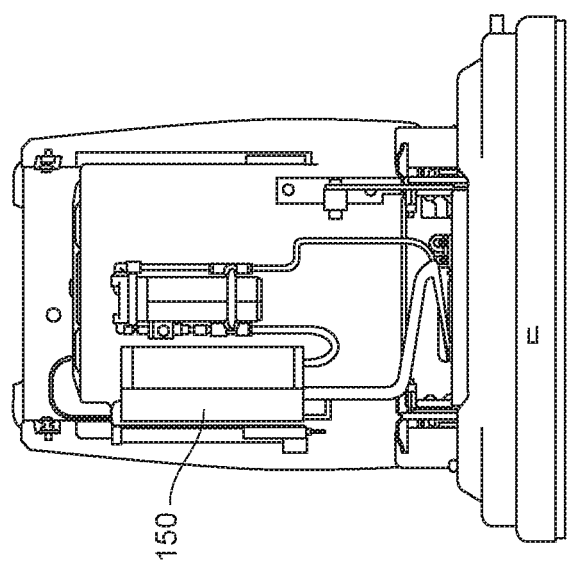
FIGS. 10A and 10B are rear and side view of the scrubber, which illustrate the electrolytic cell contained within a housing.
Figure 10B:
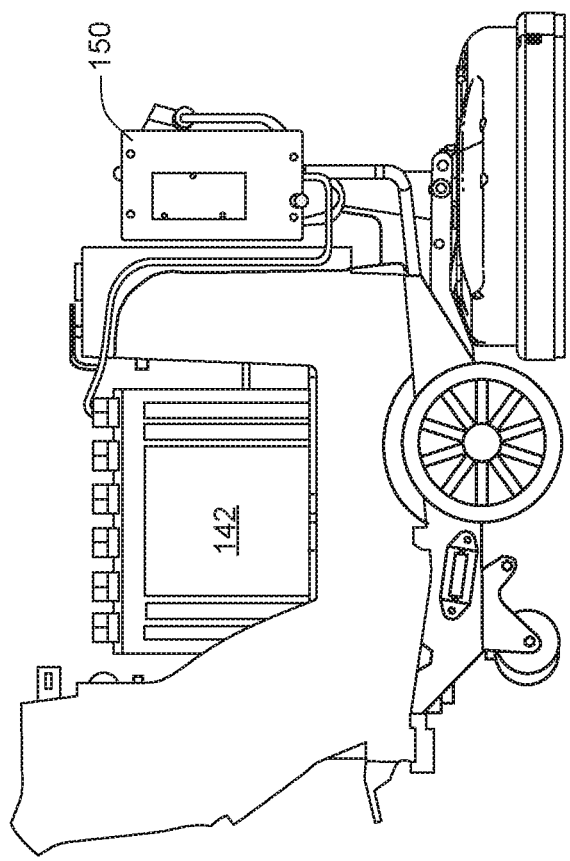

FIGS. 10A and 10B illustrate cell 10 contained within housing 150, and FIG. 10B further illustrates an electrical connection between the positive terminal of batteries 142 and the cell 10 contained within housing 150. The ground connection may be made through the scrubber's ground plane, such as its frame or through a direct connection for example.

Figure 11:
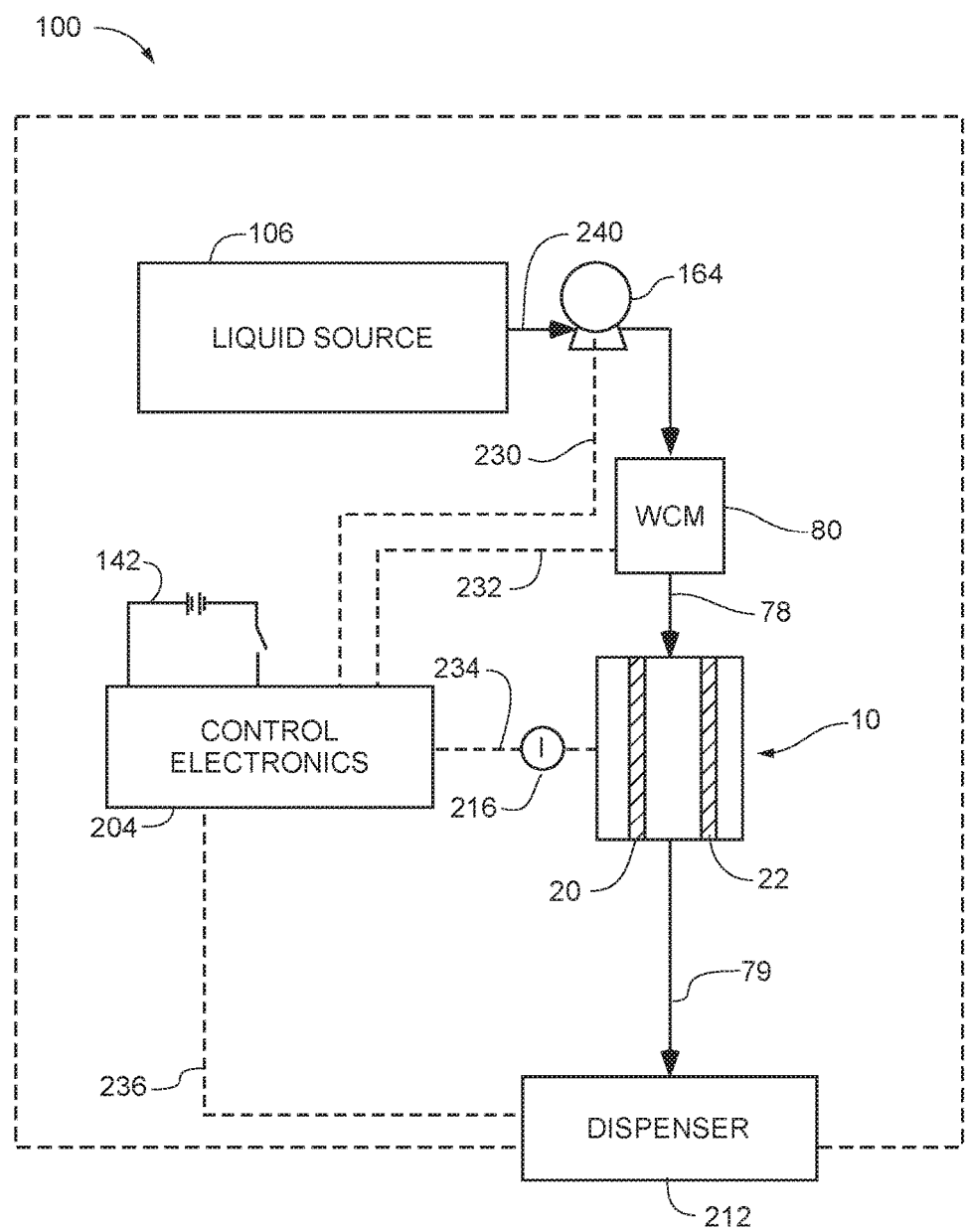
FIG. 11 is a simplified, schematic diagram of the control circuit for the scrubber.

FIG. 11 is a simplified, schematic diagram of a scrubber 100. As shown, scrubber 100 includes source tank 106 (or other liquid source or a feed line), control electronics 204, pump 164, water conditioning module (WCM) 80, electrolysis cell 10, and dispenser 212 (such as scrub head 110).

Source tank 106 is a reservoir or fluid line coupling for containing and/or receiving a feed liquid (such as tap water or the Reference Solution) to be treated and then dispensed by scrubber 100. As described above, in some embodiments, the feed liquid may include one or more additives, such as electrolytic compositions (e.g. salts), which are desirably dissolved or otherwise suspended in the feed liquid. In other embodiments, the feed liquid may consist essentially of tap water.

Control electronics 204 includes a printed circuit board containing electronic devices for powering and controlling of the operation of one or more pump 164, WCM 80, electrolysis cell 10, dispenser 212, and optionally, other suitable components of scrubber 100. For example, control electronics 204 may apply electrical power from batteries 142 (or other electric source) to pump 164, WCM 80 and electrolysis cell 10 (and optionally dispenser 212 in embodiments that comprise an electrically-controlled dispenser), respectively over electrical lines 230, 232, 234, 236 during operation. In this particular example, dispenser 212 is merely the end of hose 79, which is open to the scrub brush of scrub head 110 (FIG. 7).

In a particular embodiment, control electronics 204 simultaneously applies electrical power to pump 164, WCM 80 and electrolysis cell 10. This embodiment is beneficial for providing an on-demand activation of the pump and electrolysis cell, such as when a user of scrubber 100 actuates a lever or other control mechanism (not shown). Alternatively, control electronics 204 may independently and automatically apply electrical power to the pump and/or electrolysis cell, such as upon forward movement of a mobile floor surface scrubber in which the scrubber 100 may be installed.

Pump 164 is a liquid pump operated by control electronics 204 to draw the feed water from source tank 106 through fluid line 240 at a predetermined flow rate. The predetermined flow rate may be based on a fixed pumping rate, or may be adjustable by control electronics 204 over electrical line 230, thereby allowing the flow rate of the feed water to be adjusted.

In the shown embodiment, pump 164 is located downstream from tank 106 and upstream from electrolysis cell 10 for drawing water from tank 106 to electrolysis cell 10. In alternative embodiments, pump 164 may be positioned at any suitable location between tank 106 and dispenser 212.

Electrolysis cell 10 receives the pumped feed water from pump 164 (such as through WCM 80) over fluid line 242 (such as inlet hose 78 shown in FIG. 7. While illustrated as a single cell, scrubber 100 may alternatively include multiple electrolysis cells 10 arranged serially and/or in parallel.

The anode and cathode electrodes 20, 22 are electrically connected to opposite terminals of a power supply, such as batteries 142 of scrubber 110, through control electronics 204 and electrical line 234. During operation, control electronics 204 may apply a voltage potential across electrodes 20, 22. Control electronics 204 can provide a constant DC output voltage, a pulsed or otherwise modulated DC output voltage, and/or a pulsed or otherwise modulated AC output voltage to electrodes 20, 22, for example. In the shown embodiment, scrubber 100 may also include current sensor 216 located along electrical line 234 and/or within electrolysis cell 10 to detect the intensity of the current induced through electrolysis cell 10 by the applied voltage potential. The measured current may be used by the control electronics 204 to adjust the voltage potential, waveform or other characteristics of the voltage, current and/or power supplied to the cell.

The applied voltage induces an electrical current across electrolysis cell 10 to electrolyze the feed liquid flowing through the cell. For example, water molecules in contact with anode electrode are electrochemically oxidized to oxygen ($O_2$) and hydrogen ions ($H^+$), while water molecules in contact with the cathode electrode 46 are electrochemically reduced to hydrogen gas ($H_2$) and hydroxide ions ($OH^-$). The resulting electrolyzed cleaning solution exits cell 10 through outlet hose 79. The characteristics of the electricity applied to electrolysis cell 10, and the configuration of electrolysis cell 10 itself, may be adjusted to control the characteristics the nanobubbles and cleaning liquid produced by the cell.

Examples of suitable flow rates of the feed water through electrolysis cell 10 range from about 0.1 gallons/minute to about 2.5 gallon/minute, such as 0.1 gallons/minute to 1.7 gallons/minute, about 0.1 gallons/minute to about 0.5 gallons/minute, or from about 0.1 gallons/minute to about 0.3 gallons/minute. In the particular example, the flow rate is 0.12 gallons per minute. The cleaning fluid discharging from electrolysis cell 10 can flow through a single outlet orifice or multiple outlet orifices. In one application, electrolysis cell 10 is configured to discharge cleaning fluid containing nanobubbles through two outlet orifices, with one orifice supplying the cleaning fluid to a brush or pad mounted under housing 150 and the other orifice supplying the cleaning fluid to a brush or pad mounted on the side of housing 150.

Examples of suitable voltages applied across electrolysis cell 10 range from about 5 volts to about 40 volts, such as 24 volts in one example, and suitable induced electrical currents include currents of about 1.0 ampere to about 5 amperes, such as about 3.0 amperes in a particular example. As mentioned above, control electronics 204 can provide a constant DC output voltage, a pulsed or otherwise modulated DC output voltage, or a pulsed or otherwise modulated AC output voltage to electrodes 20, 22 of electrolysis cell 10. In one embodiment, control electronics 14 applies the voltage supplied to electrodes 20, 22 at a relative steady state. In this embodiment, control electronics 10 and/or electrical source 214 includes a DC/DC converter that uses a pulse-width modulation (PWM) control scheme to control voltage and current output to the cell. In a particular example, control electronics supplies a steady state voltage of 24 volts at a duty cycle of 41 percent at a frequency of 600 Hertz to cell 10. The duty cycle is dependent on desired voltage and current output. The control electronics 204 applies a substantially constant 24 volt potential across the electrodes for each pulse of the PWM signal and varies the duty cycle of the voltage waveform, based on the induced current measured by current sensor 216, which varies with the electrolysis cell impedance and water conductivity, to maintain a substantially constant 3.0 amperes current through the cell, for example. When the conductivity of the feed liquid is about 250 µS (micro siemens), the duty cycle is about 41 percent for this particular embodiment. In another embodiment where the water conductivity is lower than 250 µS, the duty cycle may be higher and in some cases may be greater than 95%. In yet another embodiment where the water conductivity is higher than 250 µS, the duty cycle may be lower and may be less than 5%.

In one example, the control electronics 204 vary the target current induced through the cell as a function of a selectable flow rate of liquid through the cell. For example, if the flow rate is 0.12 gpm, then the target current may be, for example, 3 amperes at a current density of 10.1 amperes/ft$^2$ (1.09 amperes/dm$^2$). If the flow rate is 0.5 gpm, then the target current may be, for example, 5.7 amperes at a current density of 19.2 amperes/ft$^2$ (2.07 amperes/dm$^2$). With the cell 10 shown in FIGS. 2-6, the current density may be controlled between about 10 amperes/ft$^2$ (1 amperes/dm$^2$) and 19 amperes/ft$^2$ (2 amperes/dm$^2$), for example.

Control electronics 204 and/or electrical source 214 can also be configured, if desired, to alternate the polarity (between positive and negative) of the voltage pulses applied to electrolysis cell 10 between relative steady state voltage pulses at one polarity and then relative steady state voltage pulses at the opposite polarity for equal time periods (e.g., 600 seconds at each polarity). Polarity reversals assist in reducing scaling. Outlet line 79 connects to dispenser 212 for dispensing the electrolyzed cleaning solution.

The arrangements shown in FIGS. 2-11 are provided merely as a non-limiting example. The cell, itself, and/or the system in which the cell is installed can have any other structural and/or functional arrangement.

The operating points at which the cell is controlled and other variables may be modified as desired to achieve a particular nanobubble concentration and size distribution, as well as particular Zeta potential and dissolved gas concentration, within the ranges described above in Section 3.2.2 and a desired cleaning efficacy. For example, the following parameters may be modified: current applied to the cell, voltage applied to the cell, current density between the electrodes, voltage and/or current waveform, spacing of the electrodes, flow rate through the cell, residence time in the cell, pressure of the liquid in the cell and/or output from the cell, and Zeta potential ($\zeta$) of the input or output liquid.

In a particular example, with the cell 10 shown in FIGS. 2-6, a current of greater than 0.9 amps at voltages such as 6V, 12V, 24V and 36V is used for the electrolysis process of a global water supply in order to supersaturate the solution with dissolved gasses (H2, O2). Supersaturation may be characterized by having a higher concentration of dissolved gas in the output liquid than can be dissolved under normal circumstances at ambient conditions.

The speed at which nanobubbles form may influence the size and spread of distribution. The quicker the applied voltage achieves the target current (e.g. 3 amperes) the more control over the nanobubble size and distribution. In a particular example, the voltage signal applied to the cell electrodes has a rise time of less than 5% of the duty cycle Nanobubble concentration provides the carrying capacity of the solution to clean and suspend soils once dislodged by the agitation of the brushes. In a particular example, a concentration of greater than 1 E+6 per milliliter is preferred, a concentration of nanobubbles of 1 E+7 to 1 E+12 per milliliter is more preferred and a concentration of nanobubbles of 1 E+8 to 1 E+20 per milliliter is most preferred, when using the Reference Solution.

Nanobubble size, specifically diameter, provides the surface area for the adsorption of the dislodged soils. In different examples, a nanobubble distribution of 1 nm to 100,000 nm is used, such as a nanobubble distribution of 1 nm to 10,000 nm, a nanobubble distribution from 1 nm to 1000 nm, a nanobubble distribution from 10 nm to 450 nm, a nanobubble distribution from 15 nm to 250 nm, and/or a nanobubble distribution from 20 nm to 225 nm.

Solution pressure above atmospheric pressure, 14.696 psi, permits nanobubbles and dissolved gasses to remain in solution as the solubility of oxygen and hydrogen increases with an increase in solution pressure. A preferred solution pressure range is from at least 1 atmosphere to less than or equal to 15 atmospheres.

The charged surface of a nanobubble is due to accumulation of salt from the aqueous solvent. Zeta potential ($\zeta$) charge, between +60.0 mv to -100.0 mv is believed to influence the cleaning efficacy of the output solution. Both negative and positive zeta potentials may play a role in the adsorption of numerous soils to the surfaces of the nanobubbles, although negative zeta potentials may be more impactful for cleaning than positive zeta potentials in some applications.

As discussed above, a variety of different nanobubble generators can be used to generate a cleaning liquid containing nanobubbles suitable for removing dirt or other soils in accordance with the disclosure. The example configuration discussed in connection with FIGS. 2-11 utilizes an electrolysis cell to generate a cleaning liquid by supplying a feed liquid to the cell and electrolytically generating nanobubbles therein. Other types of nanobubble generators can be used in addition to or in lieu of an electrolysis cell, and it should be appreciated that the disclosure is not limited to the example nanobubble generator configuration discussed in connection with FIGS. 2-11.

As one example, a nanobubble generator may be implemented using a mechanical generator (e.g., nozzle) that physically intermixes a feed liquid with a gas (e.g., by applying a shearing force) without applying electricity to the feed liquid to generate a cleaning liquid having nanobubbles with particular characteristics. FIGS. 12A-12D illustrate different example mechanical nanobubble generator arrangements that can be used to generate a cleaning liquid containing nanobubbles according to the disclosure.

Figure 12A:
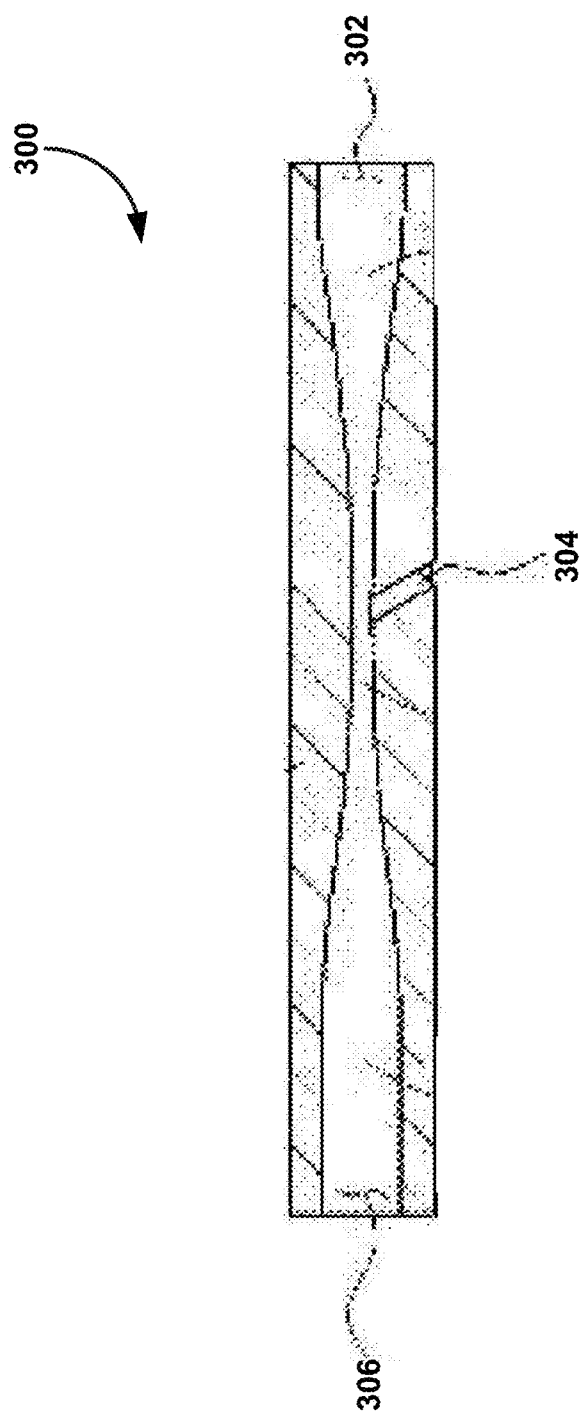
FIGS. 12A-12D are illustrations of example mechanical nanobubble generator configurations.

With reference to FIG. 12A, an example mechanical nanobubble generator 300 is illustrated that includes a cylindrical shaped pipe having a section of reduced cross-sectional area to provide a venturi nozzle. Nanobubble generator 300 includes a liquid feed inlet 302, a gas feed inlet 304, and a cleaning liquid outlet 306. Nanobubble generator 300 defines a venturi nozzle providing a flow constriction through which feed liquid flows. In operation, a feed liquid can be supplied under pressure to liquid feed inlet 302 and gas (e.g., air) supplied to gas feed inlet 304. In different examples, gas may be supplied to gas feed inlet 304 under pressure or may be drawn from the surrounding atmosphere without being separately pressurized. The mechanical shear forces caused by the feed liquid flowing through the venturi nozzle and mixing with gas can cause the gas to form into nanobubbles. The properties of the nanobubbles (e.g., size range, concentration range) and characteristics of the resulting cleaning liquid discharging from cleaning liquid outlet 306 (e.g., dissolved oxygen concentration) can be varied, e.g., by controlling the properties of the feed liquid and gas (e.g., relative concentrations, pressures) and/or the configuration of the nozzle (e.g., size, shape).

Figures 12B, 12C:
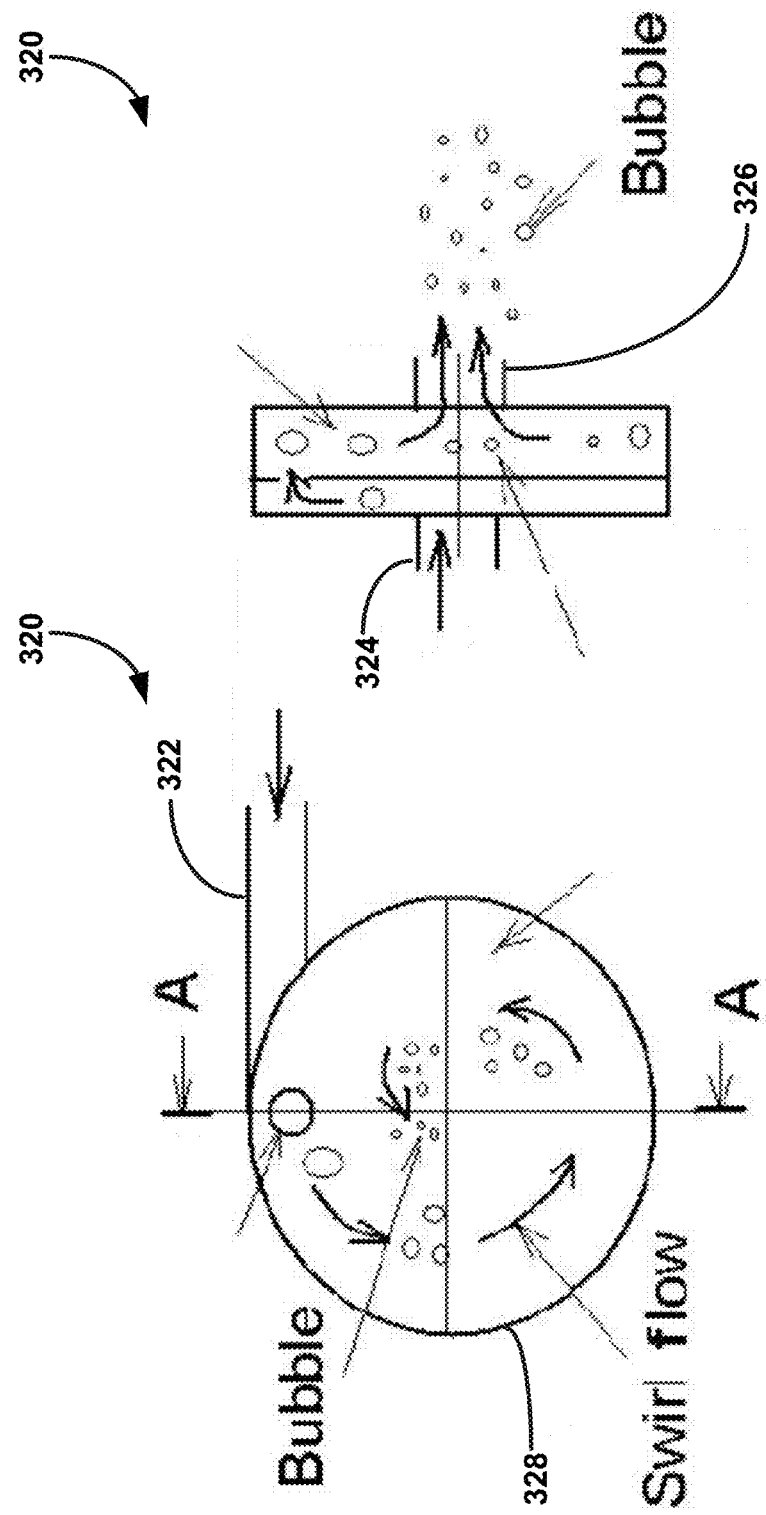

FIGS. 12B and 12C illustrate a front view and side view, respectively, of another example mechanical nanobubble generator 320. Nanobubble generator 320 is illustrated as a swirl nozzle that has a liquid feed inlet 322, a gas feed inlet 324, and a cleaning liquid outlet 326. Nanobubble generator 320 provides a generally circular shaped flow cavity in which feed liquid and gas intermix and mechanical shear breaks incoming gas down into nanobubbles. Liquid feed inlet 322 is positioned tangentially to housing 328 so that incoming feed liquid enters the housing on a tangent swirls about the housing. Gas feed inlet 324 extends along an axis about which feed liquid swirls around in housing 328. In operation, a feed liquid can be supplied under pressure to liquid feed inlet 322 and gas (e.g., air) supplied to gas feed inlet 324. The feed liquid and gas can form an intermixed swirling vortex that accelerates toward cleaning liquid outlet 326. The mechanical shear forces caused by the swirling vortex can cause the gas to form into nanobubbles within the feed liquid, producing a cleaning liquid containing nanobubbles that is discharged through cleaning liquid outlet 326.

Figure 12D:
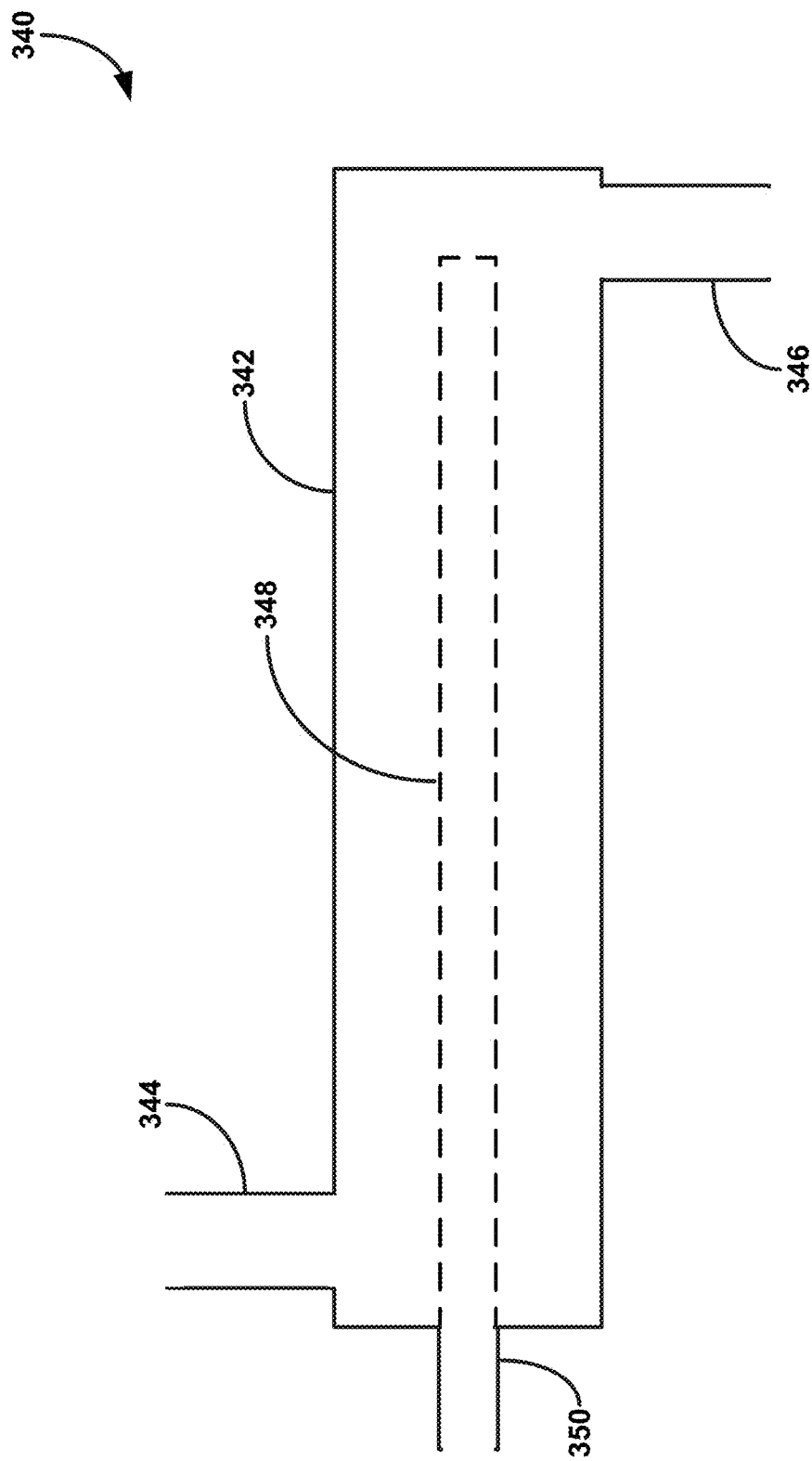

FIG. 12D illustrates another example mechanical nanobubble generator 340. Nanobubble generator 340 is illustrated as sieve-style generator that generates nanobubbles by passing compressed gas through a sieve having pores of desired size. Nanobubble generator 340 includes a housing 342 having a liquid feed inlet 344 and a cleaning liquid outlet 346. Nanobubble generator 340 also includes a sieve structure 348 having a gas feed inlet 350. In operation, a feed liquid can be supplied under pressure to liquid feed inlet 342 and pressurized gas (e.g., air) supplied to gas feed inlet 350. The gas may be supplied at a greater pressure than the feed liquid, causing the gas to flow through the pores of sieve structure 348 and into the feed liquid. The properties of the nanobubbles (e.g., size range, concentration range) in the resulting cleaning liquid discharging from cleaning liquid outlet 346 can be varied, e.g., by controlling the properties of the feed liquid and gas (e.g., relative concentrations, pressures) and/or the configuration of the sieve structure 348 (e.g., size, shape of the pores).

The mechanical nanobubble generator arrangements described with respect to FIGS. 12A-12D are merely examples, and other types of mechanical and non-mechanical nanobubble generators can be used in accordance with the disclosure. For instance, as another example, a system may incorporate a transducer (e.g., ultrasonic transducer) that generates nanobubbles by application of high frequency acoustic waves to the feed liquid.

Independent of the type of nanobubble generator(s) used, the nanobubble generator can be located onboard or off-board from a mobile floor cleaner device. In the onboard configuration, the mobile floor cleaner can carry a source of feed liquid devoid of nanobubbles or having a reduced concentration of nanobubbles as well as a nanobubble generator on or within the moveable housing of the cleaner. During operation of the mobile floor cleaner, liquid can be supplied from the feed liquid source to the nanobubble generator and the nanobubble generator can generate nanobubbles in the feed liquid so as to produce a nanobubble-containing liquid. In the off-board configuration, the mobile floor cleaner can include a reservoir configured to receive and carry nanobubble-containing liquid. The mobile floor cleaner can be part of a system that also includes a separate, off-board nanobubble generator station. In use, the off-board nanobubble generator station can operate to generate nanobubble-containing liquid, and the reservoir carried by the mobile floor cleaner can be filled with nanobubble-containing liquid supplied from the off-board nanobubble generator station.

Figure 13:
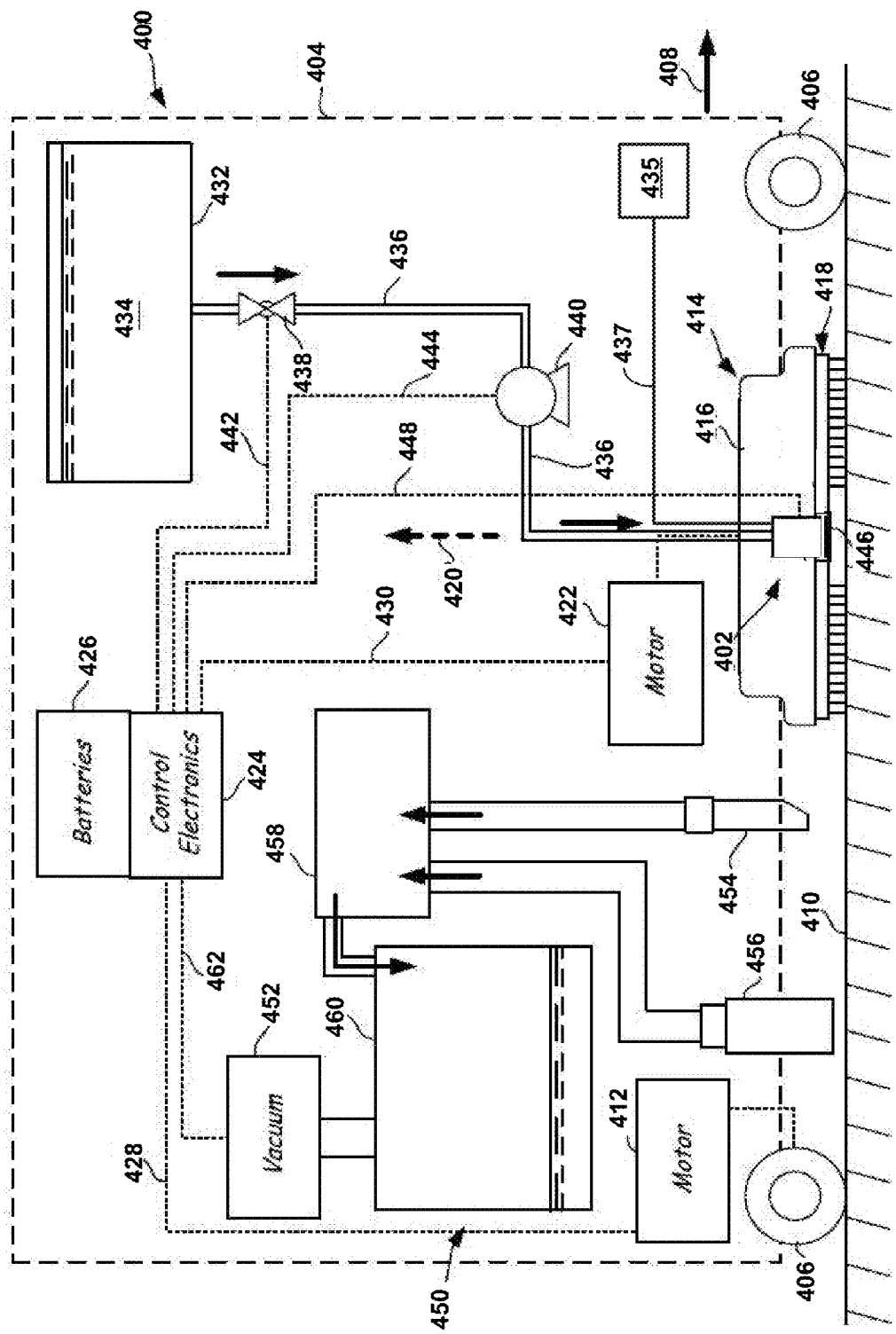
FIG. 13 is a side schematic illustration of an example mobile floor cleaner carrying an onboard nanobubble generator.

FIG. 13 illustrates an example mobile floor cleaner 400 that carries a nanobubble generator 402 and is configured to generate a cleaning liquid having nanobubbles, including cleaning liquids having nanobubble characteristics discussed above. Mobile floor cleaner 400 can include features described above with respect to scrubber 100 in FIG. 7. As shown in this example, mobile floor cleaner 400 is illustrated as being designed for use by an operator that walks behind the machine or rides on the machine. Examples of suitable cleaning units for mobile floor cleaner 400 include the "T"-series scrubbers from Tennant Company, Minneapolis, Minn., which are modified to include nanobubble generator 402 as discussed below. Alternatively, mobile floor cleaner 400 may be configured to be towed behind another vehicle or have yet a different configuration.

As shown, mobile floor cleaner 400 includes housing 404, which is supported by wheels 406 that advance mobile floor cleaner 400 in the direction of arrow 408 along a surface to be cleaned, such as surface 410. One or more of wheels 406 are correspondingly rotated by motor 412 based on operator commands, where motor 412 may include one or more electric motors and/or an internal combustion engine. Motor 412 may also be configured to rotate wheels 406 in the opposing directions to reverse the movement of mobile floor cleaner 400.

As further shown, mobile floor cleaner 400 also includes cleaning head 414, which, in the shown example, is a disc-type, scrubbing brush head that includes cover or shroud 416 and rotatable scrubbing brush 418. Scrubbing brush 418 is rotated about an axis of rotation 420 relative to cover 416 by motor 422. Motor 422 may include one or more electric motors that generate rotational power for a drive shaft or other mechanism (not shown) that extends along axis 420. In some configurations, axis 420 is substantially perpendicular to the surface 410 being cleaned, allowing scrubbing brush 418 to rotate parallel to the surface being cleaned. In addition, although mobile floor cleaner 400 is illustrated as a scrubber, other types of cleaners utilizing cleaning liquid, including those without scrub brushes, can implement the nanobubble techniques described herein.

Mobile floor cleaner 400 also includes control electronics 424, which include one or more control circuits configured to monitor and operate the components of mobile floor cleaner 400 over one or more control lines (e.g., electrical, optical, and/or wireless lines, not shown). Control electronics 424 and the components of mobile floor cleaner 400 may be powered from batteries 426, which are one or more rechargeable batteries, allowing mobile floor cleaner 400 to move freely without requiring a physical connection to a fixed electrical outlet. Accordingly, control electronics 424 may direct the operation of motors 412 and 422 respectively over control lines 428 and 430.

One or more of the control functions performed by control electronics 424 can be implemented in hardware, software, firmware, or a combination thereof. Such software, firmware, and the like may be stored on a non-transitory computer-readable medium, such as a memory device. Any computer-readable memory device can be used, such as a disc drive, a solid state drive, CD-ROM, DVD, flash memory, RAM, ROM, a set of registers on an integrated circuit, and/or the like. For example, the control circuit can be implemented partly or completely in a programmable logic controller and/or a processing device such as a microcontroller and/or other processor that executes instructions stored in a memory device, where the instructions configure the processor to perform the steps of the control process when executed by the processor to convert the processor into a special purpose computer.

Mobile floor cleaner 400 also includes a feed liquid source 432, which is one or more reservoirs or tanks for storing a feed liquid 434 from which cleaning liquid containing nanobubbles is generators. Feed liquid source 432 may include a fitting or other inlet for receiving feed liquid 434 from an external source (e.g., from an external hose). Feed liquid 434 is typically an aqueous liquid. For example, feed liquid may be regular, untreated tap water, water treated with an electrolyte such as NaCl, filtered "grey water", Reference Solution, and/or other available water source. In some alternative situations, feed liquid 42 may also include one or more additives, such as detergents, which preferably do not leave post-cleaning residues and do not chemically attack the cleaned surface 410. However, as indicated above, in some embodiments, feed liquid 434 is substantially free of any residue-forming additives, such as detergents.

Feed liquid 434 may exit feed liquid source 432 by conduit 436, which may include one or more actuatable valves (e.g., valve 438) and/or pumps (e.g., pump 440) for supplying feed liquid 434 to nanobubble generator 402. Control electronics 424 may direct the operation of valve 438 and/or pump 440 respectively over control lines 442 and 444. In alternative embodiments, feed liquid 434 may be supplied from liquid source 432 by the operation of gravity, without pump 440.

Mobile floor cleaner 400 also includes a gas source 435 that supplies pressurized gas. In different examples, gas source 435 can be a compressor, pressurized tank, or other source of gas. The gas may be air or other inert (e.g., carbon dioxide, nitrogen) or reactive (e.g., oxygen) gas. Pressurized gas may be supplied from the gas source 435 to the nanobubble generator 402 over gas supply line 437. Although not illustrated on FIG. 13, actuatable valves or other control mechanisms operating under the control of control electronics 424 can be included on mobile floor cleaner 400 to control the supply of gas to the nanobubble generator 402. Further, in yet other examples, mobile floor cleaner may not include gas source 435 and gas supply line 437. Rather, in these examples, nanobubble generator 402 may not utilize a separate source of gas (e.g., electrolysis cell) or may draw gas from the ambient environment without a dedicated gas supply line.

Conduit 436 directs feed liquid 434 to nanobubble generator 402 and gas supply line 437 directs gas to the nanobubble generator. As discussed above, nanobubble generator can have any suitable configuration. In various examples, nanobubble generator 402 may include an electrolysis cell, a venturi nozzle, a swirl nozzle, a gas diffusing sieve, a transducer generating compression waves that produce nanobubbles, or yet other type of nanobubble generator configuration. In any configuration, nanobubble generator 402 receives feed liquid 434 via conduit 436, gas via gas supply line 437, and generates nanobubbles in the feed liquid, thereby producing a cleaning liquid containing nanobubbles.

After passing through nanobubble generator 402, the resulting cleaning liquid containing nanobubbles can be dispensed onto surface 410 being cleaned. For example, in the example configuration of FIG. 13, the resulting cleaning liquid that is generated may exit nanobubble generator 402 via outlet orifice 446 onto surface 410 and/or scrubbing brush 418. In alternative configurations, an intermediate cleaning liquid reservoir (not illustrated) can be positioned between nanobubble generator 402 and surface 410. In such configurations, nanobubble generator 402 can generate cleaning liquid containing nanobubbles that is then stored onboard mobile floor cleaner 400 in the cleaning liquid reservoir. Control electronics 424 can provide controlled release of the cleaning liquid from the cleaning liquid reservoir to surface 410, for example via an actuatable valve and/or pump, rather than providing direct distribution of the cleaning liquid from nanobubble generator 402 to surface 410. Therefore, although nanobubble generator 402 is illustrated as being positioned inside of cleaning head 414 proximate surface 410, the nanobubble generator can be positioned at other locations on mobile floor cleaner 400 without departing from the scope of the disclosure.

For example, in an alternative configuration, the nanobubble generator 402 can be implemented in a closed loop with feed liquid source 432. In such a configuration, the nanobubble generator 402 can continuously or periodically draw feed liquid 434 from feed liquid source 432, pass the feed liquid through nanobubble generator 402 to increase the concentration of nanobubbles in the feed liquid, and then return the resulting liquid having an increased concentration of nanobubbles to source 432. Feed liquid devoid of nanobubbles and/or cleaning liquid containing nanobubbles can be circulated through nanobubble generator 402 one or more times, e.g., to increase or maintain the concentration of nanobubbles in the liquid retained within source 432. During subsequent operation, the cleaning liquid containing nanobubbles can be drawn from source 432 and distributed through cleaning head 414 without further passing through nanobubble generator 402. Such a configuration may be useful to maintain an active reservoir of cleaning liquid containing nanobubbles onboard mobile floor cleaner 400 and avoid time delays for generating nanobubble in real-time during operation of the floor cleaner.

In configurations where nanobubble generator 402 is electrically activated to generate nanobubbles (e.g., an electrolysis cell, ultrasonic transducer), control electronics 424 may direct the operation of the nanobubble generator over control line 448. In other configurations where nanobubble generator 402 generates nanobubbles via mechanical shear forces without the application of electrical energy, mobile floor cleaner 400 may not include control line 448. Rather, in these situations, nanobubbles can generate automatically as feed liquid 434 and gas passes through nanobubble generator 402 (e.g., through a discharge nozzle having a cleaning liquid outlet facing surface 410).

When nanobubble generator 402 is positioned as shown in FIG. 13, the nanobubble generator may rotate with scrubbing brush 418 while scrubbing brush 418 is driven by motor 422. In other configurations, including configurations where nanobubble generator 402 is not located inside cleaning head 414, nanobubble generator 402 does not rotate with scrubbing brush 418. Instead, nanobubble generator 402 can supply cleaning liquid containing nanobubbles to cleaning head 414 via a supply conduit (not illustrated) about which scrubbing brush 418 rotates.

Mobile floor cleaner 400 may also include a recovery system 450, which, in the shown embodiment, includes one or more vacuum units 452, one or more vacuum extractor tools 454, one or more vacuum squeegees 456, a vacuum path selector 458, and one or more waste recovery tanks 460. Vacuum unit 452 is used in combination with vacuum extractor tool 454 and/or vacuum squeegee 456 to remove liquid and solid waste (e.g., soiled cleaning liquid) from surface 410. Control electronics 424 may direct operation of vacuum unit 452 over control line 462.

Vacuum extractor tool 454 may be used for removing liquid and solid debris from soft surfaces 410, whereas vacuum squeegee 456 may be used for removing liquid and solid debris from hard surfaces 410, for example. Other types of liquid and debris recovery tools and methods can also be used for use on hard surfaces, soft floor surfaces, or both. Mobile floor cleaner 400 may also include one or more lift mechanisms (not shown) operated by control electronics 424 to independently raise and lower vacuum extractor tool 454 and vacuum squeegee 456.

The waste is passed through vacuum path selector 458 and into waste recovery tank 460. Vacuum path selector 458 allows a single vacuum unit 452 to selectively couple to vacuum extractor tool 454 and vacuum squeegee 456. Alternatively, separate vacuum units 452 may be individually used for vacuum extractor tool 454 and vacuum squeegee 456.

During a cleaning operation, control electronics 424 may energize motor 422 (via control line 430) to rotate scrubbing brush 418 about axis 420, open valve 438 (via control line 442), energize pump 440 (via control line 444) to supply the feed liquid 434 through conduit 436 to nanobubble generator 402, and control gas source 435 to supply gas through gas supply line 437 to nanobubble generator 402. In instances in which nanobubble generator 402 is electrically activated and/or controlled, control electronics 424 can also energize the nanobubble generator to generate nanobubbles in feed liquid 434 supplied to the nanobubble generator, thereby producing a cleaning liquid containing nanobubbles.

Cleaning liquid containing nanobubbles generated via nanobubble generator 402 may be dispensed directly onto surface 410, e.g., at an axially-central location along axis 420 (via outlet 446). Additionally or alternatively, the cleaning liquid containing nanobubbles may be dispensed from nanobubble generator 402 on/into the rotating bristles of scrubbing brush 418 or into an intermediate reservoir upstream of cleaning head 414. In either case, the nanobubbles in the cleaning liquid can have a concentration range, size distribution range, and/or electrical charge range as discussed herein. The nanobubbles in the cleaning liquid can attract and dislodge contaminants from surface 410, allowing the contaminants to then be abrasively removed by the rotation of scrubbing brush 418. The resulting soiled solution with the contaminants may then be collected with recovery system 450. In this way, the nanobubbles in the cleaning liquid can attract and dislodge contaminants from surface 410, e.g., according to the example mechanism described in connection with FIGS. 1A-1D. Scrubbing brush 418 may further assist in the cleaning efforts through mechanical abrasion. The results from the combined application of cleaning liquid containing nanobubbles and/or scrubbing from scrubbing brush 418 may be a clean surface 410 that is substantially free of film-forming residues.

When mobile floor cleaner 400 is configured with an onboard nanobubble generator as shown in FIG. 13, one or more nanobubble generators can be positioned in a number of different ways to generate nanobubbles in feed liquid 434. For example, the nanobubble generators can be positioned downstream from and in line with feed liquid 434 and/or gas source 435 as the feed liquid and/or gas flows from its respective source to outlet 446. In such examples, nanobubble generator 402 can direct energy (e.g., mechanical, electrical, and/or acoustic) into feed liquid 434 prior to applying the liquid to a surface to be cleaned. The number and position of the nanobubble generators 402 carried on mobile floor cleaner 400 can vary based on a variety of factors, such as the type of nanobubble generators being used (e.g., electrolysis cell versus mechanical nozzle) and the quantity of cleaning liquid dispensed by mobile floor cleaner 400 during operation.

Figure 14:
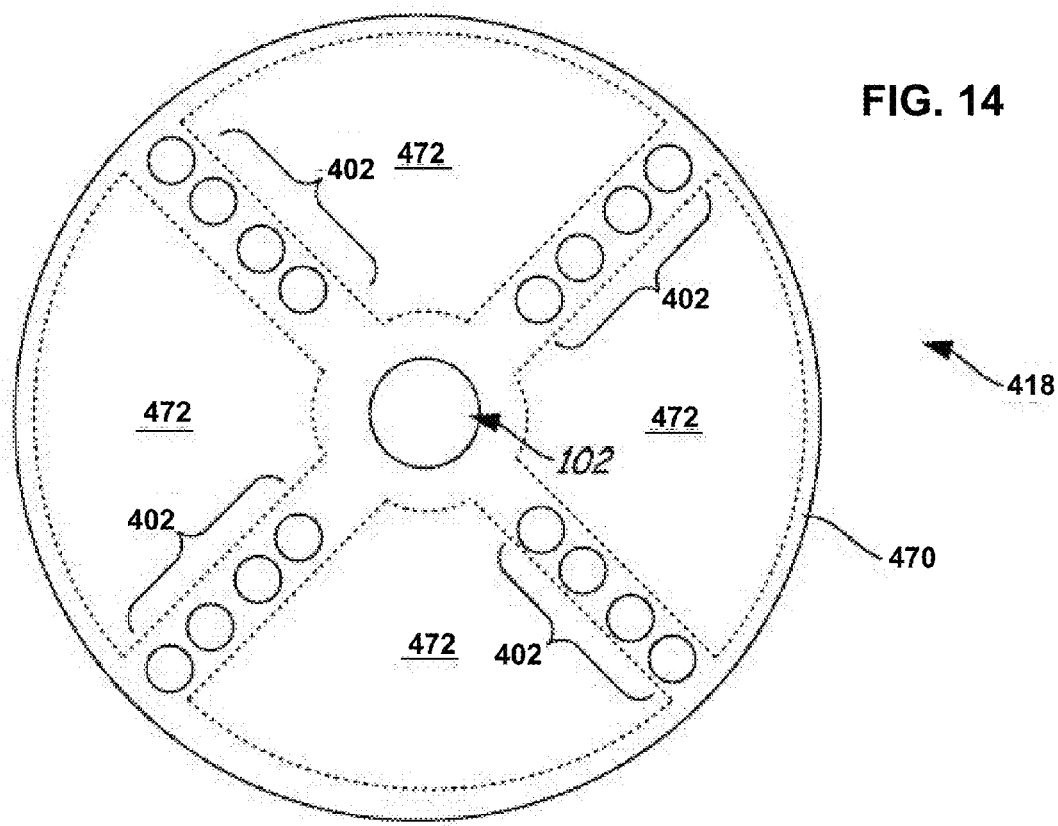
FIG. 14 is a top schematic illustration of an example scrubbing brush for the cleaning head in FIG. 13, which includes radial rows of multiple nanobubble generators.
Figure 15:
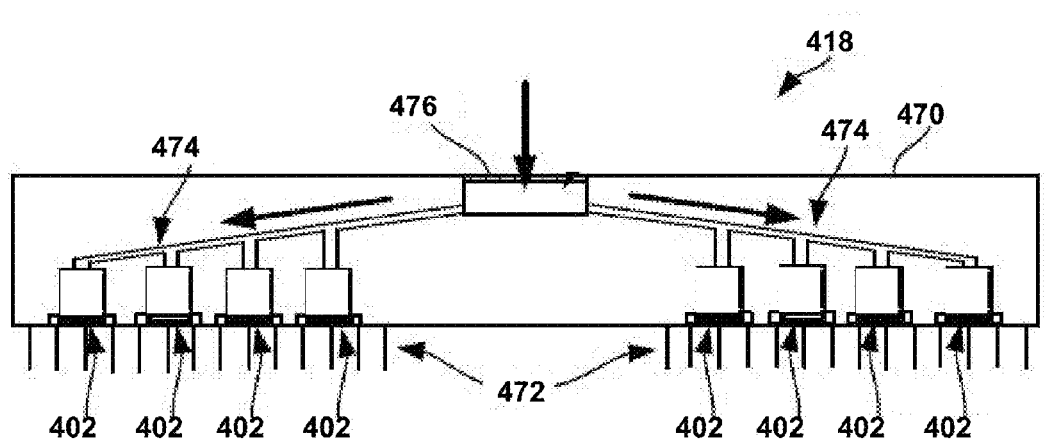
FIG. 15 is a side schematic illustration of the example scrubbing brush shown in FIG. 14.

FIGS. 14 and 15 illustrate an example configuration for scrubbing brush 418, which includes multiple nanobubble generators 402 arranged radially around backing portion 470 between groups of bristles 472. As further shown in FIG. 15, backing portion 470 may also include conduits 474 for directing the received feed liquid 434 and/or pressurized gas from aperture 476 to the individual nanobubble generators 402, e.g., via centrifugal force and gravity.

In the illustrated example, the number, sizes, and arrangements of the nanobubble generators 402 may vary depending on the particular cleaning requirements. As can be appreciated, due the increased number of nanobubble generators 402 in this embodiment, they each may be smaller in size than the single, axially-located generator shown in FIG. 13. Furthermore, the number of radial rows of the multiple nanobubble generators 402 may vary, such as from one row to ten rows, or from two rows to six rows, or from three rows to five rows.

Additionally, while illustrated as liner rows of multiple nanobubble generators 402, each radial row may alternatively extend in any suitable arrangement, such as with spiral arms. This embodiment shown in FIGS. 14 and 15, and its variations, allow the generated cleaning liquid containing nanobubbles to be dispensed in situ with the rotating bristles 472. This can further assist in the cleaning efficiency of mobile floor cleaner 400.

Figure 16:
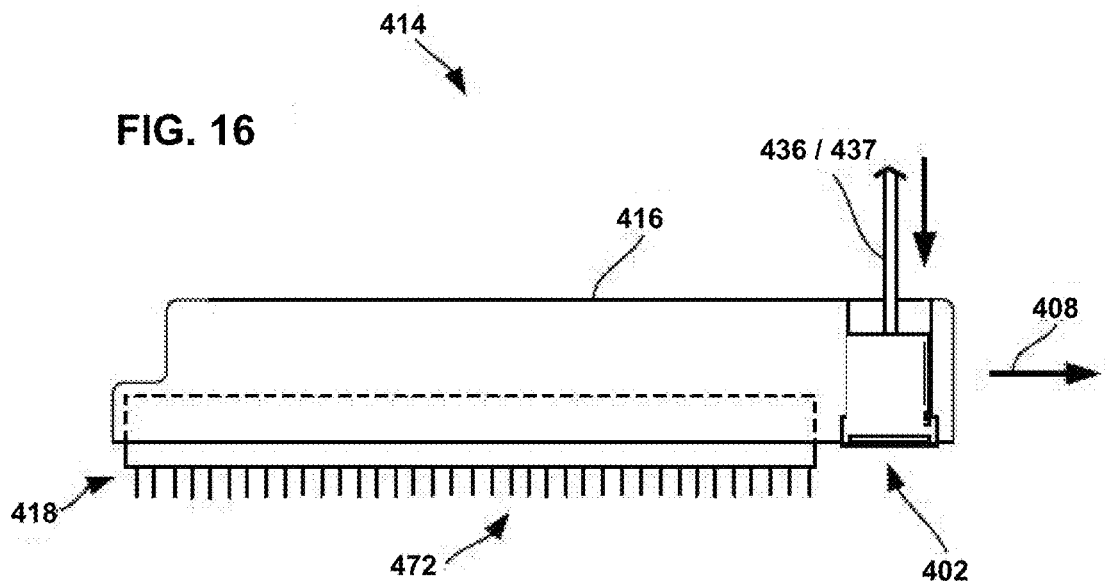
FIG. 16 is a side schematic illustration of an example alternative cleaning head having multiple front-located nanobubble generators.
Figure 17:
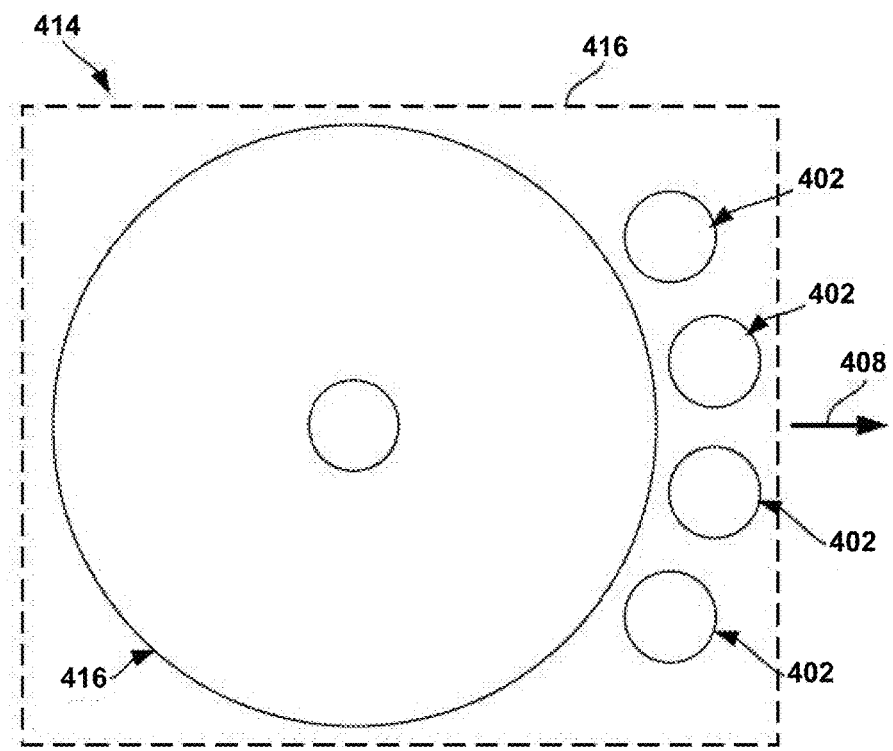
FIG. 17 is a top schematic illustration of the alternative scrubbing brush of FIG. 16.

FIGS. 16 and 17 illustrate another alternative embodiment in which multiple nanobubble generators 402 are secured to cover 416 at a location that is in front of scrubbing brush 418 (in the direction of movement illustrated by arrow 408). In this embodiment, conduit 436, gas supply line 437, and control lines (if used) may each branch into each of the nanobubble generators 402 for independent or collective operation.

The number, sizes, and arrangements of the multiple nanobubble generators 402 in this embodiment may also vary depending on the particular cleaning requirements. In general, the multiple nanobubble solution generators 402 in this embodiment produce a sufficient quantity of the cleaning liquid containing nanobubbles to function with the particular size of scrubbing brush 418 utilized. As can be appreciated, due to the increased number of nanobubble generators 402 in this embodiment, they each may also be smaller in size than the single, axially-located nanobubble generator shown in FIG. 13. Examples of suitable numbers of nanobubble generators 402 in this embodiment range from one to ten, or from two to eight, or from four to six.

As shown in FIG. 17, the multiple nanobubble generators 402 are arranged on cover 416 of cleaning head 414 in an arced row in front of scrubbing brush 418 (in the movement direction of arrow 408). Alternatively, the multiple nanobubble generators 402 may be arranged in any suitable manner, such as a linear row, a staggered row, and the like.

Scrubbing brush 418 in the example of all of FIGS. 13-17 can include a set of bristles or other scrubbing material 472 attached to backing portion 470. Backing portion 470 can be formed of any suitable material such as plastic, synthetic material, wood, metal, and the like. In a particular example, backing portion 470 is formed of a rigid plastic material through an injection molding processes. Bristles 472 may be attached in any suitable manner to the lower surface of backing portion 470. In one example, bristles 472 are molded within the material of backing portion 470. Other attachment methods may also be used, such as adhesives or heat sealing. Bristles 472 can be made of any suitable material such as plastic (e.g., nylon, polyester, polypropylene), natural animal hair (e.g. horse or hog hair), metal fibers, abrasives, and the like. Also, bristles 472 may be generally aligned vertically as shown in FIG. 16 or may be interconnected or layered such as in a pad form.

As previously noted, in alternative configurations of mobile floor cleaner 400, the mobile floor cleaner can utilize an off-board nanobubble generator in addition to or in lieu of the onboard generator illustrated in FIGS. 13-17. In the off-board configuration, the mobile floor cleaner can include a reservoir configured to receive and carry nanobubble-containing liquid. The mobile floor cleaner can be part of a system that also includes a separate, off-board nanobubble generator station. In use, the off-board nanobubble generator station can operate to generate nanobubble-containing liquid, and the reservoir carried by the mobile floor cleaner can be filled with nanobubble-containing liquid supplied from the off-board nanobubble generator station.

Figure 18:
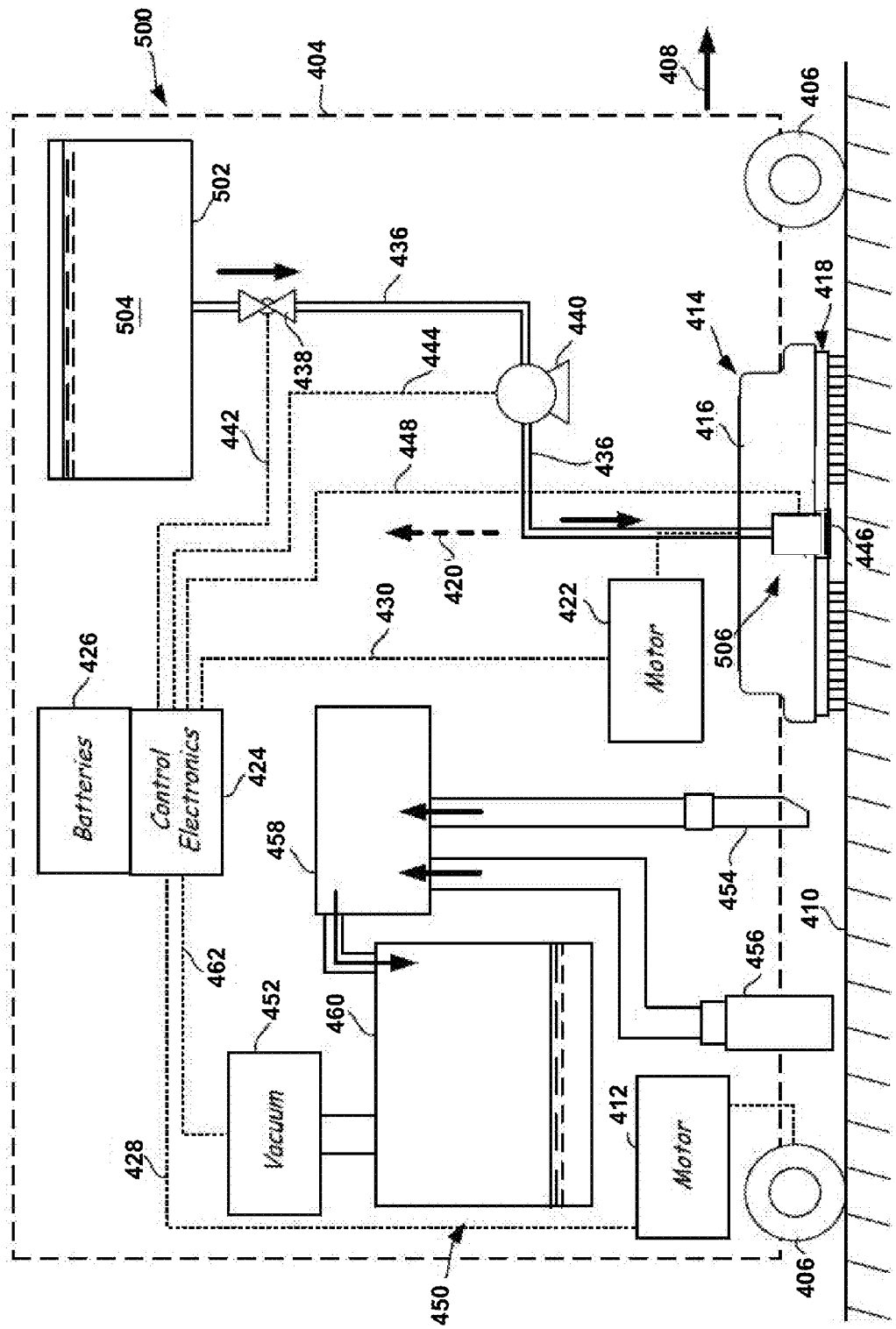
FIG. 18 is a side schematic illustration of an example mobile floor cleaner carrying a reservoir configured to receive a nanobubble-containing cleaning liquid from an off-board nanobubble generator.

FIG. 18 illustrates another example mobile floor cleaner 500 that contains a reservoir 502 configured to receive nanobubble-containing liquid 504 from an off-board source and distribute the nanobubble-containing liquid through a distribution system 506 onto a surface 410 to be cleaned. Mobile floor cleaner 500 is the same as example mobile floor cleaner 400 (with like components being indicated by like reference numerals), except mobile floor cleaner 500 does not include nanobubble generator 402 and related equipment for generating nanobubbles (e.g., feed liquid source 432, gas source 435). Instead, mobile floor cleaner 500 contains a reservoir 502 that receives nanobubble-containing liquid from an off-board nanobubble generator and stores the nanobubble-containing liquid until such time as the liquid is desired to be distributed on surface 410 being cleaned.

During a cleaning operation, control electronics 424 may energize motor 422 (via control line 430) to rotate scrubbing brush 418 about axis 420, open valve 438 (via control line 442), and energize pump 440 (if used) (via control line 444) to supply the cleaning liquid containing nanobubbles 504 from reservoir 502 to distribution system 506. Distribution 506, which may include one or more nozzles or other outlet orifices, can distributed the cleaning liquid containing nanobubbles onto surface 410 and/or scrubbing brush 418.

Reservoir 502 can be any suitable type of containment structure for holding cleaning liquid containing nanobubbles until use. In some configurations, reservoir 502 is at atmospheric pressure and/or open to atmosphere. In other configurations, reservoir 502 is pressurized. In this latter configuration, reservoir 502 can be at a pressure sufficient to keep nanobubble-containing liquid 504 saturated or supersaturated with nanobubbles. The elevated pressure inside of reservoir 502 can help keep the nanobubbles from coalescing and/or coming out of dissolution. When a pressurized reservoir 502 is used, mobile floor cleaner 500 may or may not carry a gas source (e.g., gas source 435 in FIG. 13) to pressurize the reservoir after addition nanobubble-containing liquid to the reservoir from an external source.

Mobile floor cleaner 500 can be used as part of a system that includes a physically separate, off-board nanobubble supply source. The nanobubble supply source can include a nanobubble generator, including any of the nanobubble generator configurations discussed herein (e.g., electrolysis, mechanical shear, ultrasonic transducer). The nanobubble generator can be connectable to and/or in communication with a feed liquid source so as to generate a cleaning liquid containing nanobubbles that is supplied to reservoir 502.

In some examples, the nanobubble supply source utilized with mobile floor cleaner 500 is a dedicated supply station. For example, the nanobubble supply station may be implemented as a "gas pump"-style station containing a nanobubble generator and having a controllable dispensing nozzle. In operation, the dispensing nozzle can be inserted into reservoir 502 and/or an intermediate transport that then is conveyed to mobile floor cleaner 500 to fill the reservoir with nanobubble-containing cleaning liquid.

In other examples, the nanobubble supply source utilized with mobile floor cleaner 500 is not a dedicated supply station but instead is a portable nanobubble generator that is separate from but travels with mobile floor cleaner 500. For example, the nanobubble supply source may be a nozzle (e.g., FIGS. 12A-12C) connectable to an external water source that is configured to function as a nanobubble generator. In use, an operator of mobile floor cleaner 500 may park the cleaner at any suitable water source and then attach the nanobubble-generating nozzle to the water source. The nozzle can generate nanobubbles as water passes through the nozzle and into reservoir 302.

As yet another example, the nanobubble supply source may be implemented as a recirculating device (e.g., elongated wand) that is removably inserted into reservoir 502. Initially, reservoir 502 can be filled with feed liquid (e.g., water) devoid of nanobubbles or having a reduced concentration of nanobubbles. The recirculating device can be inserted into reservoir 502 to generate nanobubbles in situ. The recirculating device may have a draw port, a discharge port, and one or more nanobubbles generated between the draw port and the discharge portion. In operation, the recirculating device can be inserted into reservoir 502 with at least the draw port submerged in the feed liquid contained in the reservoir. The recirculating device can continuously or periodically draw feed liquid from reservoir 502 via the draw port, pass the feed liquid through the nanobubble generator contained in the device to increase the concentration of nanobubbles in the feed liquid, and then return the resulting liquid having an increased concentration of nanobubbles to the reservoir via the discharge port. The recirculating device can be removed from reservoir 502 after a period of time sufficient to during the feed liquid in the reservoir into a cleaning liquid having desired nanobubble characteristics.

5. Examples

The present disclosure is more particularly described in the following examples that are intended as illustrations only, since numerous modifications and variations within the scope of the present disclosure will be apparent to those skilled in the art.

5.1 Example 1—Size and Concentration Measurements

In a particular example, the electrolysis cell 10 shown in FIGS. 2-6 was used as a test bench, with pump 164 and control electronics 204, to produce electrolyzed cleaning solutions based on two different types of feed liquid, which were then measured and compared to a non-electrolyzed control liquid.

The cell 10 had five parallel plate electrodes 20, 22 having an outer dimension of 63 mm×115 mm and separated from one another by a gap of 2.7 mm to 2.8 mm. Each plate was formed of a titanium plate coated with a 0.3 micron layer of platinum.

The feed liquid was introduced into a liquid source or reservoir feeding the cell. The control electronics were configured to control the pump 164 to pump the feed liquid at a rate of 0.12 gallons per minute (0.45 liters per minute) from the reservoir, to the electrolysis cell 10 (FIGS. 2-6). As a result of the flow rate of the feed water and the volume and length of electrolysis cell 10, the residence time of the feed water in the electrolysis cell was not less than 13 seconds and not more than 30 seconds. The electrolyzed fluids generated in the cell, e.g., anolyte and catholyte, were blended in the electrolysis cell prior to exiting the top orifice (outlet 32 in FIGS. 2 and 6) of the electrolysis cell. Outlet hose 78 directed the resulting electrolyzed cleaning solution to an outlet container for measurement.

The control electronics were configured to apply a pulse-width-modulated voltage of 24 volts across the electrodes to induce a substantially constant current of 3.0 amperes through the cell and feed water by varying the duty cycle of the voltage waveform. The waveform had a frequency of 600 Hz. The polarity of the voltage pulses applied to the electrodes was reversed every 600 seconds. The control electronics applied a substantially constant 24 volt potential across the electrodes and varied the duty cycle of the voltage waveform, based on an induced current measured by current sensor 216, which varied with the electrolysis cell impedance and water conductivity, to maintain a substantially constant 3.0 A current through the cell. In this embodiment the duty cycle was around 41%.

Figures 19A, 19B:
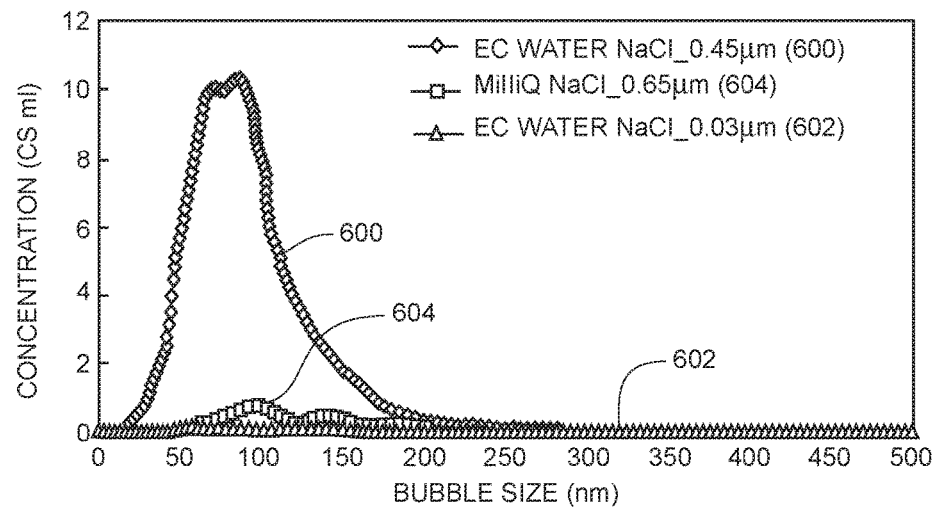

FIG. 19A is a graph that illustrates the nanobubble size and concentration of within each of the three test liquids. The x-axis represents nanobubble diameter in nanometers, and the y-axis represent concentration of nanobubbles per milliliter. Measurements were made using the Nanosight Nanoparticle Tracking Analysis according to the ASTM E2834-12 Standard Guide for Measurement of Particle Size Distribution on Nanomaterials in Suspension by Nanoparticle Tracking Analysis (NTA).

Line 600 represents a plot of the electrolyzed cleaning solution ("Liquid 1") produced when the Reference Solution was used as the feed liquid, showing large concentrations of nanobubbles within the 20 nm to 225 nm diameter size range. FIG. 19B is a table that illustrates the tabulated results from the repeat measurements made on "Liquid 1". According to these results, the mean particle (i.e., nanobubble) concentration was $6.47 \times 10^8$ nanobubbles per milliliter. The mean diameter of the nanobubbles was 100.13 nm.

Line 602 represents a plot of the electrolyzed cleaning solution ("Liquid 2") produced when the Reference Solution was used as the feed liquid, and the electrolyzed cleaning solution was filtered using a 20 nm filter. This plot shows essentially no concentration of nanobubbles within the 20 nm to 225 nm diameter size range. FIG. 19C is a table that illustrates the tabulated results from the repeat measurements made on "Liquid 2". According to these results, the mean particle concentration was $0.32 \times 10^8$ per milliliter. It is believed that many of the detected particles in Liquid 2 were background debris, not nanobubbles.

Line 604 represents a plot of a control liquid, corresponding to non-electrolyzed Reference Solution ("Liquid 3") filtered using a 450 nm filter. This plot shows essentially no concentration of nanobubbles within the 20 nm to 225 nm diameter size range. FIG. 19D is a table that illustrates the tabulated results from the repeat measurements made on "Liquid 3". According to these results, the mean particle concentration was $0.43 \times 108$ per milliliter. It is believed that many of the detected particles in Liquid 2 were background debris, not nanobubbles.

5.2 Example 2—Cleaning Efficacy Test

Again, the electrolysis cell 10 shown in FIGS. 2-6 was used as a test bench, with pump 164 and control electronics 204, to produce an electrolyzed cleaning solution ("Liquid 4") using the Reference Solution as the feed water. The resulting electrolyzed cleaning solution was then tested for efficacy in cleaning a soil sample. The same cleaning test was performed on a non-electrolyzed Reference Solution (control "Liquid 5") and the results were compared.

Again, the cell 10 had five parallel plate electrodes 20, 22 having an outer dimension of 63 mm×115 mm and separated from one another by a gap of 2.7 mm to 2.8 mm. Each plate was formed of a titanium plate coated with a 0.3 micron layer of platinum.

The feed liquid was introduced into a liquid source or reservoir feeding the cell. The control electronics were configured to control the pump 164 to pump the feed liquid at a rate of 0.12 gallons per minute (0.45 liters per minute) from the reservoir, to the electrolysis cell 10 (FIGS. 2-6). As a result of the flow rate of the feed water and the volume and length of electrolysis cell 10, the residence time of the feed water in the electrolysis cell was not less than 13 seconds and not more than 30 seconds. The electrolyzed fluids generated in the cell, e.g., anolyte and catholyte, were blended in the electrolysis cell prior to exiting the top orifice (outlet 32 in FIGS. 2 and 6) of the electrolysis cell. Outlet hose 78 directed the resulting electrolyzed cleaning solution to an outlet container for measurement.

The control electronics were configured to apply a pulse-width-modulated voltage of 24 volts across the electrodes to induce a substantially constant current of 3.0 amperes through the cell and feed water by varying the duty cycle of the voltage waveform. The waveform had a frequency of 600 Hz. The polarity of the voltage pulses applied to the electrodes was reversed every 600 seconds. The control electronics applied a substantially constant 24 volt potential across the electrodes and varied the duty cycle of the voltage waveform, based on an induced current measured by current sensor 216, which varied with the electrolysis cell impedance and water conductivity, to maintain a substantially constant 3.0 A current through the cell. In this embodiment the duty cycle was around 41%.

Cleaning efficacy was tested using a model soil on uniform substrates. The results below show that with the above mentioned structure and Reference Solution, it is possible to clean contaminants on a soiled substrate. It is understood that, with a mobile scrubber machine, cleaning occurs with agitation from the brush(es), which lifts the contaminants from a soiled surface into the cleaning solution matrix as well as with nanobubble interaction with soils at the surface, and then by the adsorption of the soils by nanobubbles. The present experiment was devised to demonstrate both the surface cleaning action of the nanobubbles and the soil deposition prevention action of the nanobubbles.

The experiment was conducted by using an ellipsometer to measure changes in soil thickness with the introduction of select solutions (i.e., the electrolyzed Reference Solution "Liquid 4"; and the non-electrolyzed reference Solution "Liquid 5"). Ellipsometry is a sensitive optical technique for investigating properties of thin films such as thickness (depth).

Bovine Serum Albumin (BSA) was used as a model contaminant to represent protein soils. The BSA was applied to a silicon wafer, which formed a hydrophilic surface/substrate. As described above, the Reference Solution BSA was chosen as a known amount of BSA can be reproducibly adsorbed to a surface dependent on the concentration of BSA used. For this experiment, BSA at a concentration of 0.01 mg/mil was dissolved in a NaCl solution (2.1 mM) and was allowed to adsorb to a clean silicon wafer for 60 minutes. Then the surface was treated with the electrolyzed Reference Solution "Liquid 4", filtered by a 450 nm filter. The filtered "Liquid 4" had a 6.5 E+8 nanobubble concentration, a nanobubble size distribution of 20 nm to 225 nm, with a mean of 100 nm and a mode of 85 nm). The thickness of the adsorbed BSA layer was measured as a function of time by ellipsometry as the liquid was stirred.

The results for Liquid 4 are shown in FIG. 20A, which is a table illustrating thickness of the BSA as a function of time and stirring speed.

A solution of electrolyzed Reference Solution that was unfiltered was also introduced to another prepared sample and the results were similar to the results in FIG. 20A.

A solution of electrolyzed Reference Solution that was filtered by a 20 nm filter was introduced to yet another prepared sample and the results were similar to the results described below with respect to FIG. 20B and the control solution "Liquid 5". This is believed to result from such a small concentration of nanobubbles below 20 nm within the electrolyzed Reference Solution.

For the control solution "Liquid 5", BSA at a concentration of 0.01 mg/mil was dissolved in a NaCl solution (2.1 mM) and was allowed to adsorb to a clean silicon wafer for 60 minutes. Then the surface was treated with the electrolyzed Reference Solution "Liquid 5". The thickness of the adsorbed BSA layer was measured as a function of time by ellipsometry as the liquid was stirred. The results for Liquid 5 are shown in FIG. 20B, which is a table illustrating thickness of the BSA as a function of time and stirring speed.

As shown in FIG. 20B, Liquid 5 showed little, if any, cleaning efficacy as the thickness of the BSA layer on the substrate remained essentially unchanged over time.

The data in FIGS. 20A and 20B demonstrates that significant amounts of the soil are removed with stirring the fluid when a nanobubble rich solution is introduced in accordance with exemplary embodiments of the present application, as opposed to when the control solution "Liquid 5" without nanobubbles was used, where fundamentally the amount of soil was unchanged.

5.3 Example 3—Impact of Dissolved Oxygen on Cleaning Efficacy

The electrolysis cell 10 shown in FIGS. 2-6 was used as a test bench, with pump 164 and control electronics 204, to produce an electrolyzed cleaning solution. The cell 10 had five parallel plate electrodes 20, 22 having an outer dimension of 63 mm×115 mm and separated from one another by a gap of 2.7 mm to 2.8 mm. Each plate was formed of a titanium plate coated with a 0.3 micron layer of platinum.

For comparison purposes, a different electrolysis cell corresponding to the "ec-H2O™" Technology from Tennant Company, Minneapolis, Minn., was used as a test bench to produce a comparative electrolyzed cleaning solution. Unlike electrolysis cell 10, the comparative cell corresponding to the "ec-H2O™" Technology had a membrane divider between each adjacent electrode (e.g., dividing the anode from the cathode). In addition, the comparative cell had a smaller outlet orifice than cell 10 and lacked any blending of anolyte and catholyte within the cell.

In a first test, a source liquid having a conductivity of 310 µS was used as a feed liquid for both cell 10 and the comparative cell. In a second test, Reference Solution having a conductivity of 250 µS was used as a feed liquid for both cell 10 and the comparative cell. Based on related testing, the electrolyzed cleaning solution produced using cell 10 was believed to be super-saturated with dissolved oxygen (having a dissolved oxygen concentration believed to be in the range of 12 mg/L to 14 mg/L). By contrast, the electrolyzed cleaning solution produced using the comparative cell was believed not to be super-saturated (having a dissolved oxygen concentration believed to be in the range of 8 mg/L to 9 mg/L).

For both the first test and second test, the electrolyzed cleaning solution produced using cell 10 and the comparative cell were applied to test substrates coated with a model soil of soy bean oil, pancake mix, and dye. The test substrates used for each test and for each electrolyzed cleaning solution were identical. Further, each electrolyzed cleaning solution was applied to a respective test substrate under identical conditions (e.g., with an identical amount of force and agitation). The weight of the soil remaining on the test substrate after testing was compared to the weight of the soil on the substrate at the beginning of testing to determine the percent removal.

Figure 21A:
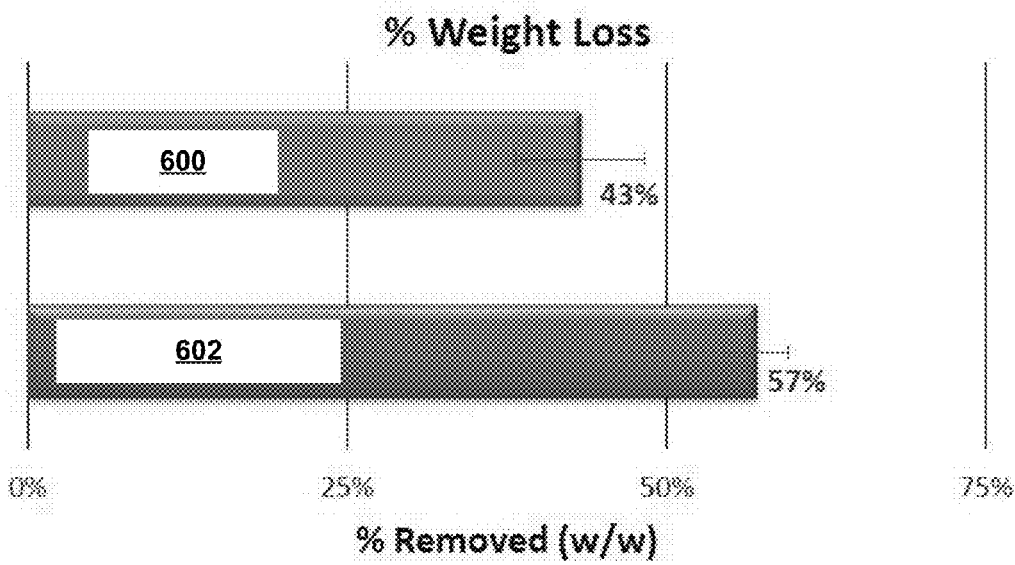
FIGS. 21A and 21B are bar graphs illustrating cleaning efficacy results for different cleaning solutions containing nanobubbles and dissolved gases.

FIG. 21A is a bar graph showing the amount of soil removed for the first test using the electrolyzed cleaning solution produced using the comparative cell (600) and the electrolyzed cleaning solution produced using the cell 10 (602). The data show that soil removal improved 32% using cleaning solution containing nanobubbles produced using cell 10 compared to cleaning solution containing nanobubbles produced using the comparative cell in this example.

Figure 21B:
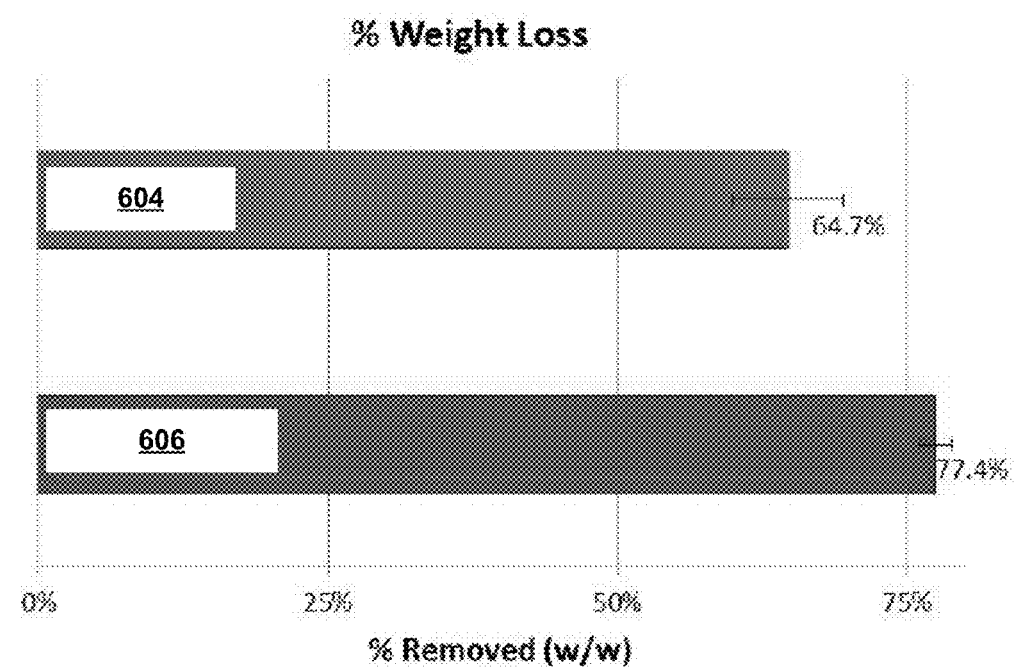

FIG. 21B is a bar graph showing the amount of soil removed for the second test using the electrolyzed cleaning solution produced using the comparative cell (604) and the electrolyzed cleaning solution produced using the cell 10 (606). The data show that soil removal improved 20% using cleaning solution containing nanobubbles produced using cell 10 compared to cleaning solution containing nanobubbles produced using the comparative cell in this example.

Unless otherwise specified, the following terms as used herein have the meanings provided below:

The terms "about" and "substantially" are used herein with respect to measurable values and ranges due to expected variations known to those skilled in the art (e.g., limitations and variability in measurements).

The terms "preferred" and "preferably" refer to embodiments of the invention that may afford certain benefits, under certain circumstances. However, other embodiments may also be preferred under the same or other circumstances. Furthermore, the recitation of one or more preferred embodiments does not imply that other embodiments are not useful, and is not intended to exclude other embodiments from the scope of the invention.

Although the present disclosure has been described with reference to one or more embodiments, workers skilled in the art will recognize that changes may be made in form and detail without departing from the scope of the disclosure and/or the issued claims appended hereto. Also while certain embodiments and/or examples have been discussed herein, the scope of the invention is not limited to such embodiments and/or examples. One skilled in the art may implement variations of these embodiments and/or examples that will be covered by one or more issued claims appended hereto.

The invention claimed is:

1. A cleaning system comprising:
a liquid source configured to provide a feed liquid;
an electrolysis cell configured to receive the feed liquid and to electrochemically activate the feed liquid to provide an electrochemically-activated liquid;
a control circuit, which is configured to control a flow rate of the feed liquid through the electrolysis cell and a current drawn by the electrolysis cell such that the electrochemically activated liquid comprises a concentration of at least $1\times10^6$/ml of nanobubbles having a diameter of 10 nm to 450 nm when the feed liquid comprises a Reference Solution, wherein the Reference Solution, prior to electrolysis, comprises the following properties:
deionized water (ASTM D1193-91, Type II) and a sufficient amount of an Analytical Reagent (AR) grade NaCl to achieve a conductivity of 250 µS, and filtered with a 20 nm filter;
temperature at 21-25° C. (69.9-77.0° F.);
Zeta Potential (ζ) of −5 mV to −65 mV;
nanoparticle concentration under 1 E+6/ml; and
electrolyzed by the electrolysis cell within one hour of creating the Reference Solution; and
a dispenser configured to dispense the electrochemically-activated liquid.

2. The cleaning system of claim 1 wherein the control circuit is configured such that, when the feed liquid comprises the Reference Solution, the electrochemically-activated liquid comprises a concentration of nanobubbles having a diameter of 15 nm to 200 nm of at least $1\times10^6$/ml, a Zeta potential of −25 mV to −65 mV, and is super-saturated with dissolved gas.

3. The cleaning system of claim 1 wherein the control circuit is configured such that, when the feed liquid comprises the Reference Solution, the electrochemically-activated liquid comprises a concentration of nanobubbles having a diameter of 20 nm to 225 nm of at least $1\times10^6$/ml.

4. The cleaning system of claim 1 wherein the control circuit is configured such that, when the feed liquid comprises the Reference Solution, the electrochemically-activated liquid comprises a concentration of nanobubbles having a diameter of 20 nm to 225 nm of at least $1\times10^8$/ml and a Zeta potential of −10 mV to −100 mV.

5. The cleaning system of claim 1 wherein the control circuit is configured such that, when the feed liquid comprises the Reference Solution, the electrochemically-activated liquid has a concentration of dissolved oxygen at least 20% above a dissolved oxygen saturation limit for the electrochemically-activated liquid.

6. The cleaning system of claim 1 wherein the control circuit is configured such that, when the feed liquid comprises the Reference Solution, the electrochemically-activated liquid comprises a concentration of nanobubbles having a diameter of 15 nm to 200 nm of $1\times10^6$ to $1\times10^8$ and a Zeta potential of +0 mV to −105 mV.

7. The cleaning system of claim 1 wherein the control circuit is configured such that, when the feed liquid comprises the Reference Solution, the electrochemically-activated liquid comprises a concentration of nanobubbles having a diameter of 20 nm to 225 nm of $1\times10^6$/ml to $1\times10^{20}$/ml and a Zeta potential of −10 mV to −100 mV.

8. The cleaning system of claim 1, further comprising:
an electro-mechanical pump to pump the feed liquid from the liquid source to the electrolysis cell, the control circuit being configured to control the pump.

9. The cleaning system of claim 1, further comprising:
a motorized scrub head configured to scrub the surface, wherein the dispenser dispenses the electrochemically-activated liquid within the scrub head; and
a recovery device configured to recover at least a portion of the dispensed electrochemically-activated liquid from the surface.

* * * * *